US012621414B2

(12) United States Patent　(10) Patent No.:　US 12,621,414 B2
Tal et al.　(45) Date of Patent:　May 5, 2026

(54) IDENTIFYING, RECORDING AND ASSESSING GEOSPATIAL ASSETS WITH DATA COLLECTION, IMAGE PROCESSING, AND SELECTIVE PRUNING

(71) Applicant: VISUAL DEFENCE INC., Richmond Hill (CA)

(72) Inventors: Royi Tal, Markham (CA); Thomas Bakonyi, Toronto (CA); Redenthor Ibana, Ajax (CA); Omri Artman, Toronto (CA)

(73) Assignee: VISUAL DEFENCE INC., Richmond Hill (CA)

( * ) Notice: Subject to any disclaimer, the term of this patent is extended or adjusted under 35 U.S.C. 154(b) by 266 days.

(21) Appl. No.: 18/464,655

(22) Filed: Sep. 11, 2023

(65) Prior Publication Data

US 2023/0421732 A1　Dec. 28, 2023

Related U.S. Application Data

(63) Continuation-in-part of application No. 17/853,918, filed on Jun. 30, 2022, now Pat. No. 12,300,001, and (Continued)

(51) Int. Cl.
*H04N 7/18*　(2006.01)
*G06V 10/82*　(2022.01)
(Continued)

(52) U.S. Cl.
CPC ............. *H04N 7/183* (2013.01); *G06V 10/82* (2022.01); *G06V 20/176* (2022.01); *G06V 20/56* (2022.01)

(58) Field of Classification Search
CPC ........ H04N 7/183; G06V 10/82; G06V 20/56; G06V 20/176
See application file for complete search history.

(56) References Cited

U.S. PATENT DOCUMENTS 6,282,362 B1　8/2001　Murphy et al.
2004/0218052 A1　11/2004　DiDomenico et al.
(Continued)

FOREIGN PATENT DOCUMENTS

CN　109870456 A　6/2019
EP　3618012 A1　3/2020

OTHER PUBLICATIONS

Subhasis Das and Milad Mohammadi; "Traffic Sign Detection Mobile App CS 231 M—Project."; Stanford University; https://web.stanford.edu/class/cs231m/spring-2014/proposals/sdmm.pdf; (2014); 2 pgs.
(Continued)

*Primary Examiner* — Myron Wyche
(74) *Attorney, Agent, or Firm* — Tarolli, Sundheim, Covell & Tummino LLP

(57)　ABSTRACT

The present invention is intended to provide enhanced asset data collection functions, asset analysis, and/or asset alerts. The system assists in updating existing asset records, adding new assets to asset inventories, identifying maintenance issues, and/or identifying assets which are no longer present. The system is composed of a data collection device(s) which can collect images and location sensor data, server(s), and client interface(s) for interacting with the collected and/or processed data. The system also includes image processing operations and data pruning and selection functions for the smart asset data collection and processing, allowing to obtain the appropriate data for the appropriate asset at the appropriate time.

21 Claims, 11 Drawing Sheets

Related U.S. Application Data a continuation-in-part of application No. 17/559,315, filed on Dec. 22, 2021, now Pat. No. 12,156,091, said application No. 17/853,918 is a continuation-in-part of application No. 17/559,315, filed on Dec. 22, 2021, now Pat. No. 12,156,091, application No. 18/464,655 is a continuation-in-part of application No. 17/534, 816, filed on Nov. 24, 2021, now Pat. No. 12,301,745, and a continuation-in-part of application No. 17/373, 514, filed on Jul. 12, 2021, now Pat. No. 12,165,439, said application No. 17/559,315 is a continuation-in-part of application No. 16/930,070, filed on Jul. 15, 2020, now Pat. No. 11,481,991, said application No. 17/373,514 is a continuation-in-part of application No. 16/930,070, filed on Jul. 15, 2020, now Pat. No. 11,481,991.

(51) Int. Cl.
G06V 20/10 (2022.01)
G06V 20/56 (2022.01)

(56) References Cited

U.S. PATENT DOCUMENTS

| | | | |
|---|---|---|---|
| 2017/0200061 A1 | 7/2017 | Julian et al. | |
| 2018/0155827 A1 | 6/2018 | Yoon et al. | |
| 2018/0330526 A1 | 11/2018 | Corcoran | |
| 2019/0034735 A1* | 1/2019 | Cuban | G06V 40/16 |
| 2020/0394411 A1 | 12/2020 | Dahlberg et al. | |
| 2023/0050849 A1 | 2/2023 | Tal et al. | |

OTHER PUBLICATIONS

Applicant: Visual Defence Inc.; "Identifying, Recording and Assessing Geospatial Assets with Data Collection, Image Processing, and Selective Pruning"; European Application No. 24187187.0; Extended European Search Report dated Nov. 12, 2024; 10 pgs.

* cited by examiner

802 — Obtain digital images and sensor data

804 — Collect / process data

806 — Transmit selected data

808 — Coordinating with database

810 — Implement image processing function

812 — Implement pruning function

814 — Provide data to interface

816

IDENTIFYING, RECORDING AND ASSESSING GEOSPATIAL ASSETS WITH DATA COLLECTION, IMAGE PROCESSING, AND SELECTIVE PRUNING

CROSS-REFERENCE TO RELATED APPLICATIONS

This application is a C-I-P application of U.S. patent application Ser. No. 17/853,918 filed on Jun. 30, 2022; which is a C-I-P application of U.S. patent application Ser. No. 17/559,315 filed on Dec. 22, 2021; which is a C-I-P application of U.S. patent application Ser. No. 16/930,070 filed Jul. 15, 2020;

This application is a C-I-P application of U.S. patent application Ser. No. 17/559,315 filed on Dec. 22, 2021; which is a C-I-P application of U.S. patent application Ser. No. 16/930,070 filed Jul. 15, 2020;

This application is a C-I-P application of U.S. patent application Ser. No. 17/373,514 filed on Jul. 12, 2021; which is a C-I-P application of U.S. patent application Ser. No. 16/930,070 filed Jul. 15, 2020; and This application is a C-I-P application of U.S. patent application Ser. No. 17/534,816 filed on Nov. 24, 2021, the contents of which, all of the above, are hereby incorporated by reference.

FIELD

The present invention is related to asset management and maintenance for automating aspects of identification, recording, monitoring and assessing the condition of infrastructure and assets.

BACKGROUND

The management and maintenance of infrastructure, including road and transit assets is key to safety for commuters, vehicle owners and pedestrians. Well maintained road and transit infrastructure reduce risks and liabilities and assist in the efficient flow of people and goods. In the long term an effective asset management program can reduce cost, increase efficiency and improve organizational performance. Additionally, asset management programs will generate information about assets which can be used for more strategic decision making. Asset Management refers to all activities that are undertaken within an asset's lifecycle from development and procurement to disposal. Asset management activities are undertaken by various parts of an organization for example finance, logistics, maintenance and repair, customer service and reporting. The involvement of many different business functions makes the asset management process onerous and challenging. Furthermore, the challenges faced by asset managers is knowing the condition and location of assets in real time. Failure to detect missing, damaged or obstructed assets can create hazardous situations for road users and increase an organization's liability. It can also provide for unsightly, unpleasant or otherwise discouraging user experience to commuters. The public can therefore, report and complain about issues they encounter in relation to the assets. In the event of a property damage, injury or death, it can also result in claims and/or litigation.

As computing technologies become easier to make, cheaper to produce and more available, they inevitably become incorporated into everyday applications. One such application is connected and/or autonomous vehicle application. With respect to vehicles, more sensors are continuously added to vehicles that improve the performance, comfort and safety of vehicles for its drivers. Many cars are currently equipped with rear cameras to assist drivers in reversing and the installation of stock forward-facing cameras or third-party dashboard cameras is increasing. Early warning systems such as collision alert which can use a camera, radar or laser sensor that make the vehicle aware of its surroundings. Public transit vehicles can be equipped with CCTV systems for security and risk management functions. Sensors are already present in vehicles that can identify, detect road conditions, markers signs and other right of way objects, for example, for collision avoidance, lane keeping or autonomous or semi-autonomous driving.

An organization such as a town, municipality, city, transit authority, asset operator or other private or governmental entities may be responsible for or have ownership over hundreds, thousands, or many thousands (or more) of assets which can include, one or more categories, for example roads (or road sections), manhole covers, signs, fire hydrants, trees, transit stops, concrete pads and other assets related to roads, accessible by road, or visible from road. The organization may be required to demonstrate their adherence to maintenance standards or its own internal maintenance guidelines. The responsible organization may performs manually scheduled inspections by trained staff who travel to inspect the asset(s) and document the asset(s) condition. When asset(s) are found to be in noncompliance or defective, the inspectors escalate the issue to the management or maintenance team. A work crew then performs the repair or replacement and on completion, create a report or mark the issue as closed. Factors such as the availability of money, staff, equipment/material, the asset importance and its conditions, and repair/maintenance priority are considered when planning and scheduling maintenance and repair exercises. Inspectors can reach assets by vehicle. They can also walk. Similarly, an area and its assets may be under the maintenance of a governmental organization, a government controlled organization, a public-private partnership, a private company, a concession company, or other types of organization. The asset(s) may be the responsible of one or multiple organizations.

The organizations may use one or more standalone systems to keep track of the conditions of their assets or to report, track and manage issues related to the assets. Examples can include a field reporting system (such as an app on a phone or a tablet), paper logs, web portals, excel/word/pdf files/forms, computer file templates, work management software, asset management system, enterprise resource planning software, dispatch software, logging software, patrol software, digital forms, or otherwise other devices and/or software.

The inspection process is manually carried out by an inspector (can also be known by another term, such as patroller, scout, surveyor, or other terms which can be used to describe a similar function) which typically has an inspection plan. The plan could be more informal, whereas the inspector relies on memory and/or records to travel and inspect the different assets. The inspector could strive to inspect all assets within a category or based on set criteria, objectives, or priorities. Availability of inspector staff and time can also be a determining factor as to how often/how assets get inspected. The inspectors may also informally drive or walk around within certain areas looking for a variety of issues on relevant assets. In a more organized manner, the inspector may have a prepared list and/or map showing the assets details and locations. This list can be provided as part of a paper based system, digitally stored in files such as excel, or available online and/or offline using customized applications and databases. The inspector will typically visually inspect the assets, take note of potential issues, for example, missing or damaged asset. The inspector may or may not record which assets were inspected. Within the context of an inspector travelling using a vehicle, inspector is then required to find a safe spot to stop, to take additional notes, images and readings. From the findings, the inspector makes maintenance recommendations and/or reports, such as a service request, which can, for example, be to repair or replace the asset. The inspection frequency can be dependent on many factors such as legislative requirements in the country/state/province at which it is placed, the type of the asset being assessed, the location of the asset such as on highways or main roads, the importance of the asset (for example, regulatory or non-regulatory), and the responsible entity. For example, inspection of signs can occur annually as compared with highways that take place daily or weekly. The inspection process occurs repeatedly over the life of the asset. The inspector can also use certain tools to measure certain asset indicators, for example, retro-reflectivity of a sign, whether a sign is leaning, size or depth of damage deficiency (for example, how recessed is a manhole), and other such criteria which may be relevant to indicate whether an asset requires a corrective action. As the inspection process is carried out by different staff members having different experiences and training, there is a certain element of undesirable subjectivity/variability that can be introduced into the inspection process, whereas one inspector may decide that an issue is worth noting, whereas another does not.

The inspection process can also be hazardous and error prone. When inspecting road assets while operating a vehicle, inspectors have to split their attention between operating the vehicle and inspecting assets. This can lead to assets, or deficiencies related to assets, being missed or improperly assessed. Additionally, inspectors may be required to stop to take further notes and readings which can be dangerous for the inspector and for commuters on the road which may not expect a vehicle or a person to be stopped on the road.

There are several reasons why organizations implement asset management systems, which can include, for example, developing strategic decision-making capacity, reducing inefficient processes and practices, and extending the life of the asset. These systems initially require a tremendous effort in determining the asset's location and condition.

On completion of the initial information gathering phase of the asset management program, the subsequent and persistent challenge is keeping the information current and succinct and thus up to date. Additionally, collating inspection reports into a system that can create strategic value for organizations is difficult. Asset Information can be quickly outdated or misreported and there are limited ways to maintain data integrity.

To launch an asset management program, an organization may start with the manual development of a usable inventory. This inventory can quantitatively and/or qualitatively store details about the asset. The information could be gathered from a combination of existing sources such as excel sheets, databases, fieldwork, or asset management systems. Depending on the size of the organization and its asset portfolio, the manual data gathering process can be time consuming. It can take weeks, months and even years. The length of the process can be driven by various factors, which can include, for example, the availability of existing data, the number of assets, the geographical area to be covered, the travel time, the data that needs to be captured with the inventory, and the length of time to be spent per asset.

To confirm the condition of an asset an inspector or patroller is required to physically locate the asset, confirm its identity and record its location either with GPS or qualitatively. The process can be paper based or implemented digitally. However, both systems have the same disadvantages. They require people to take readings, and transcribe the data. Human factors such as fatigue, workload, traffic conditions, weather and the sheer number of assets can influence the quality of the surveys. People have limits with respect to attention, focus, and consistency. Even when equipped with digital systems, many issues can be overlooked, misclassified or misidentified. This results in lower defect detection rates and contributes to inefficient resource management such as people, time and fuel.

If digital systems are used to survey asset locations and/or inspect asset conditions, they may use an assortment of specialized tools. Such tools can also require specialized training is required to accurately calibrate and use scientific instruments. Furthermore municipalities, cities, local governments, or other organizations responsible for managing assets are constrained by budgetary allocations and may not be able afford advanced systems. Therefore, they rely on more subjective methods for assessing assets—for example, sending somebody to drive around and only log issues noticed while driving.

Systems have been developed to improve the asset management process. Present systems require inspectors to manually enter (or select) text notes and capture (and upload) images. These systems offer only minor improvements to performance. However, the inspection process is not safer, improves defect detection or offers more than an incremental data entry performance over older paper-based methods.

After the asset inventory has been created, procedures can then be implemented to maintain the accuracy of the information stored. Asset inventory and data are anticipated to change over time. For example, asset quantities and locations can change over time due to developments (for example, construction or roads or development of neighborhoods). As another example, assets can also be damaged, deteriorated or go missing due to environmental conditions (for example, storms, floods, accidents, or other factors). Assets may also simply degraded with time. An asset maintenance strategy can therefore be developed. A maintenance strategy would focus on what and when an asset will need attention. The goal of a successful maintenance strategy is to reduce cost by improving preparedness and efficient resource deployment. This leads to better organizational budget management and a more proactive over reactive management stance.

Further, it is recognized that the sheer volume of collected and stored data can be detrimental to having a well maintained and usable/accessible asset management system.

SUMMARY

The present invention is intended to provide enhanced asset data collection functions, asset condition analysis, and asset alerts. The system can assist in updating existing asset records, adding new assets to asset inventories, identifying maintenance issues, and identifying assets which are no longer present.

The system is composed of one or more data collection devices which collect images and location sensor data, one or more servers, and one or more client interfaces for interacting with the collected data and/or processed data. In addition, the system provides image processing operations which generate asset data from the collected images. In addition, the system provides pruning and selection functions for the smart optimization of the asset data collection and processing, to obtain the appropriate data for the appropriate asset at the appropriate time. The examples provided are for vehicle use but the system is also optionally applied in a hand-held manner by a person, or using any motorized or non-motorized machinery (including vehicles, aerial drones, vessels, and robots), whether manned, manually controlled, remote controlled, autonomous or semi-autonomous.

The system provides pruning logic that can use geospatial functions, computer vision, artificial intelligence, and various algorithms to selectively capture, process, transmit and store asset data collections. The asset data collection provides one or more images of the assets, along with additional data that is derived from images, such as its type, its condition and whether any issues are present in the image. The data derived from the image, together with the sensor information, can also used to match the one or more images to particular assets. The system uses various image processing operations to derive data in relation to images and/or assets. The system also uses different data pruning and selection algorithms in relation to the collected data as it flows through the system. The system provides selection, enhancement and pruning by one or more users of one or more user roles at one or more steps of the data collection and processing workflow. The system provides flexible array of embodiments allowing for various image processing, pruning operations and workflows on the device, the server, by users and/or combination thereof. The system provides redaction options allowing to redact personal information captured with the asset data.

The system also provides various client user interfaces, such as desktop and mobile devices and components which facilitate users to interact with captured data in various ways for various purposes such reviewing the appropriate data was collected, refining the digital assets records, updating digital asset records and inventories, and addressing maintenance issues.

The system also optionally integrates or otherwise interact with integrated or third party asset repositories, asset management systems, and work management systems in various ways. The system also provides additional applications and user interfaces to support the data collection, analysis, and maintenance operations.

A first aspect provided is a system for optimized collection and processing of asset data to generate selected data, and for transmitting the selected data over a communications network to one or more servers, the one or more servers located remotely from one or more data collection devices, the system comprising: the one or more collection devices each mounted in one or more vehicles and having: at least one camera for obtaining digital images including image data having at least a portion of the asset data; none or more sensors for collecting sensor data, including at least one sensor for acquiring geolocation information associated with the digital images; at least one working memory and at least one processor for executing data collection instructions, the data collection instructions defining operation of the at least one camera and the one or more sensors in order to generate collected data including the image data and the sensor data of the asset data; storage media for storage of the asset data including temporary storage of collected and/or processed portions of the asset data prior to sending the selected data to the one or more servers over the communications network; and a network communications interface for sending the selected data to the one or more servers, and for receiving collection and/or processing instructions and updates from the one or more servers; and at least one asset database representing the asset data of one or more assets and their geolocation, the database working in conjunction with at least one image processing function and at least one data pruning function; the least one image processing function for generating derived data from the digital images, the at least one image processing function operating on the one or more data collection devices and/or the one or more servers; and the least one data pruning function for optimizing an amount of at least one of the image data, the sensor data and the derived data; the least one data pruning function operating on the one or more data collection devices and/or the one or more servers.

A second aspect provided is a method for optimized collection and processing of asset data to generate selected data, and for transmitting the selected data over a communications network to one or more servers, the one or more servers located remotely from one or more data collection devices, the method executed by one or more processor(s) using stored instructions in memory for: obtaining digital images from a camera, the digital images including image data having at least a portion of the asset data; and obtaining sensor data, including geolocation information associated with the digital images; executing data collection instructions, the data collection instructions defining operation of the at least one camera and the one or more sensors in order to generate collected data including the image data and the sensor data of the asset data, including temporarily storing of collected and/or processed portions of the asset data prior to sending the selected data to the one or more servers over the communications network; transmitting the selected data to the one or more servers, and for receiving collection and/or processing instructions and updates from the one or more servers; working in conjunction with one or more asset databases for the collection of the asset data of one or more assets and their geolocation as well as at least one image processing function and at least one data pruning function; performing the at least one image processing function for generating derived data from the digital images; performing the at least one data pruning function for optimizing an amount of at least one of the image data, the sensor data and the derived data; and making at least some of the selected data available to a user through an interface.

BRIEF DESCRIPTION OF DRAWINGS

Exemplary embodiments of the invention can now be described in conjunction with the following drawings by way of example only, in which.

DETAILED DESCRIPTION

Figure 1:
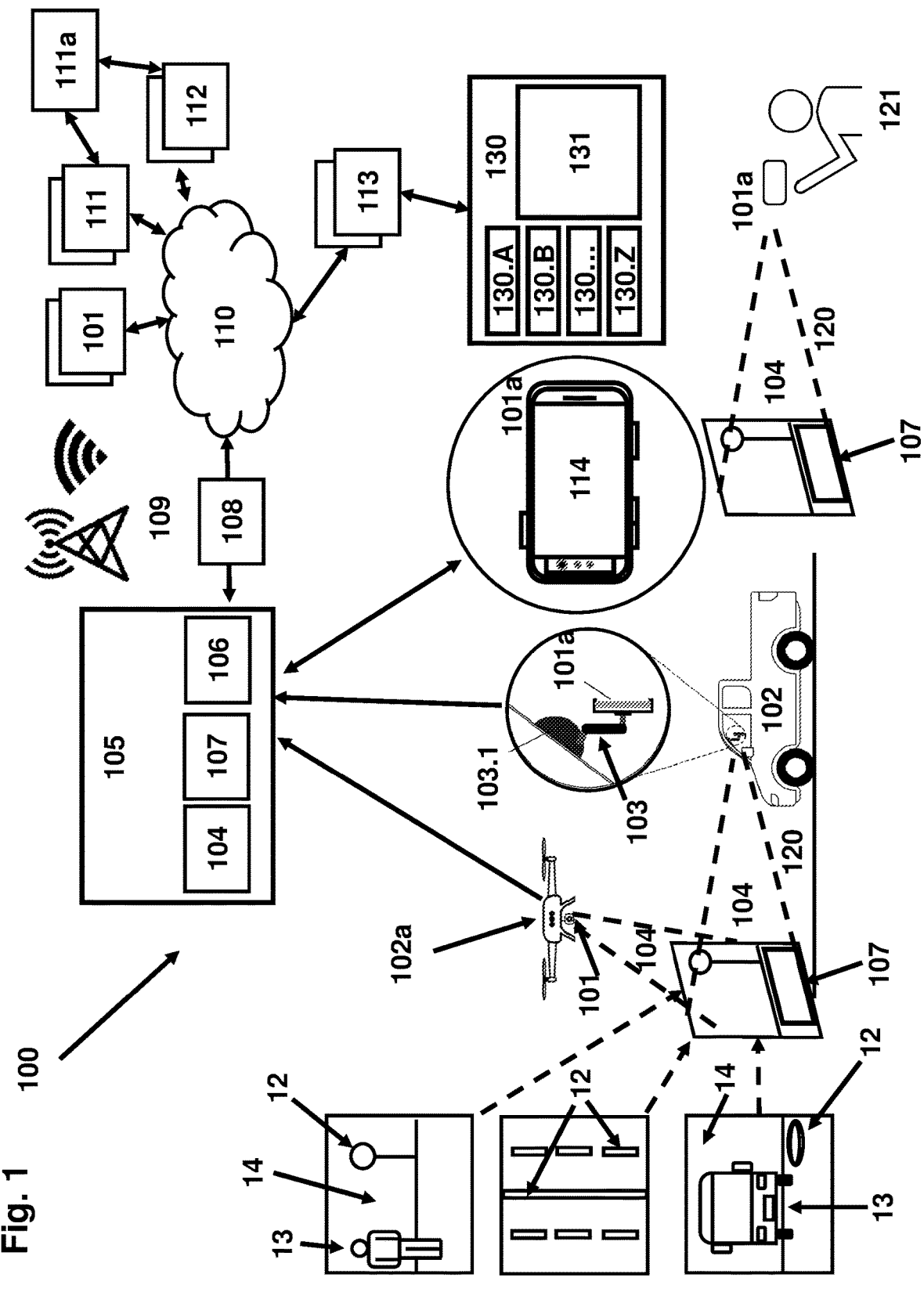
FIG. 1 depicts a system of a vehicle mounted device or handheld device for inspecting road and infrastructure assets using smart data capture.

Referring to FIG. 1, system 100 including a data acquisition device 101 which can be mounted internally or externally on a surface based vehicle 102 (whether manually controlled, remote controlled, autonomous or semi-autonomous, and whether water or land), or on an aerial based vehicle 102a (whether manually controlled, remote controlled, autonomous or semi-autonomous) such as but not limited to a drone, or operated in a handheld 121 manner.

Collected data 104, 107, 106, 108 (via the device 101) can be stored on the device 101 before being sent to remote servers 111, 112, some or all of which the data 104, 107, 106, 108 can be stored in a storage 111 remote from the device 101 (e.g. after processing via a pruning function Z as further discussed below). The remote servers 111 can store asset information associated with the data 104, 107, 106, 108, asset information (of asset(s) 12) such as but not limited to location, images, asset type, descriptors, identification tags, text descriptions, GIS data and other fields, properties or data related to the assets 12 contained in the data 104, 107, 106, 108. The data 104, 107, 106, 108 can reside solely in remote dedicated servers 111 or as part of distributed integrated services that store and process information. The selected data 108 (as further discussed below) can come from one device 101 or multiple devices 101 as communicated from the device(s) 101 over a network 110, for example. Data such as GIS data, asset data can be provided to a single or multiple devices 101 from a single remote server or multiple servers 111, 112 as communicated from the server(s) 111,112 over the network 110, for example. Collected data 104, 107, 106, 108 can be different types of data pertaining to asset(s) 12 as further discussed below.

Vehicle 102 can be, by example a surface based vehicle such as a car, truck, SUV, locomotive, utility vehicle, snow plow, waste management vehicle, street sweeper, vacuum vehicle, delivery vehicle, golf cart, motor cycle, e-bike, bicycle, bus, taxi, public transit vehicle, surveying vehicle, emergency vehicle, military vehicle, and other vehicles which may have specialized or general functions.

The aerial vehicle 102a can be a drone, for example, an aerial drone (which can have for example, wings, propellers, blades and other components aimed at providing aerial takeoff, travel and landing capabilities). The surface based vehicle 102 could also be, for example, a boat or a vessel, aimed at traversing water (whether freshwater, salt water, or both), and at different types of water bodies (rivers, lakes, sea, ocean, or combination hereof). The surface based vehicle 102 could also be, for example, a drone or a robot equipped to travel on surface/ground, whether equipped with wheels, tracks, or limbs. The robot may travel on roads, trails, sidewalks and other surfaces such as water surfaces. It is acknowledge the drone(s) could be operated autonomously, semi-autonomously, remotely (using a remote control application or device), or a combination thereof.

The system 100 operations and configuration is advantageously directed to asset 12 management and maintenance for automating aspects of identification, recording, monitoring and assessing the condition of infrastructure and assets 12, using selective data collection and processing, involving the device 101, camera 101a, network 110 and server(s) 111,112, as further discussed below.

Example Devices 101/Cameras 101a

The device 101 can have different programming depending on the method of deployment, and assets inspected. The device 101 can be mounted in various manners. For example, the device 101 could be mounted in the vehicle 102,102a with mounting support/component 103. The mounting component 103 can be affixed to the windshield or to the body of the vehicle 102,102a using a suction cup, adhesive, magnet, screws, bolts, clasps, and/or mechanical docking device or attachment system 103.1. The mounting component 103, can optionally include a docking system 103.1. The Device 101 can be either easily removed to facilitate transfer of device 101 to different vehicles 102, 102a or secured in place, making it specific to a particular vehicle 102,102a or fixture. The device 101 can be attached either internally or externally to the vehicle 102,102a. It is also recognized that the preferred viewing angle of an asset 12 can vary depending on different aspects, such as the vehicle (or the manner it is held), the height at which it is mounted, the position of the asset 12 in relation to a camera 101a, and other factors. As such, it is recognized that in some instances, more than one device 101 can be mounted in one or more vehicles 102, 102a (or fixtures) in one or more mounting 103 configurations to ensure adequate coverage of one or more assets 12 and/or asset 12 types. The device 101 can have different programming depending on its mounting type, position and/or orientation.

The device 101 can be smartphone 101, a camera 101a, or embedded platform 101. The device 101 can have at least 1 camera or multiple cameras 101a or can be the camera 101a itself (e.g. the camera 101a can be part of the device 101). The device 101 can comprise of multiple cameras 101a with different focal lengths, image sensors and functions. The device 101 can have multiple sensors (internal and/or external) such as but not limited to accelerometers, gyroscopes, motion sensors, GPS/GNSS sensors, LIDAR, RADAR, and other sensors applicable to the invention. The device 101 can also have one or more instances of the same sensor type.

The device 101,101a can be operated autonomously, semi-autonomously or manually. It is acknowledged that the device 101,101a may have different variations and configurations to be used in different settings.

The device 101,101a can be powered by a dedicated power source, a battery, a renewable power source, a power generating source, or other methods. It is anticipated that whichever object the device 101,101a is mounted to, it would include the purpose of inspecting and/or collecting data in relation to assets.

The device 101 sensor(s) 107 could detect, for example, date and time, location (such as GPS/GNSS), device 101 operating environment settings, motion, and orientation. The device 101 can capture image data 104 and sensor data 107 collectively. The device 101 can be operated, for example, while attached to a vehicle, where the vehicle drives/flies along roadway 120 and the device 101 captures image data 104 and sensor data 107. The device 101 could also be operated by a person 121 in a handheld manner 121 to capture an image 104 and corresponding sensor data 107. Similarly, this could take place from a drones, boats, or robots. The collected image 104 and sensor 107 data from device 101 creates a collection of one or more data points or snapshots about that specific geographical location including asset 12 information associated with that geographical location(s) related to the roadway 120. It is also recognized that the roadway 120 could be defined as a body of water, such that the vehicle 102,102*a* travels adjacent to the shoreline of the body of water and therefore the assets 12 are located also on or adjacent to the shoreline. The assets could also be in the water and away from the shoreline (for example, windmills).

In some embodiments, the device 101 could be detachable such that it could be disconnected from a vehicle 102, 102*a* and also used in a handheld manner, for example, such that the device 101 is a smartphone or smart camera 101*a* loaded with the appropriate software. In other embodiments, the device 101 hardware and software can vary between use case to use case. For example, a handheld device 101 can have substantially different hardware and/or software from a device 101 for vehicle 102, 102*a* deployment. The inspector 121 can then take image 104 and sensor 107 readings guided by application software 105 (e.g. resident on the device 101, camera 101*a* and/or stored on the server(s) 111,112). This process can be guided (for example, by providing a viewport and/or otherwise by providing audio and/or visual instructions/notifications) or unguided (for example, simply pointing the device 101 at the asset 12 and the capture is done automatically). It can also be manual where the person manually aims the device 101 at the asset 12 and takes a picture, after which the processing begins. The person 121 can review the images 104 and confirm the results processed. The review process could take place directly on the device 101, using its software 105, or on server 110 accessed by a client application 113 cooperating with the software 105.

In view of the above, the term device 101 and camera 101*a* can be used interchangeably, e.g. device 101, camera 101, device 101*a*, camera 101*a*, etc.

The device 101 is capable of onboard data processing by using software collection 105 of image 104 and sensor data 107 in conjunction with server data (in database 111*a*). The data processing is performed by the device's 101 software 105 which contains preferably at least one installed Artificial Intelligence module. Data processing via the software 105 of the image data 104 and sensor data 107 can create new information on the device 101 and image 104/sensor 107 meta data 106. The new data 106 (e.g. also referred to as processed data 106) can be processed in conjunction with server data and/or local device 101 data. Communication data 110 refers to selected data 108 that can be sent between the server(s) 111 and device(s) 101. The selected data 108 can be sent in either direction over the network 110. The communications can be optimized for the asset inspection functions and can use, in different embodiments, some or all of the following principals: push, pull, publish-subscribe, reliable, unreliable, ordered, unordered, lossy, lossless, encrypted, unencrypted, and/or throttled. For greater clarity, depending on the implementation, the communication data

108 could also be sent between device(s) 101 to device(s) 101, between device(s) 111 to server(s) 111, between server (s) 111 to device(s) 101, between server(s) 111 to server(s) 111, 112, between server(s) 111 to client(s) 113 (and vice versa), between a client 113 and a device 101, or a combination thereof over the network 110.

Additionally, the smart capture device 101 can receive information 108 from remote data repositories 112 and other servers 111 through the network 110. Communication between computing device 101 and other system components 101, 111, 112, 113 can happen over cellular networks 109, Wi-Fi networks 109, satellite connection 109, or other standardized data transmission connections 109. Selected data 108 can be encrypted before transmission, during transmission, and at rest. Selected data 108 can also be compressed before transmission, during transmission, and at rest.

Data 104, 107, 106, 108 can be stored on the device 101 before being sent to remote servers 111, 112. The remote servers 111 can store asset information, such as but not limited to location, images, asset type, descriptors, identification tags, text descriptions, GIS data and other fields, properties or data related to the asset 12. The data may reside solely in remote dedicated servers 111 or as part of distributed integrated services that store and process information. The selected data 108 can come from one device 101 or multiple devices 101. Data such as GIS data, asset data can be provided to a single of multiple device 101 from a single remote server or multiple servers 111, 112.

The device 101 can also have a user interface 114. For example, in the event that the device 101 is manually operated by an inspector 121, or an inspector driving a vehicle 102, or to provide the potential capacity to interact with the device 101 using an interface 114, some interface 114 components can be available. Examples of interface components can include navigation screen, camera view port, buttons, lists, text, maps, indicators, menus, and other common UI components 114. It is recognized that in different configurations and in different use cases some, all or none of the UI components 114 may be available on the device 101. For example, in a public setting, the device 101 UI components may be disable by software functions or inaccessible through hardware. In another embodiment, where trained staff is operating the device, UI components 114 can be available. It is recognized that the device 101 can have different embodiments for different applications, for example, vehicle 102 mounted or handheld 112. As such, the configuration of the device 101 (for example, mechanical, material, components, electrical, software, and interfaces) can greatly vary.

The system 100 could be interacted with by a user 121 from a system access interface 130 or a device access interface 114. The system 100 depicts communication of selected data and information 108 from and to the device 101 to the cloud 110 and subsequently to and from various data sources and destinations 111 112 101 130. The system 100 could have a collection of interfaces 130, which can deliver text, visual, audio or any combination thereof to a user. The user interfaces 130 can communicate with the one or more of the system components 101, 111, 112, 130 through the network 110. For example, allowing users to remote into devices 101, review collected data 108 and pruned data 108, 108' on the server 111, synchronize GIS 112, asset 112 and remote servers 111. Information can be accessed over networks 110 through one or more applications 130, integrations with third-party information providers or asset management 112, work management systems 112 or through web browsers 130. The interfaces 130 can reside, be by example a variety of devices such as mobile devices 113, tablets 113, computers 113, mini-computers 113 or any computing platform 113 that can connect to the internet 110 and supports an internet browser 130 and/or application software 130.

Prior to its first use a device 101 may require, in some circumstances, pre-configuration and/or setup steps in order to connect the server 111 or perform its intended functions. The device 101 operating software 105 may also require, in some circumstances, one or more permissions to be enabled to use specific sensors 107 or access specific functions. Some steps and/or permissions can require the manual interaction of a user 121 (for example, staff of the technology company which develops the device 101, an agent, a third party company responsible for it, and/or an end-user). In other circumstances, and for particular steps/permissions, the device 101 could also receive its permissions and configuration from a third party tool or from servers 111, whether direct system servers 111 or third party servers 112. The device 101 can operate as a standalone device 101 or incorporated into a larger data collection and surveying system which can include one or more device(s) 101, one or more server(s) 111, and one or more asset/GIS/third party system(s) 112. In some embodiments, each user can have one or more account(s) with specific or group permissions that would authorize them to access various data resources such as asset GIS database 111a/asset database 111a. Permissions could also be just for one system, for example, for the data collection system 111, for the system 111 and various components (111, 112, 101, 113), for user interface components 130, or otherwise.

Access control can allow only specific users or types of user to interact with data, resources or controls. The access to any resource can occur through a human machine interface 130. Interaction with the data and data resources can be facilitated by client functions 301. Additionally, different interfaces 130, may be optimized in look and functionality 130.A, 130.B, 130 . . . , 130.Z to support the execution of tasks given user permissions. Similarly, a user 112 or an organization (not shown) can only be provided access to an applicable portion of the available system components, data, functions, and/or other resources.

Similarly, the data capture device 101 could also have different interfaces 114 depending on the device's 101 programming and user permissions and those can include, for example, navigation 114, display 114, asset details 114, asset detection 114, work management 114, debugging interface 114, manual request activations 114, options 114, settings 114, reports 114, asset data capture mode 114, issues data capture mode 114, and/or other functions 114 and/or combination thereof.

Example Server(s) 111,112

The server(s) 111,112 could perform one or more functions, for example, such as storage, application, processing, databases, backup, archive, load balancing, search, indexing, reports, presentation, updates, bulk operations, monitoring, pushing/receiving data and other common server functions. The server(s), instances and/or functions thereof can be segmented physically (for example, on different machines or different locations, on different hard drives, or other physical segments), virtually (for example, using virtualization technology on one or more operating system, physical machines, or across multiple machines, in one or more data centers, or other virtual segmentation), functionally (by type of database, vendor, operating system, web server, application, database, backups, short term storage, archive and other functions) or logically (by files, databases, tables, organizations, regionally, or any other logical parameters). The system can have one or more embodiment(s) that can be configured in different manners. Similarly, the system can have different methods of and levels of access control for different user types (or user roles), such as development team members, system administrators, power users, IT, support, as well as end-users. The system 100 can provide multi-tenant functions on the system level 100, the server level 111, and/or the end-user level. The end-users and their organization can also be segmented logically and/or physically using configuration parameters of the system 100. The end users can also provide a multi-tenant environment for example based on one or more organization(s), role(s), or department(s). Access control methods can be programmed in various levels, for example, such as on the system level, hosting level, server level, application level, organization level, and user level. The security implementation can follow information security best practices, as required by the different users which use the system.

Example System 100 Configuration

Figure 1A:
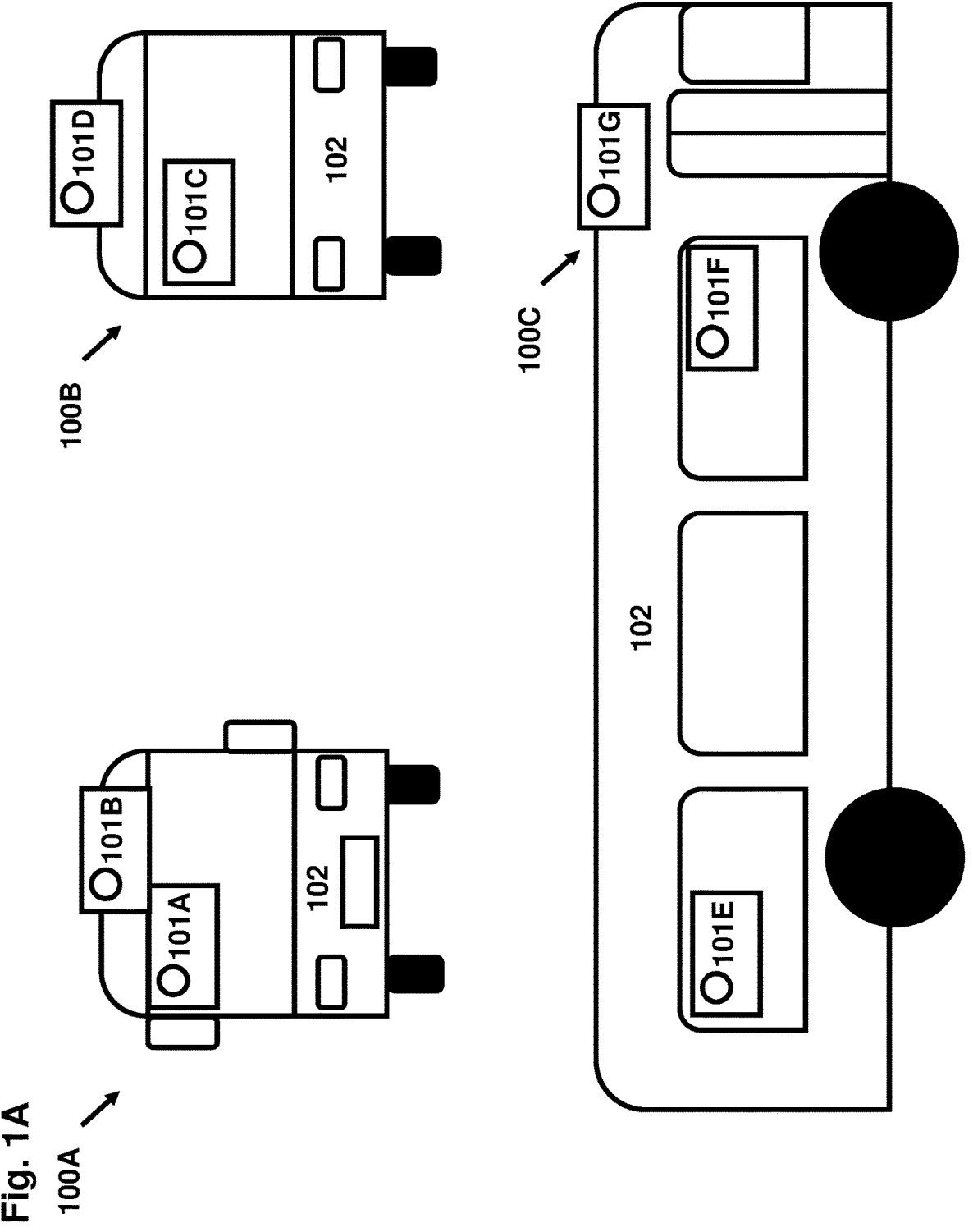
FIG. 1A depicts an example of one or more smart data capture devices mounted inside and/or outside a vehicle for inspecting road and infrastructure assets using smart data capture device of the system of FIG. 1.

Referring to FIG. 1 and FIG. 1A, while it is recognized that one or more device(s) 101 could be deployed on different types of vehicles 102,102a drones and even fixtures, we depict a sample embodiment in which a device 101 is mounted in a bus vehicle 102 by example only. In said embodiment, one or more device(s) 101 can be mounted on a bus 102. The device 101 for example, could be mounted in the front 100A of the bus 102 interior 101A. When mounted in the front of the bus 102 interior 101A, the device 101 could be affixed to the windshield using means described, or alternatively be affixed to the interior of the bus 102 using the means described previously. The device 101 could also be mounted to the front of the bus 100A exterior. When mounted on the front 100A of the bus 102, the device 101 could face forward towards the road or towards the curb at an angle. Factors such as what the device 101 is inspecting on the bus 102 could determine which way the device 101 is angled. For example, if the device 101A, 101B is inspecting the road and road based assets 12, the device, can face forward 101A or backwards 101B. However, if the device is inspecting bus stops 12, then the device can face the curb at an angle or perpendicular to the stops.

The device 101 for example, could also be mounted in the back 100B of the bus 102 interior 101C. When mounted in the back 100B of the bus 102 interior 101C, the device 101 could be affixed to the windshield, or alternatively be affixed to the interior of the bus 102 using the means described previously. The device 101 could also be mounted to the back 100B of the bus 101D exterior. When mounted on the back 100B of the bus 102, the device 101 could face backwards towards to the road or towards the curb at an angle. Factors such as what the device 101 is inspecting on the bus 102 could determine which way the device 101 is angled. For example, if the device 101C, 101D is inspecting the road and road based assets 12, the device 101C, 101D can face forward. However, if the device is inspecting bus stations 12, then the device can face the curb at an angle or perpendicular to the curb.

The device 101 for example, could also be mounted in the side 100C of the bus 102 interior, whether in the side front 101F or side back 101E. When mounted in the side 101E, 101F of the bus 102 interior 101C, the device 101 could be affixed to the window, or alternatively be affixed to the interior of the bus 102 using the means described previously. The device 101 could also be mounted to the side 100C of the bus 101G exterior. When mounted on the side 100C of the bus 102, the device 101 could face towards the curb. Factors such as what the device 101 is inspecting and the bus 102 configuration could determine which way the device 101 is angled. For example, the device mounting locations 101E, 101F, 101G could be perfectly centered to maximize coverage of a bus station asset 12 and its amenities. The device mounting locations 101E, 101F, 101G could also be titled slightly forward or backward to better capture the sides of the bus station 12 amenities 12. It is recognized that one bus 102 could have multiple devices 101 aimed at capturing assets 12 from different angles, and as such, the device mounting locations 101A, 101B, 101C, 101D, 101E, 101F, 101G can have the device(s) 101 installed in different locations and at different angles. It is also recognized that in a mass deployment setting, different buses 102 can have one or more devices 101 installed in one or more angles. This can be, for example, due to different buses 102 can have different mounting settings due to the variety of the bus 102 configurations. It can also be multiple instances of the same bus 102 configured to collect data in relation to one or more assets 12 from one or more angles from the different mounting locations 101A, 101B, 101C, 101D, 101E, 101F, 101G.

It is recognized the position and number of cameras 101 are for illustration purposes only and may vary depending on a variety of factors. It is also recognized the cameras 101 can have different hardware configurations depending on indoor/outdoor use, temporary/permanent mounting, and different camera/lens options for varying fields of view. It is also recognized that the cameras 101 software 105, including configuration, software revisions/branches, settings, database entries, AI models and workflows, and other software components and files.

Similar examples used to describe FIG. 1A could also be used to describe installation of the device 101 on different vehicle 102, 102a type, on different drone types, or even in a fixed indoor or outdoor setting.

Example Device 101 Operating Environments

Figure 1B:
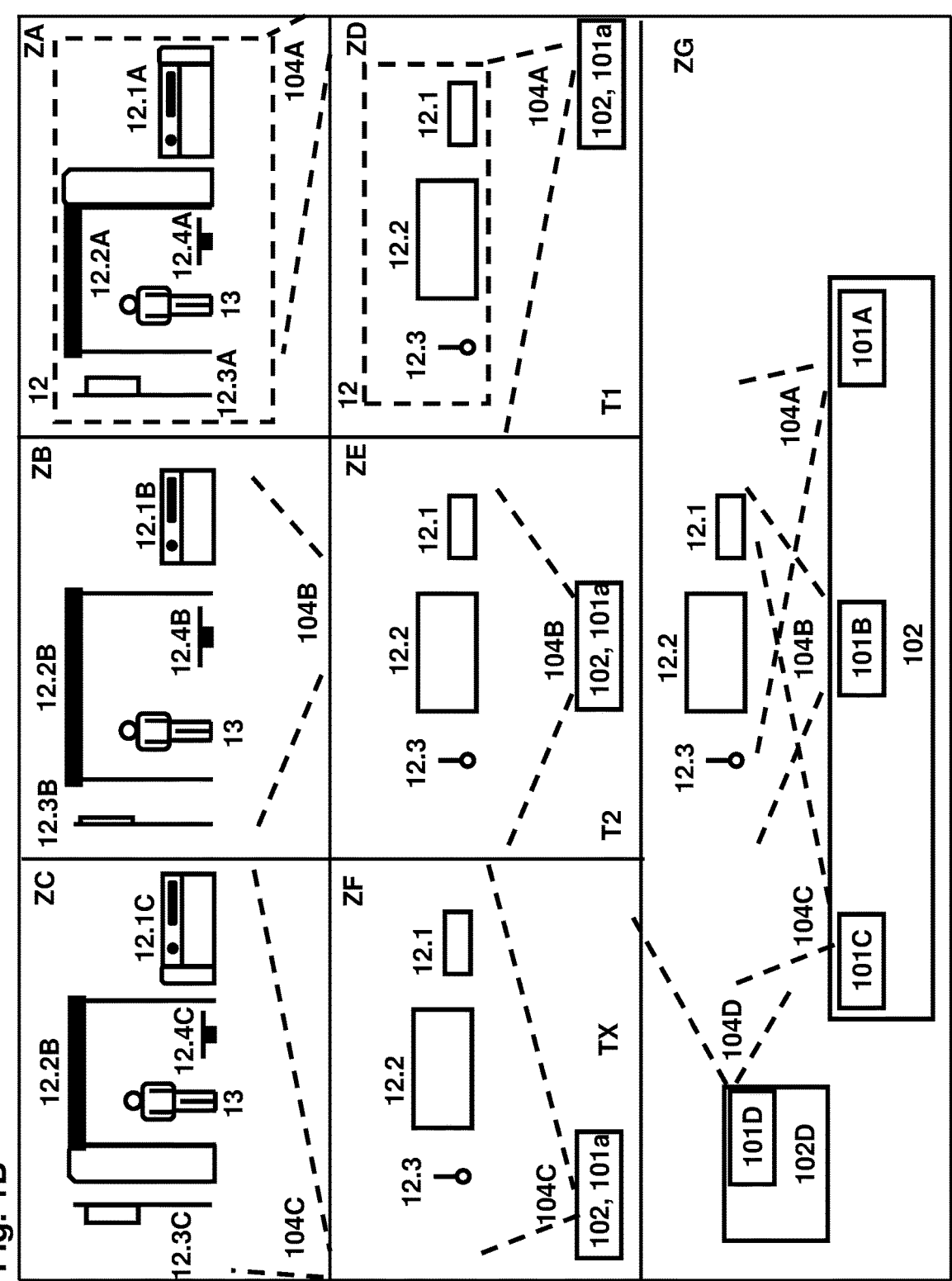
FIG. 1B depicts examples of one or more smart data capture devices in one or more vehicles collecting data of one or more assets from one or more perspectives of the system of FIG. 1.

Referring to FIG. 1 and FIG. 1B, we depict a plurality of sample conditions in which one or more device(s) 101 can be deployed in one or more vehicle(s) 102 to inspect assets 12 in one or more times T1, T2, TX. In the examples provided more specifically in FIG. 1B, we have assets 12 types which are associated with a bus station 12. The label 12 can be applicable to any object 12 (e.g. assets 12) contained in an image 104. The words images 104 and perspectives 104 (e.g. an image taken from a certain angle/orientation) are used interchangeably however it is recognized that an image 104 once processed by the device's 101 software 105 and subsequently by the server 111 and its software can be modified in a plurality of ways (for example, cropping, scaling, zooming, de-warping, redacting, and other image processing or discarding operations). Assets 12 can be further grouped, sub-divided or related to other assets 12, and processed in one or more images 104. The asset 12 types in our example can be a garbage bin 12.1, a bus shelter 12.2 and a sign 12.3, which can all be related to a larger asset 12 being a transit stop 12. For greater clarity, each object (of interest) 12 pertaining to an asset 12 is not necessarily the same for each bus station 12, for example some bus stations can include only a sign 12.3 whereas other can include a shelter 12.2 and a sign 12.3, or a sign 12.3 and a bin 12.2. The same asset type (for example) can also vary, whereas a transit stop sign 12.3 can be mounted on a metal pole in some stations, or the sign 12.3 could be mounted on a wooden power line pole in another. The computer vision related software 105 aspect of the innovation helps to visually identify the appropriate asset(s) 12, 12.1, 12.2, 12.3 using inference based on datasets used to train AI models which facilitate it to label the detected class and to localize it according to its programming, and match it, using its programming 105 to an asset based on its database 111a (the process of which is explained further below).

FIG. 1B illustrations ZA, ZB, ZC represent different image perspectives 104 captured by device(s) 101. Illustrations ZD, ZE, ZF refer to an aerial view (i.e. as shown on a map) of vehicle(s) 102,102a equipped with device(s) 101 capturing images 104A, 104B, 104C of the same object 12, 12.1, 12.2, 12.3, 12.4 from different positions and/or orientations 104A, 104B, 104C. For ZD, ZE, ZF it is recognized that in this example aerial view is simply to show how different perspectives 104A, 104B, 104C can cover different angles/perspectives of same assets 12, 12.1, 12.2, 12.3, 12.4. However, it could also be that the images 104A, 104B, 104C are captured by aerial vehicles 102a in other examples. The vehicle(s) 102 perspective 104A, 104B, 104C, in relation to the assets 12, 12.1, 12.2, 12.3, 12.4, can be away, facing, facing at an angle, turning onto, or turning away, driving by, passing by, or any other relative or absolute perspective 104 in which a device 101 mounted on a vehicle 102 can view 104 the assets 12, 12.1, 12.2, 12.3, 12.4. It is recognized that the same asset 12 in different orientations 104A, 104B, 104C can display different conditions and properties. For example, a waste bin 12.1 can be determined to be in good condition from perspective 104A in which its one side 12.1A is shown, and in good condition from field of view 104B in which its front 12.1B looks to be in good order, but in a third perspective 104C it could be determined, for example, that its side 12.1C is damaged or vandalized. It is also recognized that not all properties or assets are visible from all perspectives 104A, 104B, and 104C. For example, a bus sign 12.3 may not be not be visible when the bus station 12 is faced from a perpendicular perspective 104B to the station 12 (and only the post is clearly visible), whereas the sign 12.3A, 12.3C would be better visible from a side perspective 104A, 104C. It is also recognized that the properties/objects 12.1, 12.2, 12.3 contained within another object 12 can be further nested. For example, a bench 12.4 object can be nested inside a shelter 12.3 object, which can be nested inside a station 12 object.

Asset object 12 relationships can vary based on different factors, such as the asset databases 111a structures and based on the image processing workflows 105 and device's 101 programming. Computer vision 105 processing and GIS asset matching of the objects can fully take place in the device 101, fully take place on the server 111, partially take place on the device 101, partially take place on the server 111, or any partial/full processing combination on both the device 101 and the server 111.

The device 101 can simply be programmed to capture one or more image(s) 104A, 104B, 104C in proximity of the asset 12 based on the geospatial location 107 of the vehicle 102/device 101 without relying on image processing. It can also use other sensor positional information 107 in relation to the device's 101 orientation (for example, using compass, direction, navigation, positional, rotational, gyroscope, accelerometer or other sensors 107) in relation to the asset 12 for image 104 capture.

Alternatively, the device 101 can detect objects of interest 12 using image processing to be stored in memory for later matching with assets 12. This can take place on the device 101, the server 111, or a combination thereof with a specific asset record. The images 104A, 104B, 104C capture can also use both geospatial positioning and image analysis (as further described below), on the device 101, the server 111, or a combination thereof. It is recognized that the same assets 12 can be captured by one or more devices 101, in one or more dates/times, across one or more vehicles 102, and in one or more perspectives 104A, 104B, 104C. Referring to illustration ZG, one vehicle 102 (for example, a bus) can be equipped with one or more devices (3 devices 101 in the sample pictures, but can be also one or more devices-101). In said example, one vehicle 102 can simultaneously capture different perspectives of assets 12, 12.1, 12.2, 12.3 at the same time. Similarly, other vehicles 102 equipped with devices 101 can also inspect the assets 12, 12.1, 12.2, 12.3 from different perspectives 104D. It is further recognized that images 104A, 104B, 104C containing object with personal information 13 (such as a person/face, vehicle/ license plate, or a home/window) could be redacted using the device 101 programming, the server 111 programming, or a combination thereof.

It is also recognized that areas outside of the region of interest 12 for the objects, for example bus station 12, could be blurred in full. It is recognized that one or more images 104A, 104B, 104C of an asset can be captured by one or more devices 101, in one or more vehicles 102, in one or more trips, at different times T1, T2, TX.

Example Image 104 Capture/Processing

Figure 1C:
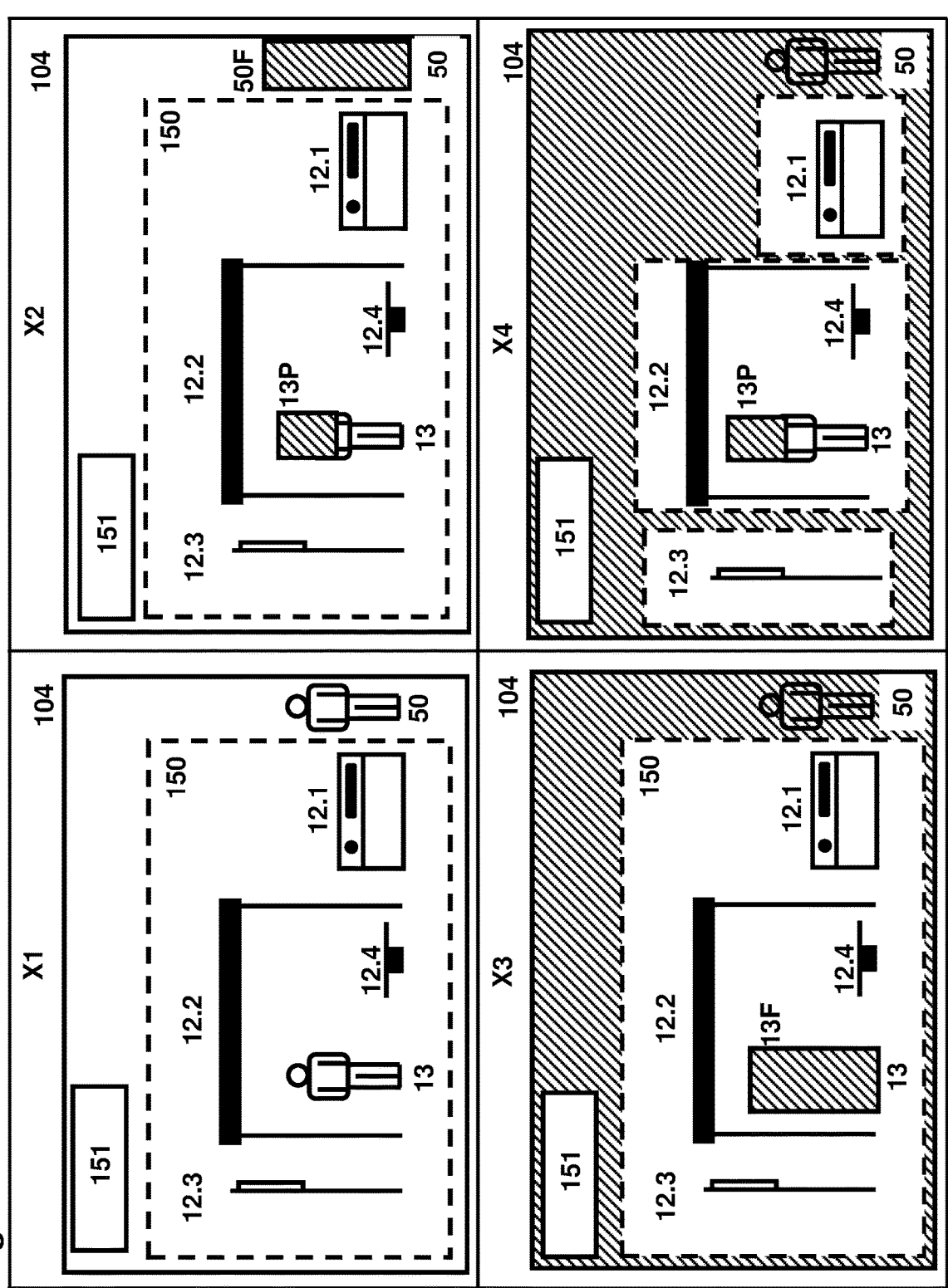
FIG. 1C depicts examples of different redaction methods to redact images containing assets, personal information, and background of the system of FIG. 1.

Referring to FIG. 1C, we depict an original X1 image 104 and sample image processing operations X2, X3, X4 aimed to redact and/or discard image information. Illustration X1 depicts an original image 104 with one or more assets 12 such as a waste bin 12.1, bus shelter 12.2, a sign with a post 12.3, and a bench 12.4. The objects of interest 12.1, 12.2, 12.3, 12.4 can also be grouped into a region of interest 150, for example, a bus station 150. For simplicity, we can also refer to a section of the image 104 which does not contain any information of interest, and refer to it as a background 151. It is recognized that some, all, or part of an image 104 can be background 151. It is recognized that some, all or none of the image 104 information be deemed as background 151. For example, an image 104 may not include any assets 12.1, 12.2, 12.3, 12.4 and as such, the whole image 104 can be deemed as background 151. The image 104 information can also include personally identifying information 13, 50 such as people/faces, cars/license plates and houses. When an image 104 is captured, the device 101, server 111 or a combination thereof can use artificial intelligence of the software 105 to detect objects containing personal information 13, 50 and redact them (for example, by blurring, obscuring or pixel substitution). Background information 151 can also be simply excluded by discarding of background information 151 (or conversely, cropping for storage, transmission, and/or further analysis only relevant information 150, 12.1, 12.2, 12.3 portions of image 104). In the sample image X2 a person's 13 face for example, can be blurred 13P, or the whole person 50 could be blurred/pixel substituted 50F.

Referring to image processing operation X3, we can also apply a combination of a background 151 redaction (which can include blurring, pixel substitution and even cropping/ omitting portion of image) which can be useful in redacting larger portions of the images. The region of interest 150, as determined by the AI is generally not redacted, other than objects 12 deemed to contain personal information (for example, a person) 13 which can then be blurred in full 13F or in part. In other embodiments, region of interest 150 also be not present or not detected, and the whole image part 151 not containing assets 12.1, 12.2, 12.3 can then be redacted. In the event that an object 12 containing a personal information 13 is contained in an asset 12.2 of interest, said object 13 can be redacted in part 13P or in full 13F.

It is recognized that the original image X1 could also be fully processed without any redaction, depending on the way the system is configured and/or customer preferences.

Example Device 101 components

Figure 2:
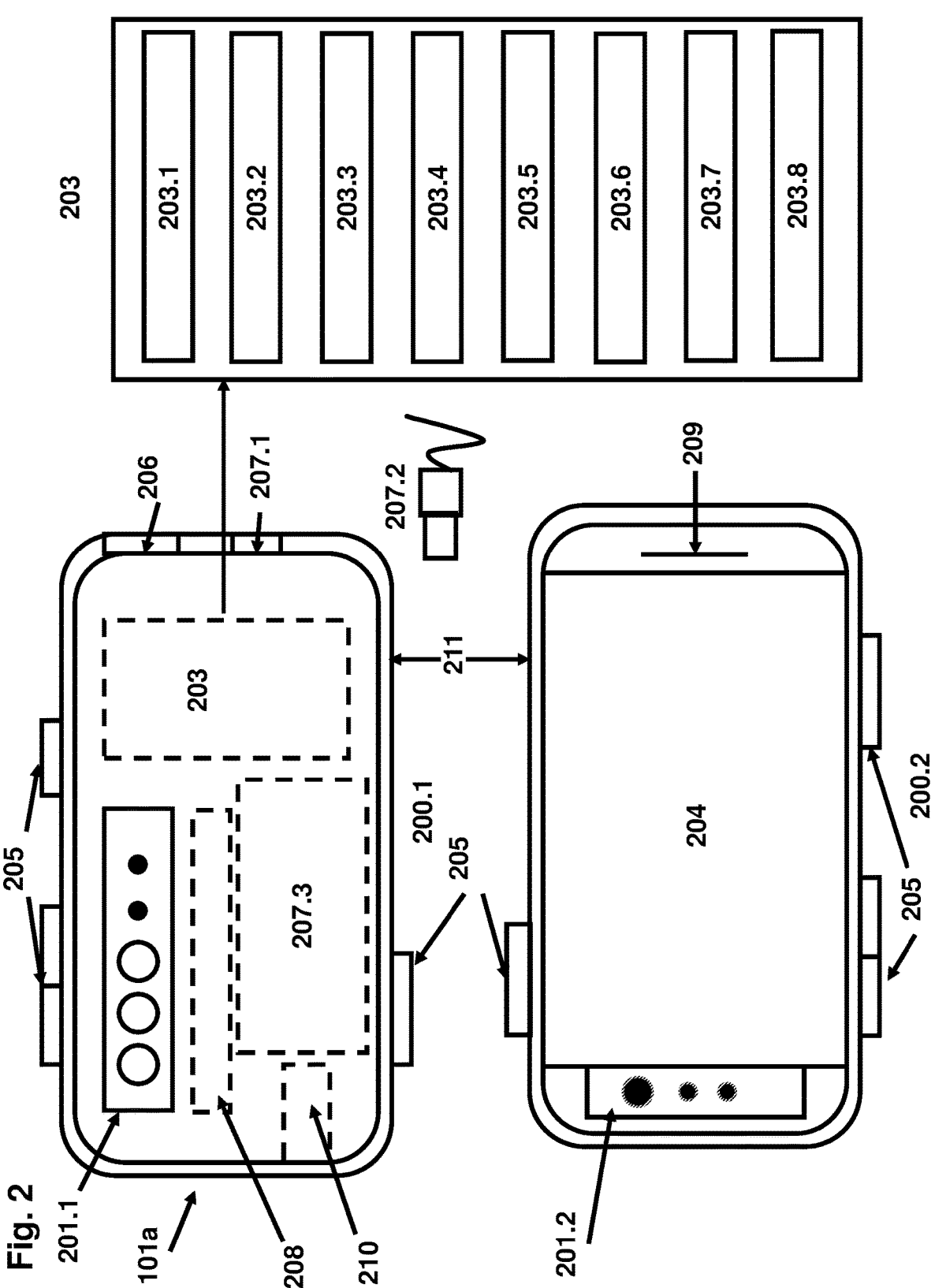
FIG. 2 Depicts an example of a smart data capture device and various related components of the system of FIG. 1.

Referring to FIG. 2, we describe by means of an example the typical components a device 101. The description provides a general description about some major components, but it is recognized that some components can be absent or not used in some applications, whereas other components could be introduced to enhance the functionality of the device 101. While FIG. 2 can seem to depict a smart phone 101, the device 101 could also be a different computing platform.

The device 101 could be, for example, a smart phone 101, a modified smart phone, 101, a smart camera 101, or an embedded computing platform 101. The device 101 could be contained within one or more shell/enclosure(s) 211 which can be in one part or divided into several parts held together by screws, adhesives or other attaching components. A device 101 can also have a screen 204, microphone 209, front facing camera 201.2 and back facing camera 201.1, and/or speaker 206.

The device 101 can contain many components and sensors. There are internal sensors which detect conditions and control components in smart device 101. For example, autofocus sensors, rotational vector sensors, camera elements positioning and other components essential for operation of smart camera capabilities of the device 101. There could also be sensors that gather data about the environment external to the device 101 for example image sensors, GPS sensors, ambient light sensors, proximity sensors, accelerometers, time of flight sensors, temperature sensors, and other sensors which can be integrated to the device 101 internally or externally. The device 101 components and sensors for example could be mounted on one or more electronic boards 203/components 203. The circuit board(s) 203 could be a motherboard 203, or a motherboard 203 functionality expanded with one daughter board 203 or otherwise several boards 203 working on conjunction. The device 101, and its board(s) 203 can contain several types of data storage in combination with one or more types of memory(s) 203.1. The memory(s) 203.1 could be used for a variety of software tasks, for example, used to store software instructions, for the application, store data for processing, temporarily store information from databases and store information post processing prior to data transmission to the servers 110. The memory components 203.1 could be volatile, non-volatile, or a combination thereof (one or more memory(s) of one or more types for redundant or different functional purposes). The device 101 can have at least one processor 203.2, for example, a Central Processing Unit (CPU). The device can also have one or more graphics processing units (GPU) 203.7. The processor(s) 203.2, 203.7 can have different rated speeds, power consumption and performance. The device 101 can also determine its position with the use of a location module 203.3 such as GPS/GNSS. The device 101 can also have other positional modules 203.4 such as accelerometers that quantify motion in terms of acceleration, velocity and distance along one or more axes in space. Additionally, the device 101 can estimate its orientation in space as a combination of an angle and an axis with a rotational vector sensor 203.8, magnetometers 203.5, gyroscope (not shown) or a combination thereof. It 101 can also communicate with various services by utilizing different parts of the electromagnetic spectrum. To accomplish this, the device can use one or more network interface module(s) 203.6. The network interface module(s) 203.6 can be standalone with an internal or external antenna 208 which is used to transmit and receive external signals. One or more of the network modules 203.6 can be residing inside the enclosure 211, outside the enclosure 211, or a combination thereof. Similarly, One or more of the antenna(s) 208 can be residing inside the enclosure 211, outside the enclosure 211, or a combination thereof.

The invention aims to capture image data 104, or properties that can be extracted from image data in relation to assets 12. For greater clarity, image data 104 can mean one or more of the following: (a) still images; (b) a sequence of images; (c) video clips; (d) or videos. As such, the device 101 has at least one camera 201.1. Depending on the device 101 configuration and application, the camera(s) 201.1, 201.2 can face forward, backwards, or in any direction. They can be internal to the device 101, external to it, or a combination thereof. The camera(s) 201.1, 201.2 can be oriented with the device 101, independently of the device 101, or a combination thereof. The device 101 can have a specialized camera component, 201.1, or may have a set of camera(s) 201.1 and related components (for example, flash, time of flight, IR illuminator, or other related components), whether integrated or separate. The cameras 201.1, 201.2 can be of various types and work together or independently of each other to capture images. The cameras 201.1, 201.2 can have various optics, various lens (whether vari-focal, fixed, or adjustable), various sensors, various accessories (such as polarizers, shrouds, hoods, mirrors and/or other accessories), various capture rates (images per second), various attachments (optical, mechanical and/or electrical), various lighting sources, and other camera or camera related options. Examples of camera 201.1, 201.2 image sensors (which can include combination different combinations of software, hardware and lens) are wide angle, ultra-wide angle, telephoto, periscope, monochrome, and fisheye. This is not an exhaustive list of camera sensor variations and it is meant to illustrate the various image capture functions, field of view and capabilities that users may desire. It is recognized that depending on various environmental factors, such as the camera mounting, camera enclosure, proximity to asset, angle of travel, lighting, material, and other factors can result on one or more camera variations for one or more assets. Additional components, for example a flash component may also be present. Image data can be captured in other parts of the electromagnetic spectrum, not visible to the human eye, for example the time-of-flight sensor, generally not solely operate in the near infrared region of the electromagnetic spectrum and capture distance data which is then used in developing 3D models or separating the foreground from the background in specific picture modes. The cameras 201.1, 201.2 could be the right sensors and lens also collect data in the non-visible light spectrums. Other examples of camera 201.1, 201.2 functions can include image stabilization functions, or the ability to process one or more image/video streams from one or more cameras 201.1, 201.2 simultaneously. This could be with or without the assistance of active or passive light emitters. It is recognized that in some embodiments, the device 101 also provide CCTV system functions (for example, a bus surveillance system) that also performs inspection and/or data collection functions on transit assets 12. It is also recognized that in some embodiments, the device 101 can also perform dash camera functions, recording footage or images of a drive for insurance or liability purposes. It is also recognized that in some embodiments the device 101 can also perform advanced driver assistance functions.

Depending on the device's 101 use case, there could be a requirement for a human operator to interact with the device 101 (for example, to install it, calibrate it, or even operate it in some instances). The device 101 can have a display 204, and the display 204 can have touchscreen functionality. The device 101 can also have a speaker 206 and microphone 209 to facilitate communication of aural and verbal information respectively. The device 101 can have a voice-to-text and text-to-voice functions which would facilitate an operator providing hands-free instructions to the device 101, or the device 101 communicating alerts or notifications to the human operator. The speaker 206 could also generate sounds for notifications. As discussed otherwise, some embodiments of the device 101 (for example, smart phones, tablets, or similar computing devices) can have the components integrated, whereas other devices 101 embodiments, for example, an embedded system, or a custom made camera, can have the option to include these components as internal or external add-ons depending on the configuration or design of the device 101. The various hardware components noted in the description noted above and below could also be present (for example, included with the device 101) but not used.

To ensure that device 101 can use a network service to transmit or receive data, which can include, for example raw data, processed data, media, text and voice information, on some networks, subscriber specific information can be required. This information is typically stored as Subscriber Identity Module (SIM) 210 either as a smart card or can be embedded module on the mother board/daughter board 203 inside the device 101. It could also be software based, hardware based, or a combination thereof. It could also be an esim whereas it is already integrated to the device 101.

The device 101 can be powered by an external power source, internal power source, or both. For example, it can be powered by an internal battery 207.3 and/or an external power source delivered by a cable 207.2. The presence of a battery, whether internal or external depends on the device's 101 hardware configuration. The power 207.2 could be used in conjunction with a charging circuit 207.1 or directly power the device 101. The cable 207.2 typically can deliver power. However, it could potentially also support data transfer to other devices and/or components (for example, through USB, Serial interface, or other wired interface) or it could do so through appropriate adapters. In some embodiments, the power 207.2 would also provide a communication interface, whereas in other embodiments, the power and communication interfaces may be through separate connections. The power and/or charging circuit can have many functions such as over voltage or current protection, battery power management, optimized charging functions, support wireless hardware, and/or to support other methods of charging such as using solar energy from external hardware and delivery of power to the embedded computing device 101 directly while the battery charges. The device 101 could have custom electrical circuitry internally and/or externally for other functions as well, for example, in relation to startup, shutdown, receiving inputs and/or switching internal and/or external components on or off.

In some embodiments, voice control of device 101 can be done with the use of microphone 209. Microphone 209 can be used to transmit sound to be processed by processor 203.2. The sound data can be modified, transformed or filtered during processing to organize and categorize the information. The information can then be categorized into device instructions/commands, user voice recordings, or environmental background sound. The information can then be used to trigger commands, be stored in memory 203.1 or transmitted using the network interface 203.6 to servers 110.

Device 101 can also contain, in some embodiments, one or more speaker(s) 206 to provide aural feedback, instructions, warnings, alerts and audio cues. Examples of information that can be relayed but is not limited by example operating status, navigation instructions, error, operating notifications, confirmation of user instructions, and information which is pertaining to inspected/detected assets 12.

The device 101 can contain a display 204 to deliver visual information to the user. Examples of display information are but not limited to mapping and navigation instructions, results of processed visual data on device 101, device status alerts, operating information, and support instructions. The display 204 can be used to interact with the device 101 through single or multi-point touch or combined with camera sensors 201.2 to use hands free gestures. The device 101 can also contain a cover which hides the display 104.

The device 101 can be controlled with physical buttons 205 located on the chassis or under the screen of the device 101. The buttons 205 can be programmed and/or hardwired to execute specific functions such as but not limited to starting device 101, initiating software execution, initiating support functions, controlling the display or speakers, or otherwise interacting with the device 101 to perform one or more tasks.

The computing device 101 can contain all or some of the mentioned components. It can also include additional components. As mentioned, it could be a smartphone 101 or a tablet 101 with some or all of the components built in. Some of the components can also be removed or modified. It could be an embedded device configured with some or all of the components. It could also be a device 101 which has some of the components built in, whereas some or all of the other components are added through external, one or more components. The external components could interface with the device 101 using a variety of interfaces and/or connectivity options such as Bluetooth, Infrared, Wi-Fi, or wired protocols to allow it to connect and communicate with other components.

Example Device 101 Configuration

Referring to FIG. 1, FIG. 1A, and FIG. 2, after installation of the device 101 in vehicle 102, 102a, to a fixture or even carried by hand 121. The smart camera 201.1 could be adjusted to ensure that the visual field is appropriate. The visual angling can be for the device 101, the camera(s) 201.1, 201.2, or a combination thereof. The smart device 101 can, for example, be rotated along all 3 axes of motion, until an image as viewed through screen 204 has an unobstructed view of the area to be inspected (for example, road, sidewalk, bus stop, trail, ground, etc.). Additionally, the view captures the adjacent area where related assets 12 are typically visible. The view can, for example, encompass a single lane, or multiple lanes in either direction of travel. It can also include a side view of the vehicle 102, for example looking sideways through the window to aspect sidewalks, bus shelters, waste bins and/or other off-road items. It could be mounted on a drone, and aimed forward, downward or at an angle. It could be placed permanently or temporarily on a pole for the purpose of inspecting or monitoring the status of an asset 12. It 101 could be hand-held by an inspector and guided for an optimized view. The device 101 can also have functions to automatically lock and/or zoom on certain areas of interest, using its sensors, programming and/or artificial intelligence. In some embodiments the device 101 orientation could be adjusted manually by an operator or through a motor controlled by an operator or the device 101.

The device 101 in different embodiments and/or configurations, can be started in different ways. It can for example, begin operation as smartphone device 101 in a powered off state, button 205 is pressed which begins loading the operating software 105 and data into memory 203.1. On successful completion of this task the user can be notified on display 204 and/or by speaker 206 that the device is ready. The user 121 can also launch an app 105 to begin the service. Alternatively, the device 101 can automatically start when simply plugged in to power, and the device 101 and application 105 can start automatically. The power-on sequence can be fully automated (fully automated operation once powered on), partially automated (for example, one or more steps requiring some user interaction for some steps along the way, for example, pushing buttons, logging in, launching applications, or other user action), or fully manual, meaning the user has to substantially complete a series of steps for the device 101 to operate. Once launched, the device 101 can have one or more modes of operation. Those could be pre-programmed or switched/accessed by a user. For example, data collection mode, selective asset monitoring, job opening, job close out, navigation, area setup, and more. The different modes can also be further configured and/or optimized for the data that is being collected (for example, bus stop data may be different than road data and require different configuration). The device 101, while powered on and if connectivity is available, can check for connectivity 109 to the servers 111 through a network 110 (typically the internet).

The device 101 can receive over the air 109, or through direct connection 207.2 (i.e. USB or other direct interface) software updates to the some or all of the device's 101 software 105. For example, updates to firmware, operating system, application(s) software, configuration, databases, files, AI models, settings, asset information, versions, packages, distributions, libraries, components, and/or other software updates. The updates can be received directly from the system servers 111 and/or through third party systems. For asset information, examples of relevant data can be asset geospatial positions, locations, characteristics and features. The data can be accessed and loaded through direct system server(s) 111, or third party servers 112, such as GIS database 111a or asset information database 111a, directly, or through an intermediate service on the servers 111. The GIS data can include various geospatial shapes used in geographic information systems 111a and other spatial analysis applications of the server(s) 112. Some examples include point(s), line(s), polygon(s), circle(s), rectangle(s), triangle(s), ellipse(s), polyline(s), multipoint(s), multiline (s), multiline-string(s), multi-polygon(s), and other shapes that can be described digitally on a geospatial information system.

After the device's 101 operating software 105 has been loaded into memory 203.1 and the requisite operating environments created, the device operating software can launch the software application 105. The operating software or application software may have extended functionality, for example, to test the quality of sensors, calibrate itself, determine individual components 203, cameras 201.1/201.2 or components of system working status, and other functions which support its intended purpose. The application software 105 can include one or more applications 105 working together, and each application can contain one or more processes, sub-routines, or threads. The application software 105 can, in some embodiments, interact with separate applications, and can change its mode of operations/programming based on various options, such as programmatically, scheduled, or when specific conditions are met. The software 105 can run indefinitely, or alternatively, reset periodically or after certain timeouts to free system resources.

When beginning a survey of assets 12, the device can traverse along a path (for example, in a vehicle 102 along a roadway, in a drone 102*a* flying along a channel, or otherwise a device being mobilized using some sort of machinery, or carried by a person). The device 101 can also perform asset survey from a stationary position. The device 101 collects image data 104 and sensor data 107. The data is processed by software 105 and new information 106 is generated (for example, metadata, derived data, tags, or other information that is generated by the device's 101 software 105). Some of the newly created information 106 can be made into pruned data 108 (using pruning functionality Z) which can ready for transmission 109,110 to server(s) 111,112.

Figure 6:
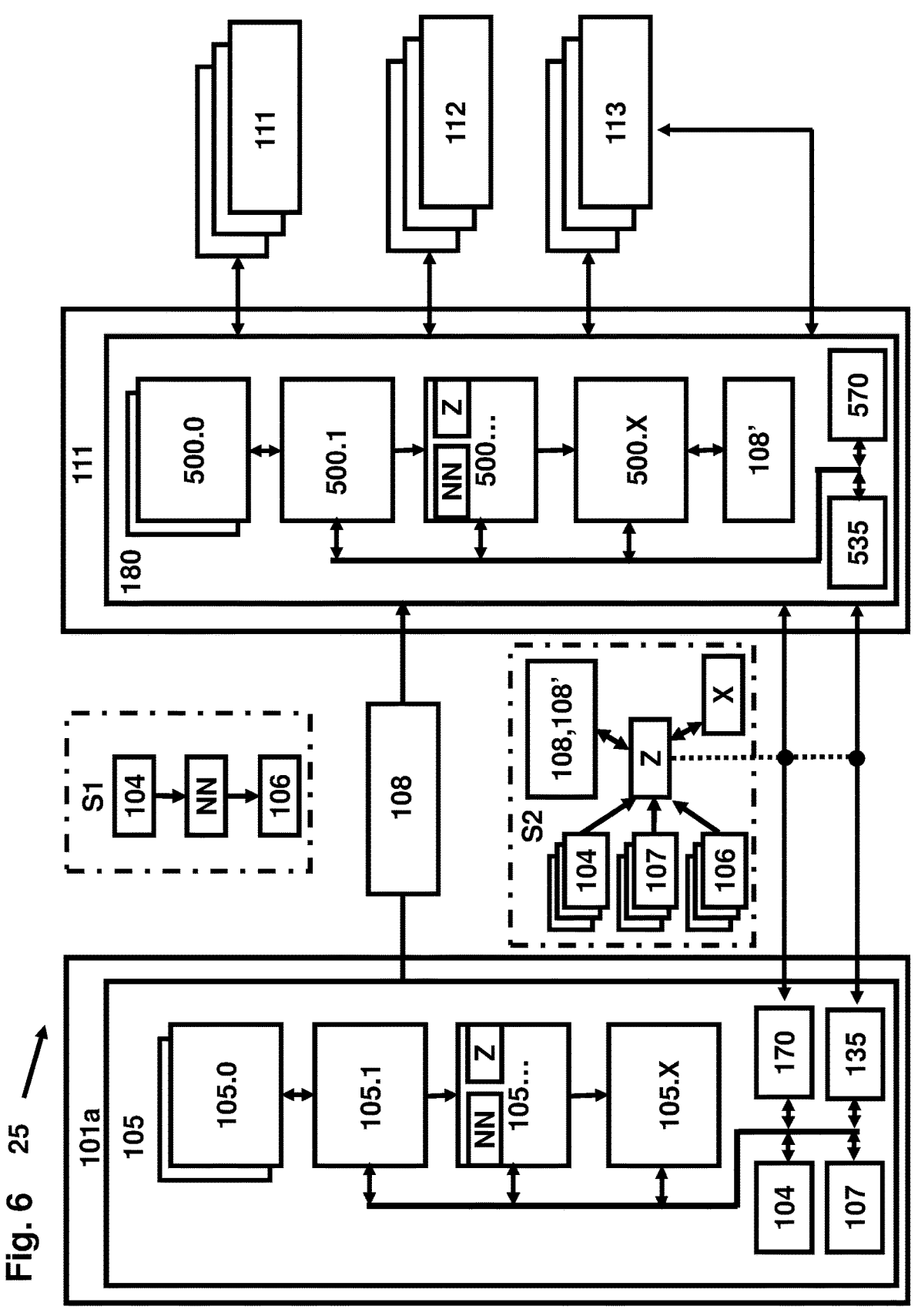
FIG. 6: Depicts further examples of sample workflows taken to prune and select the asset data of the example flow of FIG. 3.

Image 104 Collection, Transmission and Storage Including Asset 12 Information Referring to FIG. 1 and FIG. 6, the system 25 depicts manners in which image data 104 can be processed by the device 101 and server 111, transmission of selected data 108, interaction with other systems 112, and users through interface(s) 113. In the device 101, the image 104 data can be processed by one or more instance(s) of computer vision operations 105.1, 500.1 artificial intelligence analysis 105.1, 500.1 or a combination, sequence or workflow thereof and used to identify assets 12 in images 104. The operations 105.1, 500.1 can take place on the device 101, the server 111 or a combination thereof. The AI/Image Processing 105.1, 500.1 can remove personal identifying information 13, for example vehicles, license plates, people, faces, houses, house numbers and other information that can be considered as personally identifying information from the image data 104. The redaction operations 105.1, 500.1 can take place together with other AI operations (finding redaction objects 13 and objects of interest 12 together in one shot), or separate from other AI operations (different AI models/workflows acting separately on image). This process can alter the original data from the device 101 and creates new image information 106. The modified images 106 can be further processed to create new/pruned data 108 for transmission 110 to the server(s) 111. Image modifications, can include, by example cropping of portions of image data, substituting image data, modifying the resolution of the image data, removing multiple instances of similar data, or performing image altering operations (blur, pixelate, redact, and other similar operations. The server ready data 108 can be uploaded through an available wireless connection 109 to server 111, and update the system servers 111, and related systems 112. The images, whether modified 106 or unmodified 104, once transmitted to the server 111, the uploaded data 108 (images, whether modified 106 or unmodified 104) can be further processed and modified 108' on the server 111.

The system 25 combines artificial intelligence operations 105.1, 500.1 together with GIS data that can reside within the device 101, system servers 111, within third party servers 112 (for example, asset management systems or geospatial systems 111*a*/databases 111*a*) and combination thereof. As such, the system 25, with the appropriate GIS data 135, 535, 111*a*, artificial intelligence image analysis 105.1, 500.1, and device sensor location 107, can collect data 108, inventory assets 12, match assets 12, inspect assets 12, and respectively update the geospatial information 135, 535 in the servers, 111, the system 25 or in a geospatial asset repository

111*a*. Considering that the system 25 simply uses fields and AI models that can be easily adapted, any asset 12 could be supported by the system simply by updating the AI models 105.1/500.1 algorithms and the GIS asset database, whether external 111*a*, integrated to the server 535, on the device 135 or a combination thereof. The GIS asset database 111*a*, or a portion thereof, can also reside on the server 111 and/or the device 101. The database(s) 135, 535, 111*a* could also synchronize with each other. In other embodiments geospatial information 535 can be transferred between different systems 111, 112 using import and/or export functions or files over the network 110. For example, geodatabase, shape files, CSV, excel, or other common file formats used for import/export of geospatial data. It is recognized that some assets information can be imported/exported between the systems 111, 112 and some assets information can be synchronized.

For the purpose of providing some examples of asset 12 types, assets 12 can include: (a) pavement markers, including vertical markers, longitudinal markers, horizontal markers, transversal markers, lane markers, vertical lines, horizontal lines, zig zagged lines, crossed lines, solid lines, patterned lines, dashed lines, double lines, multiple lines, lines of different thickness, lines of different colors, bars, crosswalks, arrows (left, right, forward, backwards, multiarrow), numbers, letters, line drawings (handicap, family, expectant mother), and any other pavement marking of any shape, pattern, color or combination thereof, whether regulatory, warning, informative or decorative; (b) fire hydrants, manholes, grates, basins, pipe access points, access ports, drains, or any other surface based points that provide ingress, egress, and/or access for water, equipment or people to an underground water system, whether for multi-purpose, combined purpose or specific purpose; (c) Trees, gardens, planters, shrubbery, greenery, flowers beds, and otherwise planned, planted vegetation considered an asset under the responsibility of an entity, whether planted in ground or in planters; (d) highways, roads, rails, guardrails, hand rails, tramlines, lanes, trails, bicycle lanes, parking lanes, parking spots, lots, intersections, sidewalks, pads, walkways, trails, easements, right-of-way, and/or other paths (including concrete, asphalt, gravel, aggregate, composite, dirt, or other material and/or a combination thereof) meant to provide a surface for movement of vehicles (of one or more types), equipment, and/or people; (e) curbs, bridges, bridge decks, bridge joists, columns, retaining walls, spalls, tracks, bars, bolts, nuts, panels, cables, wires, anchors, frames, joints, or other road, bridge and/or rail infrastructure, and/or related items thereof; (f) traffic control devices, such as signs (such as regulatory, warning, construction, temporary, informational, or other signs), traffic lights, signaling lights, pedestrian warning systems, and/or other traffic control devices; (g) barriers, barricades, gates, guiderails, fences, bollards, cones, pylons, rocks, and/or other assets meant to restrict or redirect traffic of vehicles (of one or more types) and/or people; (h) various types of poles, such as sign poles, lighting poles, electrical poles, phone poles, telecommunication poles, utility poles, multi-purpose poles, load bearing poles, and/or other poles as well as transformers, boxes, wires, and/or accessories related thereof; (i) cabinets of one or more types, such as cabinets for power distribution, electrical distribution, utility, telecomm equipment, computing equipment, network equipment, communications equipment, control equipment, phone systems, signaling equipment, multi-purpose cabinets, and/or cabinets for other purposes; (j) transit related assets, such as a transit stop, transit station, transit pole, transit stop sign, bench, bollard, ashtray, clock, digital displays, advertising display, information post, stands, ticketing systems, lighting, glass panels, maps, newsstands, payphones, advertising surface, bike rack, shelter, solar power source, washroom, garbage bin, and/or other transit assets and/or components thereof; (k) asset fixtures, such as brackets, anchors, clamps, mounting plates, fasteners, hooks, adhesives, hangers, clips, straps, pins, braces, standoffs, angles, bolts, nuts and/or other fixtures and/or components thereof; and/or (l) other assets, such as mailboxes, donation bins, public waste bins, playgrounds, ramps, water fountains, statues, decorations, structures, electronic devices, charging stations, parking meters, parking spots (whether dedicated or time limited), meters, pipes, lawns, parks, shuttles, other vehicles, and/or components thereof.

For greater clarity, the assets 12 are just for ease of reading, and assets may in practice be grouped differently, include additional items or less items, or be otherwise be ungrouped and/or individually tracked, depending on various factors. Additional asset types can also be inspected by the device 101 but not included in the examples provided (for example, assets not noted in the description but under asset management of an end-user with some or all of the assets listed). Asset 12 names can vary from organization to organization or from one geographical or jurisdictional location to another. Asset quantities can be single or multiple and can vary from customer to customer or implementation to implementation.

In some scenarios, the locations of assets 12 can already be catalogued and stored in a GIS remote server or database 111a. The locations of assets 12 can also be locally stored 135 on the device 101. The server side GIS information 535 can be synchronized to and from the device 101 GIS information 135 through a server 111 prior, during, and/or after surveying, through a wired 207.2 or wireless connection 109. Furthermore, the device 101 can retrieve asset 12 or GIS data on the go through its wireless connection 109. In other embodiments, the device 101 can store pruned data 108 locally without a permanent geospatial 135 database, and process instructions from the server 111 as to which data 108 to transmit (and which to discard). The GIS data 135, whether all of it, or some of it, and whether in the same form as on the servers 111 and GIS database 111a or in a different form optimized for edge computing can reside on the device 101. The GIS database 135 on the device 101 can have some additional columns, tables, or fields which are meant for the device 101, and can be, in some circumstances, different than the GIS data on the servers 111. If no connection 109 is available, the device 101 can record its surveyed data, process to varying degrees some, all or none of it within the device 101, and when a connection becomes available, transmit the selected data 108.

The device 101 can, in some embodiments, have command and control capabilities which can be initiated verbally through voice commands and the device's 101 microphone 209, touch screen 204 activations or through other system interfaces. The device 101 can also be used to navigate to assets 12, or navigate by assets 12, by providing instructions to the driver on screen 204, through speaker 206 or both. The device 101 can also, in some embodiments, recommend an optimal route to cover a certain area. The navigation recommendations can be visual, audial, or both.

Example Device 101 Operation

Figure 3:
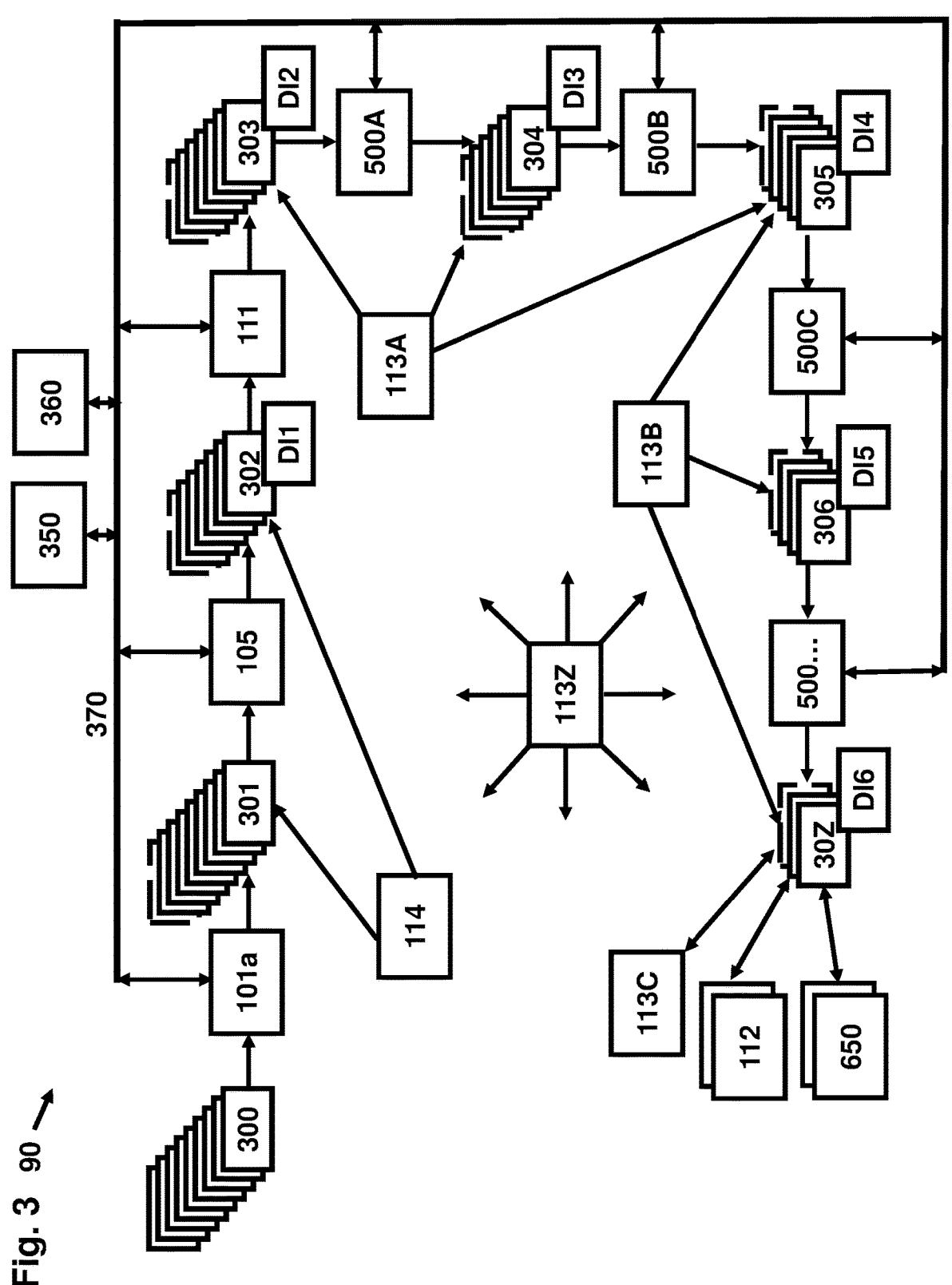
FIG. 3: Depicts an example of flow of collected data, and process of selection, refinement and pruning performed using the system of FIG. 1.

Referring to FIGS. 1, 2 and 3, in some embodiments, the device 101 can alert the operator (for example, the driver or inspector) that an asset needs further attention so that he can add further notes either dictated, with the use of the onscreen keyboard or with another device interface 130. These notes can be made visually with camera 201.2, orally with microphone 209 or by user interface components (such as fields, buttons, dropdowns, keyboards, scroll lists, or other user interface components 114) on a screen 204 or keyboard (whether integrated to the screen 204 or separate). These notes can be uploaded to server 111 and added as meta data to the server records 111, and/or GIS database 111a, asset information database 111a or within other third party databases 111a.

In some embodiments, on the completion of the surveyed route, the device 101 can be powered off manually or automatically using one or more means, for example, with a button 205, a virtual button displayed on screen 204, disconnecting the power 207.2, or by issuing a verbal command through microphone 209. It is recognized that in a fully automated manner, in which the device 101 operates like a dash camera (or automated camera), the device 101 can be disconnected from power 207.2 automatically when the vehicle 102 is powered off or switch to a standby mode (if battery operated).

Depending on the shutdown method, in some embodiments, the shutdown process finalizes and stores the processed data and unprocessed data. In some embodiments, the system can also attempt to transfer or save of unsaved captured data 108 present in memory 203.1 from volatile to more persistent memory 203.1 or if wireless connections 109 are present and reliable the data can be transferred to server 111. In the event the device 101 was not successful in transferring the data 108 to servers 101 before shutting down (for example, due to power shutdown), but was able to retain it on its non-volatile memory 203.1, the device can try to send the captured data 108 to servers 101 once initialized, or alternatively, once scheduled or programmed to do so.

Referring to FIG. 3 and FIG. 1, we depict by way of example 90 selection, pruning, generation and refinement of flow of data across the various system components. Without hardware, software or programming constraints, the device 101 hypothetically could collect all possible data 300 including images and sensor data (not shown) in relation to its data collection capabilities. In practice, the device 101 can have some constraints in the collection of the data 300. The constraints can be hardware based, for example, limited by camera frame rate, sensor polling rate, disk write speed, memory capacity, processor speed, and/or other hardware limitations. The hardware can also have hardware control software settings to control different hardware capabilities (for example, camera frame rate, camera resolution, gps refresh interval, location sensor polling rate, and/or other hardware adjustable or non-adjustable settings). As such, it is recognized that the device 101 may not be able to collect all data 300 desired, but rather, a hardware constrained amount of data 301 specific to the hardware and the data capture settings. It is recognized that the hardware constrained data 301 can be a subset of the all possible data 300.

The device 101 also has software 105, which can include operating system software 105, application software 105, and related software 105. The software 105 uses device 101 hardware resources, and depending on the software 105, and its architecture, design, function and/or efficiency, the software 105 can capture some or all of the device 101 hardware captured data 301. It is recognized that the device 101 software 105 captured data 302 can include a subset of the hardware constrained data 301. In the event that that the software capture capacity 302 is the same as the hardware capacity 301, the captured data 301 302 can be the same if desired (for example, if the software 105 records video clips and corresponding sensor data 302 at the same rate the hardware can provide it 301, and therefore the data can be the same).

For the purpose of asset 12 data collection, it is possible that not all hardware collected data 301 is required. For example, in areas where no assets 12 are present, instances where no issues are present, or situations where the available data 301 is superfluous or otherwise not usable or not necessary. For example, the data 301 can include image(s) 104 that do not contain assets 12, image(s) that are captured in unfavorable lighting or weather conditions, and/or multiple images 104 of the same object (asset 12 or issues thereof) from the same perspective over a short period of time. The software 105 can therefore selectively prune input data 301 to free device 101 resources to perform other tasks. It can also be desirable to reduce the device's 101 processing for other purposes, for example, to extend battery life, to extend the life of the hardware through limited disk/memory writes, to reduce heat generation, reduce power draw, reduce downstream processing among and/or system, software and hardware benefits.

The device 101 can also perform image processing operations aimed at generating new data DI1, for example, metadata 106 from images 104. The metadata can relate to objects in the image 104 (such as assets 12), observed issues, lighting conditions, weather, and other information that can be used to determine whether the software data 302 should be selected, processed, stored, and/or transmitted. The server 111 can also perform geospatial matching 105 to match collected data and/or portions thereof to assets 12. The software 105 can also collect and/or generate new information DI1 based on various data sources (for example, the device's 101 sensor 107 location information), along with other configuration, settings, parameters, rules, workflows, and/or logic. The device's 101 software 105 can therefore select which data 301 to store, process, transmit and/or otherwise include in the dataflow 90 and which input data 301 and/or software 105 data 302, DI1 to prune. It is recognized that in some embodiments, the device 101 software 105 can generate derived data DI1, whereas in other embodiments, the device software can not generate derived data DI1.

Pruning will be discussed in greater details in FIGS. 5 and 6, but in general it can include one or more functions aimed at selectively collecting and/or processing data for the next step in the data flow 90 (see FIG. 3). The software 105 selected data 302 DI1 can then be transferred to the server 111. It is also recognized that image data 104 could be modified on the device 101 using image processing operations 105 to redact personal information, whereas redacted images could be new data DI1 generated and old not redacted images 104 can be discarded. It is recognized that the device's 101 software 105 can include one or more steps (not shown) aimed at collecting data, storing data, processing data, transmitting data, pruning data, performing image operations on data, creating derived data, and/or other one or more software operations 105. It is recognized that in different embodiments, the device 101 software 105 can select none, some, or all of the data 302 to be transferred to the server 111. It is also recognized that in different embodiments, the device 101 software 105 can select none, some, or all of the derived data DI1 to be transferred to the server 111.

The data 302 DI1 upload to the server 111 can involve server 111 software 500. The server 111 software 500 is described in greater details in other sections, however, in this FIG. 3 the example shows upload of device 101 selected/ pruned data 302, DI1 to the server 111. It can take place with endpoints, file transfer protocols, application interfaces, database connections, other software means, and/or a combination thereof. The server 111, depending on its programming 500, can process none, some, or all of the uploaded device 101 data 302 DI1. The server 111 can have one or more steps 500, 500A, 500B, 500C, 500 aimed at selectively processing and/or pruning the data. The server 111 can also have one or more steps 500, 500A, 500B, 500C, 500 aimed at generating new data DI2, DI3, DI4, DI5, DI6, for example, using image processing operations, artificial intelligence operations, GIS operations or other software operations 500. As the device 101 collected data 302 DI1 is processed by the server 500, 500A, 500B, 500C, 500, the server 111 can prune the data 303, 304, 305, 306 and generate new data DI2, DI3, DI4, DI5, DI6. It is recognized that the output of one or more server 111 processing step(s) 500, 500A, 500B, 500C, 500 can be the input of one or more server 111 processing step(s) 500, 500A, 500B, 500C, 500. It is also recognized that the server 111 can request additional data 302 DI1 from the device 105 beyond what was originally sent. It is also recognized that image data 104 could also be modified on the server 111 using image processing operations 500, 500A, 500B, 500C, 500 to redact personal information, whereas redacted images could be new data generated and old not redacted images 104 can be discarded. The server 111 can also perform geospatial matching 500 500, 500A, 500B, 500C, 500 to match collected data and/or portions thereof to assets 12.

Example Users of the System 25,100

The device 101 software 105 and server 111 software 500 can affect the data collection operations, image processing operations, pruning operations, geospatial operations, and/or other software operations optimized by adjusting certain settings. Such parameters can affect the selection and pruning data flow 90 on the device 101, server 111 or combination thereof. For example, parameters that affect the data collection volume, parameters that affect the data processing load, parameters that affect bandwidth utilization, parameters that affect storage volume, parameters that affect the data collection frequency, and/or other parameters the affect the ultimate quantity and/or quality of data that is presented to users. The parameters can include, for example, absolute or relative number(s), threshold(s), confidence(s), tolerance(s), range(s), filter(s), accuracie(s), recall(s), time(s), date(s), bandwidth(s), upload(s), download(s), size(s), status(es), quantity(ies), precision(s), score(s), error(s), class(es), rate(s), distance(s), offset(s), velocity(ies), orientation(s), position(s), classe(s), name(s), flag(s), and/or other parameters of any data type (string, integer, double, boolean, blobs, arrays, lists, stacks, and/or other data types). The parameters can be used within logical operations. It is recognized that the system 25, 100 can have a system administrator interface 113Z and/or role 113Z where a power user can monitor the flow of data 90 and make the appropriate adjustments at the appropriate steps to select and prune the right amount of data for the asset data collection process 90. It is recognized that the parameters for the selection and/or pruning can be global or used in one or more software functions. It is further recognized that the parameters can be adjusted on a global basis, per organization, per device, per asset type, per software function or otherwise in ways that allow to optimize the selection and pruning for a specific use case.

The system 25, 100 can also have various types of users. Users can include for example staff that setup, calibrate and/or configure the data collection process directly on the device 101 and/or its software 105 using the device's 101 interface 114 (it is recognized that the device 101 and its software 105 can also receive over the air updates from the server 111 or third party systems 112, for example for release, package, file or data distribution).

The data collection operations 105, 500, data selection operations 105, 500, image processing operations 105, 500, data pruning operations 105, 500, geospatial functions 105, 500 and/or other smart system 25 functions related to the data flow 90 can have shortfalls in terms of scalability, capacity, accuracy, recall, precision, F1, error rate, edge cases, software defects, thoroughness, quality, quantity, asset matching, technical limitations, design flaws, and/or other shortfalls, whether measured on a quantitative basis, qualitative basis or observed subjectively. Such shortfalls can be applicable to none, some or all of the collected data 301-306, 30Z and/or generated data DI1-DI6. For example, the software 105, 500 can: (a) fail to detect and/or classify assets and/or issues in images; (b) falsely detect and/or classify assets and/or issues; (c) collect the wrong image and/or sensor data; (d) generate the wrong derived information; (e) report present asset 12 as missing; (f) report missing asset as present; (f) report asset as new 12 when existing; (g) report asset 12 as existing when new; (h) mismatch collected data and asset record; (i) collect superfluous data; (j) experience other shortfalls and/or (k) a combination thereof.

The system 25, intended to perform asset data collection functions, asset assessment functions, asset issue detection functions, and other asset related functions can flag none, some, and/or all of the collected data 303-306, DI2-DI5 for a review by a user (for example, data quality user) through a user interface 113A or user role 113A. The user could also be called data technician, data quality technician, reviewer, asset surveyor, data annotator, data scientist, support specialist, quality technician, and/or other named roles in which the user is responsible to review, verify, approve, reject and/or amend the collected data. Such user can review the collected data before the data 303 is initially processed by the server 111, after it is processed by the server 111, or a combination thereof.

The system review user 113A can review the collected data before it is made available for one or more end user(s) 113B, customer(s) 113B, tenant user(s) 113B, and/or other user(s) 113B which are not considered system users 113Z, 113A. The system reviewer 113A can review none, some, and/or all of the collected system data. The review process can take place one or more times along one or more steps. The review can depend on asset type, issue type, inspection type, job type (i.e. the job for which a customer is paying), task type (i.e. the task which is assigned to the reviewer 113A), parameters for data collection (for example confidence score, class, metrics, and/or other parameters), end user(s), and/or any other criteria or segment, whether role based, task based, system based and/or data based. The reviewer 113A, depending on role and permissions, can review data for all system data, for one or more end-users, for one or more devices 101, for one or more servers 111, for one or more organizations, for one or more assets, and/or a combination thereof.

The system user review 113A process can be visible to the end-user 113B (for example, through notes, audit trails, reports, system fields, or otherwise) or not visible (hidden) to the end-user 113B. The system reviewer 113B could also only be provided access to aggregate, non-identifying user data, for example, images 104 (or portions thereof) containing assets 12 and/or issue, without specifying the end-user, the device, the organization, the location, and/or other identifying properties. The system reviewer 113B could also be provided access to specific user data, for example, images 104 (or portions thereof) containing assets 12 and/or issues, including information related to the end-user, the device, the organization, the location, and/or other identifying properties. The access type can vary based on roles, tasks, end users, regions, services provided, and/or other criteria. The provided collected data can also be redacted for privacy by the device 101, the server 111, or a combination thereof before, after, or before and after the review process. The system user review 113A can be an independently billable service (for example, review of collected asset data to generate asset inventories), or a component of an ongoing subscription and/or service (for example, automated data collection and assessment of assets and related issues). The review user(s) 113A can, depending on role and permission, reject collected data, approve collected data, amend collected data (including adding, modifying and/or deleting none, some or all of the collected data). The list of possible actions by the system review user can include, for example, rejecting and/or deleting images 104 not containing assets 12 and/or issues, manually annotating assets 12 which were missed by the image processing operations 105, 500, updating generated data DI1-6 (for example, bounding boxes) generated by the image processing operations 105, 500 (for example, resizing them or changing the object classification and/or type), removing erroneous object markings DI1-6 (for example, a portion of an image 104 that is erroneously marked as an object by the image processing operations 105, 500), approving, rejecting, adding, updating, and/or removing issues related data DI1-6 in images 104 captured images, adding additional fields (for example, priority) for identified maintenance issues, filtering superfluous data from end-user, adjusting the geolocation of the data, matching the data to a particular asset 12, and/or otherwise modifying one or more fields/properties of the collected data 301-306, the generated data DI1-6, the asset generated data (DI1-6), the issue data (DI1-DI6) and/or a combination thereof. It is therefore recognized that in some embodiments, the selection process and pruning can include review 113A, 113Z by system users.

It is recognized that the system users 113A, 113Z depending on permission and/or user role, can, in some embodiments, also export 350 system 100 data (collected, processed or a combination thereof), including collected data 301-306 and newly generated data DI1-6 for various purposes such as backups, creating data collections for annotations for machine learning and artificial intelligence model generation, for algorithm development, for use case definition, and/or other business purposes intended to assist in the improvement of system 100 functions. The export 350 can be to an integrated data processing system, a data processing workflow, data processing pipeline, files, databases, data annotation platforms, and/or other software components meant to store, organize, annotate, analyze and/or otherwise use the collected data for the improvement of the system 100. The data can also be used for other purposes 360, for example, to address claims, backups, reports, produce records, and/or otherwise retain it separately from the system. Exported data can also be saved in various file formats (for example, CSV, PDF, XLS, XLSX, SQL, TXT, Geodatabase, Shapefile, KML, KMZ, or any other file format usable for asset management purposes). The system can also have APIThe export 350 and other use 360 of data can be initiated by one or more of the following: system administrators 113Z, system users 113A, end users 113B, device 101, server 111, and/or a combination thereof. In various embodiments, system power users 113Z and/or system

| review users 113A can have none, some, or full access to customer facing data 305, 306, 30Z. In various embodiments, system power users 113Z and/or system review users 113A can have none, some, or full access to any collected data 301-306, 30Z, DI1-DI6. In various embodiments, the collected data 301-306, 30Z, DI1-DI6 can be processed exclusively by device 101 software 105 and/or server 111 software 500. In various embodiments, system power users 113Z and/or system review users 113A can automate none, some and/or of the review process with server 111 and/or device 101 functions (for example, through workflows, criteria, programming, and/or other versatile or specific software 105,500 functions).

Once the data 305 has been sufficiently collected, processed and/or refined by the device 111 software 105, server 111 software 500 and/or system users 113A, and/or combination thereof, the data 305, DI4 can be made available to an end user 113B.

The end user 113B can have various roles (for example, administrator, supervisor, technician, reviewer, viewer, and/or other roles, whether fixed or permission based). The end user 113B can view its data and perform its own business operations related to the collection and assessment of asset data. The end user can view assets, view issues, approve, reject, add, modify, and/or remove none, some, or all of the collected data 305-306, 30Z and generated data DI4-DI6. The end user 113B can match the data to specific assets 12, whether stored in the server 111 and/or in third party systems 112. The end user 113B can initiate additional server processes 500C, 500 . . . manually and/or automatically, on a continuous, scheduled, and/or user initiated basis. For example, user 113B can be initiating additional image processing, pruning, workflows, automation, and/or bulk operations on various data collection datasets 305-306, 30Z, DI4-DI6. It is recognized that the end-user 113B can initiate service requests 30Z, DI6, work orders 30Z, DI6, inspection records 30Z, DI6, reports 30Z, DI6, planned activities 30Z, DI6, routing 30Z, DI6, and/or other actions 30Z, DI6, whether physical (such as printouts) and/or digital which relate to using the asset and issue data 30Z, DI6. The data 30Z, DI6 could be assigned to/transferred to/accessed by other end-user accounts 113C. For example, a supervisor 113B can process the data 305-306, DI4-DI5, and a manager 113C can access a report relating to the state of the assets. Another example can be that one person 113B reviews the collected data 305-306, DI4-DI5, and another person 113C creates work orders and/or service requests. The selected data 30Z, DI6, having been processed by one or more of the following—device 101 software 105, server 111 software 500, system user(s) 113A, 113Z, and/or end-user user(s) 113B, 113C can be of sufficiently quality data to also synchronize to third party asset databases 111a, work management systems 112, survey systems 112, databases 111a, and/or other systems 112 that can use some or all of the selected and pruned data 30Z, DI6. The system 100 can also have built in tools 650, applications (whether desktop based, web based, mobile, or otherwise) 650, and/or printouts 650 that can be used by field staff (not shown) to act on some or all of the selectively pruned 30Z, DI6 data. It is therefore recognized that in some embodiments, the selection process and pruning can include review 113B by end-users.

It is recognized that this FIG. 3 is just one of a plurality of different embodiments which can demonstrate the flow of data 90 from when it is captured 301 to when it is substantially pruned 30Z (example of pruning functionality Z) and enhanced DI6. As such, the data flow 90 can be, in different embodiments, including more or less steps on the device 101, more or less steps on the server 111, more or less steps taken by system users 113Z, 113A, more or less steps taken by end users 113B, 113C and/or more or less related systems 112 and dissemination options 650. It is recognized that the order of operations 370 can be different. It is also recognized that one or more steps can be repeated one or more times.

The collected data, can therefore be processed, refined, selected and/or pruned by the device 101, the device's 101 software, the server 111, the server 111 software 500, system reviewers 113Z, 113A, end users 113B, 113C and/or a combination thereof.

Example User Interface 70

Figure 4:
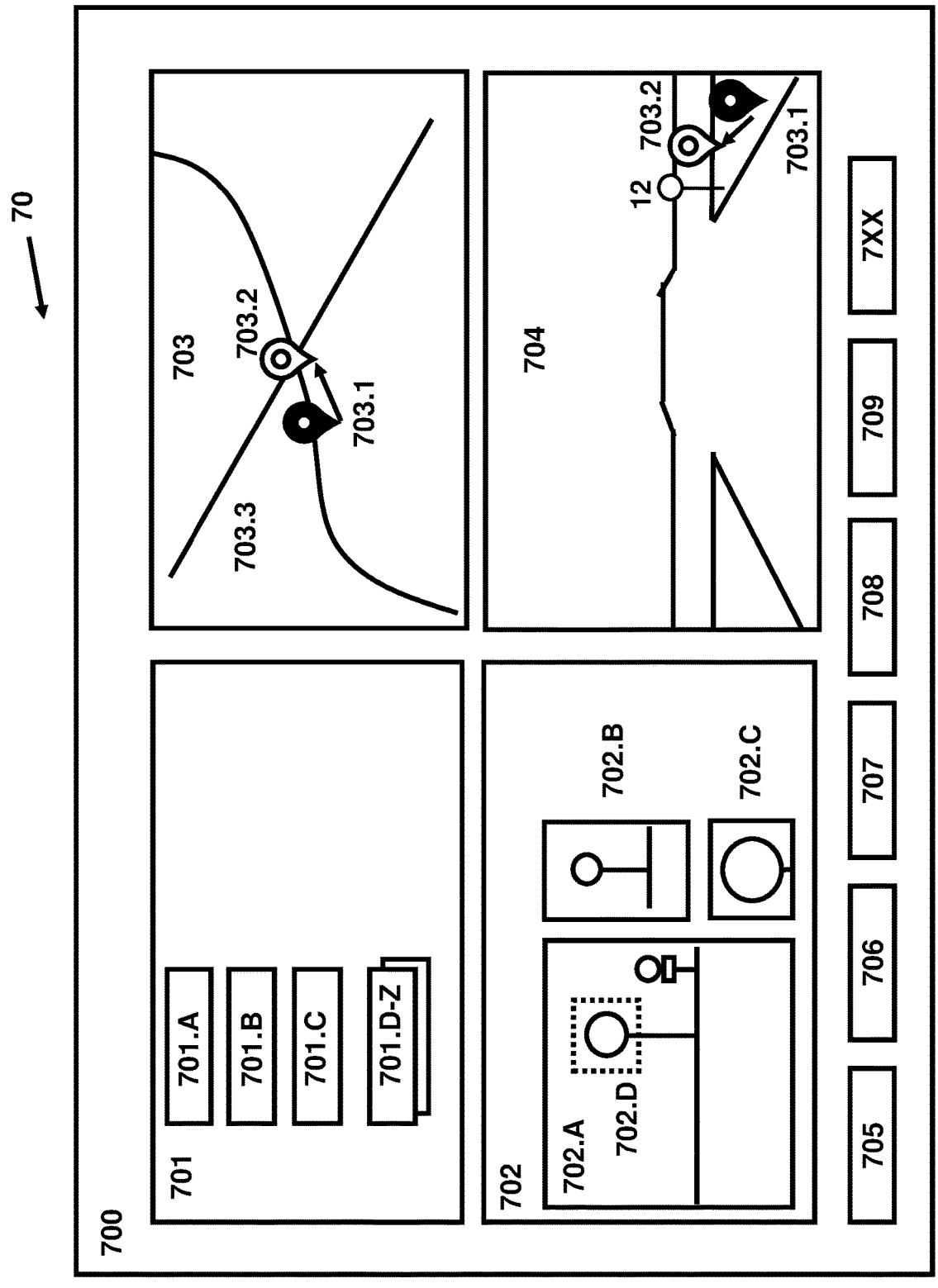
FIG. 4: Depicts examples of user interface options for the system client interface in relation to interacting with the collected asset data of the system of FIG. 1.

FIG. 4 embodies a sample user interface 70 in which assets 12 can be viewed in detail and interacted with virtually. Assets 12 as shown in FIG. 1, once digitized 700, as shown in FIG. 4, can be interacted with using user interface components 701, 702, 703, 704 . . . 7XX. The different UI component(s) 701-7XX can include common or specialized UI component(s), such as button(s), text boxe(s), checkbox(es), radio button(s), list(s), dropdown list(s), list box(es), slider(s), progress bar(s), icon(s), image(s), tooltip(s), frame(s), menu(s), tab(s), tabbed panel(s), accordion(s), toggle switch(es), carousel(s), modal window(s), dialog box(es), alert(s), notification(s), breadcrumb(s), pagination(s), card(s), table(s), form(s), wizard(s), stepper(s), timeline(s), toolbar(s), navigation bar(s), search bar(s), spinner(s), loader(s), map(s), 3d viewer(s), overlay(s), tooltip(s), drag and drop interface(s), image gallery(s), image viewer(s), video player(s), audio player(s), calendar picker(s), color picker(s), date and time picker(s), graph(s), chart(s), progress indicator(s), rating(s), widget(s), profile(s), file upload control(s), file download control(s), selector(s), help and support component(s), and other UI component(s), whether standard or customized for specific applications or use cases. Some UI component(s) 701-7XX can be nested in other UI component(s) 701-7XX, relate to other UI component(s) 701-7XX, interact with other other UI component(s) 701-7XX and/or grouped with other component(s) 701-7XX.

Related to the digitized asset view 700, it can include, one or more component(s) 701 with asset 12 descriptors 701.A-701.Z which can also be fields, parameters, properties, or other forms of information 701 that would be stored in a list, table, dataset, database, or system used to describe the asset 12. Examples of descriptors 701 can include asset type 701.A (for example, a manhole, a sign, or other types of assets), asset geospatial coordinates 701.B (for example, latitude and longitude, northing and easting, x and y, and/or other location descriptors), and even refer to files, such as image(s) 701.0 captured of the asset 12. It can also include a variety of other parameters 701.D-Z that can further describe the asset 12 or information contained in the image 701.0 which references the asset 12. In the sample the asset is shown as sign, but as described throughout, the asset can be any type of asset (pole, tree, traffic light, transit stop, and any other asset). As noted in FIGS. 1A and 1B, it asset 12 information can also be select data 108 captured by one or more devices 101, from one or more perspective 104, and include information pertaining to one or more assets 12. It is recognized that some or all of the available fields per asset type may be the same or different based on the asset type, inspection type, organization, and other requirements/factors. The descriptors can include some, none or all of the following descriptors: asset id, asset geospatial id, asset name, asset type, asset dimensions, asset manufacturer, asset model, asset serial number, supplier, purchase date, purchase cost, service cost, current value, geospatial descriptions, location (latitude/longitude or x/y), nearest address, nearest intersection, service zone, department/owner, warranty information, inspection history, maintenance history, service provider, mounting material, related assets/amenities, status, condition, rating, last inspected by, last date inspected date, category, regulatory code, internal code, comments, descriptors, accessories, power ports, network ports, and other fields. It is recognized that this is just a short list of fields and that other fields describing other properties of the asset can be included in the same. It is recognized that in different embodiments system users and/or end users can add, modify, and/or remove descriptors. It is also recognized that the same field can have a different name or format for different organizations/end-users. For example, the same descriptor can have a different field name in different language, it can have a different naming convention in different organizations, it can have different regional settings (for example time zones), it can have different measurement metrics (meters or feet, miles or kilometers), different currencies, different coordinate systems. It is recognized that other variations can occur for the same or similar fields in different implementation and/or for different users.

The asset view 700 can also include one or more image(s) 702 of the asset 12. The asset view image(s) 702 can be the original images 104 captured by the device 101 or a modified versions 106, 108' thereof. If modified 106, 108' the image(s) can be modified by either the device 101, the server 111, or both. The images can be also modified to exclude personal information, as noted in FIG. 1C. The asset view image(s) 702 can include a full view 702.A as captured by the device's 101 camera, an expanded crop 702.B, or a tight crop 702.C. One image 702 can include one or more asset type (for example, in the sample image shown 702.A there could be a sign type, and a pole type). One image 702 can also include one or more instances of an asset (for example, in the sample image 702.A shown there can be five assets— three signs and two poles). One asset 700 can also be present in one or more image(s) 702. The relationship between asset(s) 12 can be one to one, one to many, or many to many. The relationship between asset(s) 12 to images 702.A can also be one to one, one to many, or many to many. Some assets can be related to each other, for example, a sign tab can be related to a sign, and a sign and a sign tab can be related to a pole (or, as in the example used in FIG. 1B, a transit stop sign 12.3, a transit shelter 12.2, and a waste bin 12.1 can all be related to a transit stop 12 asset). As such it is noted that one or more asset(s) can have one or more relations to other asset(s). These relationships can be used for groupings, display, search and other asset functions (for example, management, processing, display, sequencing, and/or reporting).

The image(s) can also include overlays 702.D, which can be used to visualize metadata 106 or selected data 108, 108' associated with the image(s) 702 or the assets 12 contained within the image(s) 702. Metadata 702.d/associated data 702.d can include, for example, bounding box coordinates, masks, polygons, key-points, and any numerical, text, or data field used to describe the image(s) 702, or the assets contained within the image(s) 702. The overlays 702.D could either be embedded directly within the image(s) 702, as modified images which already have the metadata layers merged in, or as a separate layer (for example, a vector layer or an image layer with transparency). The overlays 702.D In addition to displaying information, the image 702 layers 702.d can also act as controls. For example, by selecting a bounding box 702.d of an asset, information and/or options in other user interface components 701-7XX can change. The image component 702 can also have actions associated with image controls for panning and zooming. The image(s) 702 can also be used to navigate between different assets 702.D contained in the image(s) 702.

The asset view 700 can also include a geospatial view 703. The geospatial view 703 can be for example, static or interactive. The map view 703 can have different sources, such as tiles, images (for example, satellite images), raster images, vector, or other such cartographic, digital mapping, computer cartography information sources. In addition to the geospatial map 703 depicting an area, the map 703 can also display additional information, such as points, vectors, polygons, icons, labels and controls. The map 703 can also have various tools and controls integrated to it. Examples of typical map controls include: zoom control, pan control, scale control, compass control, layers control, search bar, legend, info window, drawing tools, full screen mode, print control, select control, geocode/reverse geocode tool, measure tool, and street view control. Similar to other UI 701-7XX components, the map control can have other controls integrated to it, for example, images 702 could be nested in maps 703, selecting a map pin could display additional fields 701, and other similar UI functions which are embedded or integrated together. The map view 703 can also depict said assets 12 locations, and other geospatial assets 12, whether from third party systems 112 or the system server 111.

The asset view 700 can also include a specialized component for displaying the surrounding view 704 at a particular location through panoramic images 704, street view 704, point cloud 704, 3D image 704, and other views which provides context about the environment at a particular location at a particular time in which the surrounding view 704 data was captured. The surrounding view 704 data can be captured in conjunction with the asset capture system 101 or using a separate or integrated system (not shown). The surrounding view 704 data can also be available through third party systems 112, which can be data repository systems 112, surveying systems 112, or even commonly available map service providers (for example, Google, Microsoft, Tom-Tom, ESRI or others). Similar to other UI 701-7XX components, the surrounding view UI 704 can have other controls integrated to it, for example, pins 703.1, 703.2 could be nested in in the view 704, selecting a pin could display additional fields 701, and other similar UI functions which are embedded or integrated together. It can also have additional controls such as zoom, pan, tilt, and other controls aimed at aligning the view, navigating within the 3D view, and interacting with other components.

The asset view can include additional user interface elements 705,706,707, 708, 709 . . . 7XX. The elements 7XX are depicted as boxes 705-7XX to fit into the diagram provided but could be any UI component 705-7XX as mentioned herein or otherwise used commonly in software, whether web or application. A list of example components 705-7XX that could be used in this view include:

(a) Other variations, multiple instances, or different themes, filters or views of components 701, 702, 703, or 704.

(b) UI components 705-7XX to toggle on or off components, either large 701-7XX, or small (for example, 702.D, 701.A, 703.2, and other embedded components;

(c) UI components 705-7XX to cycle between assets 12 or asset properties. For example, next/previous asset based on location, next/previous asset category, next/previous asset based on group, and other properties that could be used to cycle between assets 12;

(d) UI components 705-7XX to show or interact with status, issues, alerts, or notifications in relation to assets 12. This can include states, statuses, readings, scores, or tags, whether generated by an AI module, software or manually logged by a person. Examples can include broken assets, malfunctioning assets, worn out assets, obstructed assets, occluded assets, and issues in images related to assets.

(e) UI components 705-7XX for performing one or more asset related actions such as creating, editing, updating, matching, deleting, linking, and/or flagging assets 705-7XX in relation to asset data on the servers 111:

a. Creating can mean the creation or addition of a new asset to be added to the repository 111. For example, an image 702 can be captured of an asset 12, but the asset 12 is not yet available in a digital record 700, a new asset can then be created;

b. Editing can mean changing one or more of the properties 701 of an asset 700 already existing in the repository 111. For example, relocating a pin describing an asset location on a map from one position 703.1 to another 703.2 (which could also result, for example, in update of the geospatial coordinates);

c. Updating can mean add, change or delete one or more of the properties of an asset 700, whether manually or in an automated manner. For example, automatically updating a field 701 with the last date and/or time an asset was seen by a device 101, which can include also an image 702 of the asset 12; Properties can also include overlays 702.D.

d. Asset matching can mean, for example, assigning pruned data 108' to an existing asset 700 already in the repository. For example, the system software 105, 111 identified an asset which it did not successfully match due to shortcomings with the algorithm or data (for example, misclassifying the asset type, or capturing inaccurate location data). The system can suggest that this is a new asset, or provide this as an unmatched asset, at which point, the user can match the data 108' to the appropriate asset 700 (if applicable), create a new asset, discard the data or otherwise interact with it;

e. Asset linking can mean, for example, assets which are linked together, either physically (for example, two signs sharing a pole), logically (for example, an "All Way" sign tab associated with a "Stop" sign, or both. Linked assets can have one or more relationships, for example, child-parent, peer-to-peer, shared groups, sequence numbers, or other common types of logical linkages;

f. Asset deleting can mean that the asset is no longer present and requires deletion. For example, urban development (i.e. construction) can change the landscape so an asset (for example, a tree) is removed to accommodate other infrastructure, building or land purpose. The asset can be, for example, removed from the database, or still present in the database but marked as removed or deleted.

g. Asset flagging can mean that the asset requires the attention of user and/or a person for the purpose of potentially inspecting, maintaining, repairing or otherwise reviewing an asset. For example, an asset 12 can be flagged if it is deemed by the software or a person as damaged. The method of flagging can vary and can include specialized properties 701 or tags 701. It can be visible in a detailed asset view 700 or reported in other methods, including in specialized views and alerts for flagged assets. It can also be communicated through email, SMS, digital text or other alerts or notifications, whether in platform or externally to it.

h. It is recognized that alerts captured in relation to the asset 12 can be available in the asset view 700, in a dedicated interface to show the alerts, which can be in a map form, gallery, list, table or a combination thereof. For example, a transit stop 700 captured image 702 can include, in addition to the station 12 assets 12.1,12.2,12.3,12.4 an issue—for example a pile of garbage (not shown), or a shopping cart (not shown), asset damage (not shown), or otherwise an issue which requires attention. It is also recognized that none, some or all of the identified issues (whether identified by the system or by a user) can be also deemed as incidents (by the system or by a user). Said issues can also have parameters such as severity, priority, urgency, due date, target repair time, or other fields aimed at prioritizing resolution and/or meeting service levels.

It is recognized that some or all of the different components 701, 702, 703, 704, 705, 705, 706, 707, 708, 709, 7XX can be present or not present in the user interface 70 depending on a variety of factors such as the user role, the configured view, permissions, the intended functions, and other factors that determine the available interface components 700.

It is also recognized that the different interface components 701, 702, 703, 704, 705, 705, 706, 707, 708, 709, 7XX can update, change status, or otherwise interact with other components. For example, if an instance of a sign asset 702.D is captured in an image 702, along with location information 703.1 such as GPS or GNSS, the user can, by selecting the asset on the map 703.1, move the asset 12 to its actual position 703.2 and not the vehicle 102 position at the time of the capture 702. Other components, for example, the ground level view 704, would also show the asset position 703.1 move to the actual position 703.2. Similarly, the appropriate fields 701 related to its location position can also be updated. Another example, selecting a next asset component can also refresh data in all relevant components. It is recognized there can be different embodiments of the interface 70 to interact 700 with the digital assets 12.

The asset information 700 shown across some or all of the different user interface 701-7XX components can be the same or different, depending on factors such as the component's 701-7XX purpose, user permissions, asset properties, configuration information, and the software programming. Different user interface components 701-7XX can also in some embodiments, be embedded in each other, and/or interact with other user interface 701-7XX components.

Visual information can be displayed as an image 702 of an asset 700 with its corresponding location data as a map view 703 and a 3D view 704 of the asset 12 and its position 703.1. The image of the asset 702, the location of the asset 703 and the 3D view of the asset 704 can be arranged in customizable views showing all views or positioned in different locations on the screen 70. The image of the asset 702 can contain various characteristics, permutations and configurations of assets.

The different views, including the map view 702 and 3D view 703, can be synchronously linked and any changes made in one can reflect in the others. For example, the location icon 703.1 of either view—if the map view icon

703.1 is moved to a new location 703.2, there can be connection change in the 3D view pointer 703.1 to its corresponding new view position 703.2. These systems can also work in reverse whereby any changes in the position of 3D position 703.1 to a new position 703.2 will show the new position in map view 703.2. Additionally the new position 703.2 can be updated in appropriate database 111*a* on the server 111 or on the GIS repository 111*a*. Furthermore additional configurations such as assets 12 which are meant to exist temporarily when moved can trigger workflows that would see their pickup and delivery to the new designated location.

Figure 4A:
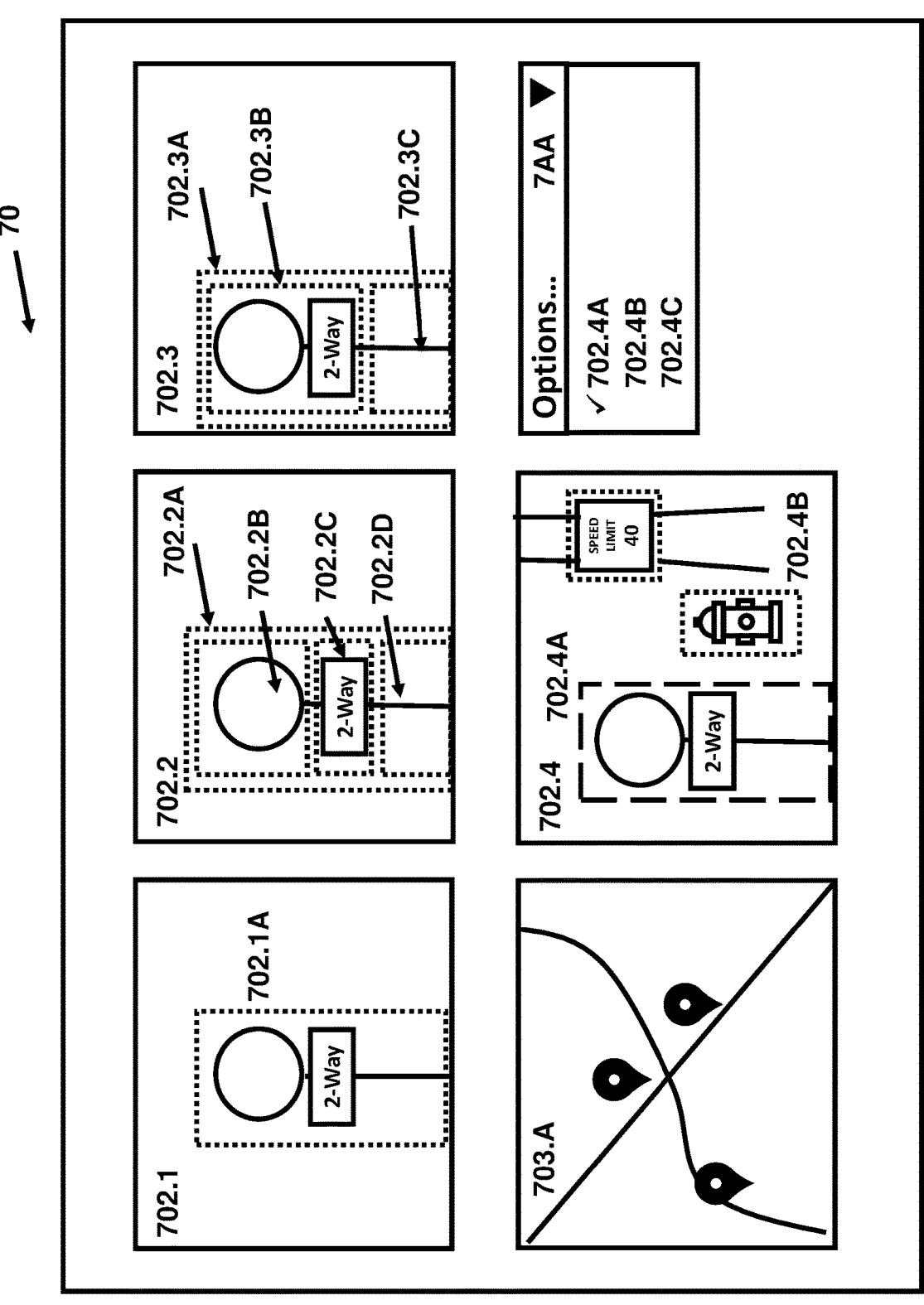
FIG. 4A: Depicts additional examples of user interface options for the system client interface in relation to interacting with the collected asset data of the system of FIG. 1.

Referring to FIG. 4 and FIG. 4A, we depict a few sample embodiments of how different assets 12 can be organized and/or presented in images 702.1, 702.2, 702.3, 702.3, 702.4, and how they could be further interacted with. In our example we will use a sign, but it could be other assets 12 as well. Referring to image 702.1, a sign objet 12 is captured in an image 702.1 and can be described as a sign object 702.1A, which can also include sign tabs and/or the sign pole. Referring to image 702.2, same object 12 could be either (a) detected as a sign object 702.2A including sign, sign pole and sign tab; (b) detected as some or all of its individual parts, such as the sign 702.2B, the sign tab 702.2, and the sign pole; or, both (a) and (b) (multiple assets 702.2B, 702.2C, 702.2D could be grouped to one asset 702.2A, or described individually 702.2.B, 702.2C, 702.2D). Referring to FIG. 702.3, assets 12 could also be grouped, for example the asset 12 can be a sign object including all of its components 702.3A, or it could be that the pole 702.3C is one asset, and the asset and its related asset (a sign with a sign tab) could be grouped to one asset type "2-way stop". The related asset can have another name, for example "tab", "amenity", "add-on", "component", or other name used within the context of management of that asset type. It could also be in some embodiments that groups and individual assets can be grouped together onto an asset logical object. Referring to Image 702.4, one image 702.4 can include multiple assets 12 which can be similar or different. For example, an image can include an amalgamated sign asset 702.4A (the sign, the tab, and the pole), a fire-hydrant 702.B and a different type of a sign 702.4C but not the pole (for example, it could be mounted on a tree or a light post). It is recognized that displaying the appropriate object/asset 12 types could be done through one or more interface 7AA components which could allow to select, filter, change or otherwise affect the presentation of the different asset 12 types and/or configurations either on the image 702.4, on a map 703.A or on other interface components 700-7XX. For example, filtering for amalgamated sign type 702.4A could depict all amalgamated signs on the map 703.A. In other embodiments other assets 12, asset types, and asset configuration could be chosen. Related assets can also be a property of another asset.

Example Data Collection and Processing Including Pruning Functionality Z

Figure 5:
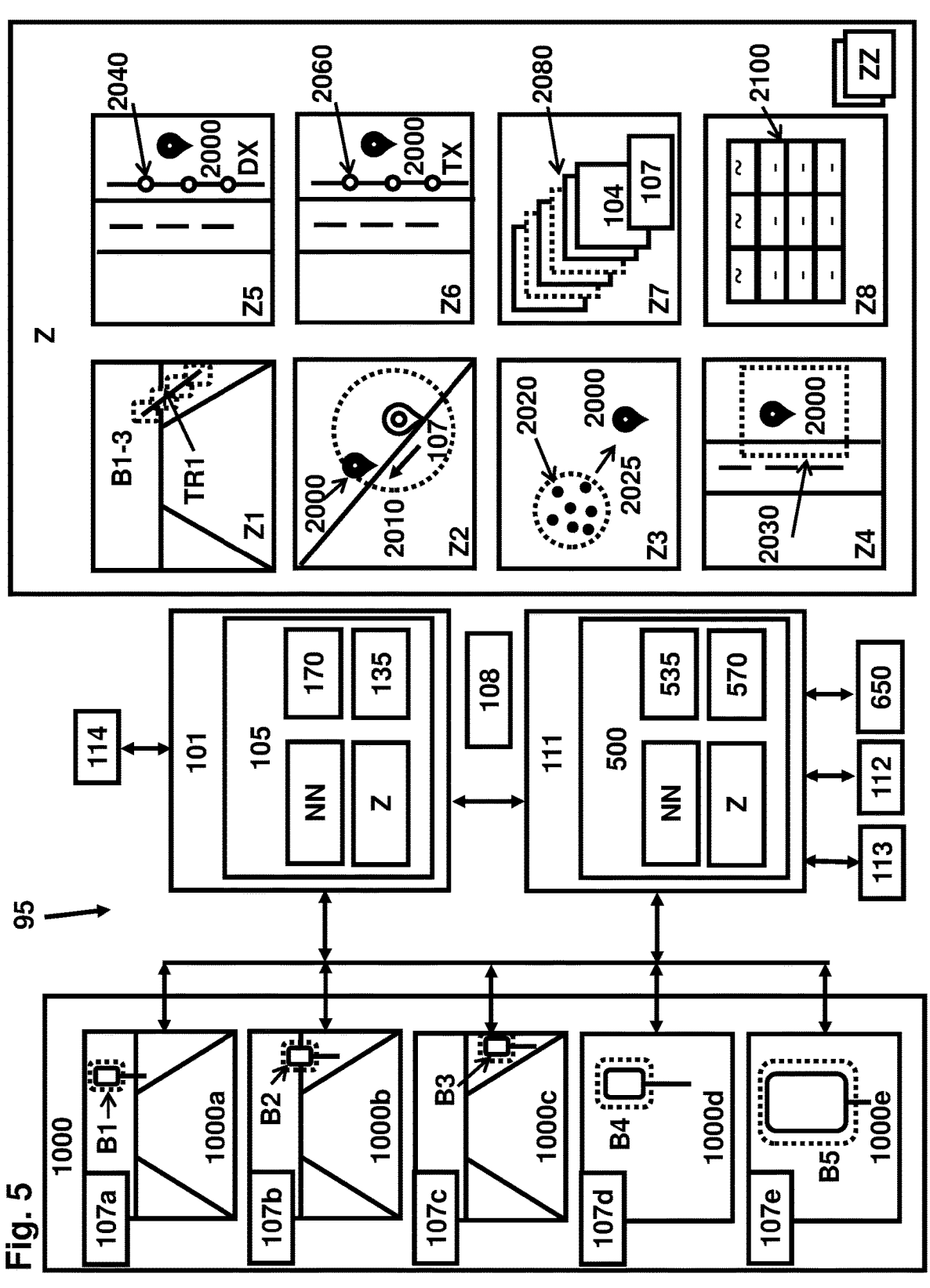
FIG. 5: Depicts examples of various ways in which the system can prune and select the asset data using the example flow of FIG. 3.

Referring to FIG. 1 and FIG. 5 the figure depicts a sample process 95 with various methods for optimizing data collection 1000 and matching of images 104, sensor data 107 and image information 106 to assets 12. The device 101, for example, can be mounted in a vehicle 102 and use edge software 105 for collection of asset data, including processing of images 104 and sensor data 107, and generate new data 106. The device will also use geospatial data 135 and other data 135 (for example, configuration, settings, profiles, parameters, models, etc.) whether residing on disk 203.1 or in volatile memory 203.1, and whether loaded from files, databases, or downloaded from server 111 in other formats (for example, REST, XML, JSON, GeoJSON, etc.), or combination thereof. The data collection software 105 has an assortment of software(s) expected to perform the asset data collection tasks, as well operation and management functions the device's 101 hardware and software. The system 95 uses image processing and AI (further described in FIG. 6), on the device 101, the server 111 or both to identify assets 12 and provide digital data 108, 108' which can be used to create/add, edit, match, update, link, or otherwise generate alerts in relation to assets 12 on the servers 111, with user interaction, without user interaction or a combination thereof. The device 101 can also execute pruning instructions/functionality Z prior to uploading the data 108.

Similarly, the server 111, receiving information 108 from the device 101, can perform its own analysis on the data 108 sent by the device 101 to derive its own results 108', using the servers software 500, image processing operations (further explained in FIG. 6), and in conjunction with its own geospatial data 535 and its own parameters 135 (for example, configuration, settings, profiles, models, etc.) whether residing on disk or in memory, and whether loaded from files or databases, locally or remotely from other systems 112. The server 101 can also execute pruning instructions/functionality Z prior to making the data 108' available to a system user.

It is recognized that the system, using AI and image processing, can continuously collect data 1000 about all assets 12 encountered. The FIG. 5 depicts one sample asset 12 for which data can be captured 1000. However, the collection, storage, transmission, and processing of the data have costs, and in order to reduce costs and scale the system the system 95 can support additional logic Z (e.g. pruning instructions/functionality Z) to optimize the collection of data, processing of data and prune superfluous data. The data reduction logic Z is intended to reduce downstream processing (e.g. at the server(s) 111,112 and/or to the users 113A, 113B,113C,113Z) as much as possible without impacting the system's 25,100 function and performance. In addition, the users interacting 114,113 with the system 95 could benefit from automation of certain operations (for example, capturing of images), and elimination of unnecessary data (for example, duplicate or redundant data). The pruning logic Z can take place for example, for one trip (i.e. images in close sequence as shown in 1000*a-c*), and/or across several trips, conducted by one or more devices 101/vehicles 102/days/ times/perspectives and combination thereof. (For example, 1000*d*-1000*e* depicting images which are different than the ones captured in sequence 1000*a*-1000*c*).

The data reduction logic Z can include for example, object tracking Z1. Object tracking essentially uses the object data 106 generated across a series of images 1000*a*, 1000*b*, 1000*c*, whereas metadata 106 can include bounding boxes B1, B2, B3. The images 1000*a-c*, bounding boxes B1-3, and/or combination thereof could be used, together with one or more object tracking Z1 algorithms/components (for example, Simple, Online and Real-time Tracking (SORT), Deep Sort, MeanShift, CamShift, Kalman Filter, Particle Filter, Correlation Filter, Deep Learning Trackers, Multiple Object Trackers, Intersection over Union (IOU) tracker, and other algorithms meant to track the movement of one or more objects 12 across one or more images 1000*a*-1000*c*. The images 1000*a-c* can be grouped to one or more object tracks TR1. It is recognized that object trackers Z1 can perform better when more images are present. As such, the processing speed of the frames 104 and AI/processing generated data 106 can affect the accuracy of the tracker. In addition, the server itself 111 can process a sequence of images 1000a,1000b,1000c or a video 1000a-1000c provided by the device 101 to perform its own object tracking Z1. Object tracking Z1 could be used for example, to reduce the number of images 104 collected, the number of images 104 processed by the software 105, 500, or a combination thereof.

For example, a vehicle 102,102a approaching an object 12 equipped with a device 101 can detect the same object 12 over a dozen times in a single drive-by. The device 101, using an object tracker Z1, could perform further operations 105 on only the first image of the track TR1, the last image of the track TR1, the middle image of the track TR1, or on any one or more images of the track TR1, depending on the device's 101 programming 170. It is recognized that the collection and processing of images 104 can be dependent processes or independent processes. For example, a device 101 can retain 3 images (first, middle, last) of a track of an object, but process (for example, classify a sign type) only the closest image which is of a higher resolution. If further matched Z to an asset 12, the device 101 can send all 3 images (or only one, or any subset if programmed to do so). The tracking information TR-1 can also be used to assist in determination of an asset 12 position in relation to the device 101, for example, by processing the object movement B1-B3 in relation to the device's 101 positioning 107a-c.

The pruning algorithm(s) Z can include for example, geospatial matching Z2 of the detected data 106, using sensor information 107 (for example, using positioning information 107 and/or heading 107), whereas the collected data 1000, including corresponding sensor data 107, containing asset 12 information 106, can be potentially matched to a geospatial asset 135 stored by the device 101. The sensor data 107 could be used in conjunction with metadata 106 to determine additional insights, for example, which side of the road an asset 2000 is located on. The matching Z2 could be based on proximity 2010, for example, searching the device's 101 asset repository 135 for assets 2020 of a matching type within a certain distance 2010 and/or within an estimated field of view of the captured data position 107. Alternatively, the captured data position 107 could be projected 106, using image processing (such as a projection matrix), Z2 onto an approximate location of where the asset 12 could be. The data captured 1000 position 107, asset projected position 2010, or a combination thereof could be used to improve matching accuracy. Multiple algorithms can be also working together. For example, depending on the direction of movement of the object 12 B1→B3 in relation to the vehicle's 102 position 107A→C, additional insights regarding the object's position in relation to the vehicle 102 can be estimated.

The asset 12 data determination (e.g. pruning) logic Z can include for example, prediction and/or optimization functions Z3 in relation to historical 2020 data. For example, the system 95 could use historical 2020 sensor 107 data, images 1000 and/or resultant data 106 to generate predictions and/or optimizations about the position 2025 of an asset 12, 2000, to assist with its matching. This historical 2020 data can be trained based on data gathered from a particular device 101, a particular vehicle 102, a particular organization, or across some or all of devices 101 of the system 95 (whether system includes one or more distinct end users) to generate predictive models. Examples of predictive models Z3/data science methods Z3, whether supervised, unsupervised, or a combination thereof, can include linear regression Z3, logistic regression Z3, decision tree Z3, Support Vector Machines (SVM) Z3, K Nearest Neighbor (KNN) Z3, dimensionality reduction Z3, random forest Z3, regularized regression Z3, support vector regression Z3, adaboost Z3, gradient boost Z3, artificial neural network Z3, deep learned models Z3, classification Z3, discriminant analysis Z3, Naïve Bayes Z3, regression Z3, classification trees Z3, kernel regression Z3, gradient descent Z3, Gaussian process regression Z3, k-means Z3, k-medoids Z3, fuzzy logic Z3, gaussian mixture Z3, hidden markov Z3, ensembles Z3, or a combination Z3 thereof. It is recognized other predictive Z3/machine learning Z3 algorithms not specifically mentioned can generate the same outcome (for example, a prediction) can also be used. It is also recognized that the data 2020 used for predictions Z3 can also be analyzed, verified, cleaned, optimized and/or reviewed by a data scientist (or a person capable of generating or evaluating said predictive models Z3) prior to said training and/or deployment.

It is recognized that said models Z3/algorithms Z3 can be deployed to device 101 remotely and updated periodically. Examples of data 2020 that can be used for training of predictive models Z3, or for models Z3 used for actual predictions 2025 by the system 95 can include one, some, or all of the following data: date and time, latitude, longitude, speed, rotational axis (x, y, z), gravity (x, y, z), magnetic field (x, y, z), accelerometer (x, y, z), gyroscope (x, y, z), linear acceleration (x, y, z), image resolution (w, h), image zoom level, device higher, bounding box (X1,X2,Y1,Y2), asset class, asset type, confidence score. It is recognized that said models can also use custom models that fuse features from images, image metadata, and/or image processing result data (for example, bounding boxes in images) to generate additional predictions. It is recognized that the above data are just examples, and any sensor 107 data collected by the device 101, and any resultant data 106 generated by the device 101 could be used to train the models. As such, one or more fields can be added, one or more fields can be removed, and one or more fields can be modified, based on what data 107, 106 is available by the device 101 and as deemed necessary by the scientists which generates models Z3 for the devices 101. The predictive data could be trained to predict, for example, absolute coordinates of an asset 2020 (for example, latitude/longitude or northing/easting). The predictive data could also be trained to predict, for example, relative coordinates of an asset 2020 (for example, latitude/longitude or northing/easting) in relation to the device 101 position 107. The predicted position can help with matching the collected data 1000 to an asset 2000. It can also be used to predict other elements that can be used for data collection optimization Z.

The asset 12 data limiting function/pruning logic Z can include for example, geo-constrained data collection Z4 whereas once the device's 101 position 107 is determined Z4 to be within an area 2030 (for example, a geofenced zone 2030), the device 101 collects and/or processes data 1000. Said generated geo-zones 2030 could be generated for example, using other geospatial assets 135, 535. For example, an asset 12, 2000 can have geospatial coordinates (for example, latitude and longitude). The object 12, 2000 could be used to generate a square or rectangle geo-fenced zone 2030 (with a certain width and height, for example, in meters or feet), whereas once the device 101 is contained in the geo-fenced zone 2030 its asset data capture 1000 functions are activated. It is recognized that different assets 2000 can have none, one or more geo-fence capture zones 2030. It is also recognized that the area 2030 can vary from asset 2000 to asset 2000. The end-user organization can also have a geo-zone representing the boundaries of the area it maintains containing all assets so that data is not collected outside of its responsible areas. The geo-constrained collection and/or processing logic can be for any shape of an object, such as a square, rectangle, circle, ellipse, polygon, multi-polygon or other common map objects. The shape can be directly programmed, or generated as an offset from the asset. For example, data collection for a road asset could be for example, based on a polyline, line, multi-line, or other such GIS asset used to describe a road, and data collection and/or processing on the road object could be based on a shape object that is generated for the road, or based on a distance from the road object.

The asset 12 pruning functions Z can include optimization Z5 of capturing data 1000 based on distance intervals. The distance intervals DX can be every X meters/feet. The intervals could be calculated as a distance DX travelled measured as the distance between two points over a course of time. Once the distance threshold DX has been met, the optimization Z5 algorithm can collect data 1000. The distance differential could also be associated with data capture assets 2040, (for example, road segments, lines, mini-segments, offsets, or other terminology used describe distance intervals). For example, once the device 101 detects an asset 2000, it can initiate data capture for the asset 2040, where it will capture data 1000 that can then be associated with a nearby asset 2000. It is recognized that the distance intervals DX could be programmable. It is also recognized that the intervals DX could be optimized for a particular asset 2000, area or other assets (for example, roadway, bus stops, signs, etc). It is recognized that assets in some embodiments can require collection and/or processing of data from multiple distances, for example, bus stops for multiple perspective, or a sign—close for inspection and far for sightline analysis, whereas the maximum distance the sign (or other asset) is visible from.

The asset 2000 data pruning component(s) Z can include optimization Z6 of capturing and/or processing data 1000 based on time interval TX. The time intervals TX can be based on any time unit (for example, milliseconds, seconds, hours, days, weeks, months and/or years). The intervals could be calculated based on an absolute time or a relative time. The intervals can be recurring or non-recurring. The intervals could relate to one (whereas one, for example, one vehicle 102 grabbing multiple images 104 in one pass) or more (for example, one or more vehicles 102 collecting images 104 of an asset 12 every week) data capture 1000 sessions. A session can mean, for example, a vehicle 102 trip and/or a sequence of images 104 captured related to an asset 12. The optimization Z6 algorithm can also be associated with general programming, or in relation to particular assets 2000. For example, once the device 101 detects an asset 2000, it can initiate data capture for the asset 2060, where it will capture data 1000 that can then be associated with a nearby asset 2000. It is recognized that the time collection intervals TX could be programmable. It is also recognized that the time collection intervals TX could be optimized for a particular asset 2000, area or other assets (for example, bus stops). Z6 can also determine the rate of inspection.

The asset 2000 data sequence pruning component Z can include optimization Z7 of capturing and/or processing data 1000 based on sequence 2080 of images 104, whereas a portion of images 104 and corresponding sensor 107 data are excluded from collection and/or processing. For example, the device 101 can first capture a set of images 104 and corresponding sensor data 107, and then, based on its programming, discard 2080 images 104 and sensor 107 data which is deemed unnecessary. The removal 2080 of unnecessary data 104, 107 can be based on various criteria, such as a frame type, frame number, frame sequence number (in relation to asset 12), keeping a portion of the images 104 per asset 12 (whether an absolute number, or a percentage), keeping data 104, 107 based on logic (for example, first, middle and last pictures 104 are kept, others discarded), or keeping data 1000 from different perspectives 104. It can also be as simple as throttling 2080 the capture based on either criteria, for example, vehicle speed 106, temperature 107, cpu load, gpu load, The discarding 2080 can also be set on other criteria. The discarding 2080 can also relate to extracting images 104 and corresponding sensor data 107 from videos recorded on the device 101. The results of the optimization Z7 process are the exclusion and/or removal of unnecessary data 104, 107 along the system's 95 workflows to minimize downstream data processing, storage, and/or transmission.

The data grouping pruning logic Z can also relate to a matching logic Z8 used specifically to match the collected data 1000 to an asset repository 2100. Embodiments of asset properties 2100 are described in in FIG. 4, as fields 700, for example. The properties 2100 would typically reside in a database 535, file 535, geodatabase 535, or otherwise in some sort of a data repository 535 with fields that can be used to describe an asset 12 digitally 2100. The ability to match an instance B1, B2, B3, B4, B5 of an asset 12 to its digital record 2100 can help to determine if and what portions of the data 1000 need to be collected, processed and/or retained. For example, if the software 105, 500 object detection capabilities identified a sign B1, and classified sign B1 as a stop sign, then the matching Z logic could identify candidate stop signs 2100 from a list of potential assets 2100. The potential assets 2100 list could be further refined, for example, based on additional matching Z8 properties 2100. For example, if the sign B1 has a two way stop tab, then that can be a property 2100 used to further refine the matching assets 2100. Sensor data 107, for example, positional information 2100 of the sign 12 can also be used to refine the search results. The search refinement can take place as one or more steps deemed to narrow the search results 2100 and selecting the most likely asset 12 from the list 2100. Once an asset 12 is matched Z8, the digital records of the asset 2100 can also have additional properties which can be used to determine if data 1000 should be collected, processed and/or retained for each particular instance of data collection 1000, and if so, to what extent (none, one, some, or all of the data 1000). The matching can use also device 101 sensor 107 information, for example, orientation, position, location.

It is recognized that both the device 101 and the server 111 have their own asset repositories 135, 535. It is recognized that the device's 101 asset repository 135 can be a subset or a copy of the server's 111 asset repository 535. It is also recognized the device's 101 asset repository 135 can include some fields which are different than the server's 111 data repository 535. The repositories can include assets 12 which are specifically excluded for data collection 1000, for example, assets 12 which do not belong to the end-user, but which are identified by the system 95. In the event that the matching logic Z8 (e.g. matching algorithm(s)) does not match any asset 2100, the data collection 1000, or a portion thereof, can still take place to alert the user 114, 113 that there is potentially a new asset 12 to be added to the repository 535,135. The matching can also rely on data from third party systems 112.

The system 95 can have additional ZZ data optimization Z techniques, related to the device's 101 settings/configuration/parameters 170, the server's 111 settings/configuration/parameters 570, or a combination thereof. For example, the system 95 can be programmed to collect and/or process data 1000 when only certain conditions are met (or alternatively, not to collect and/or process data 100 when certain conditions are met). Examples of such optimization conditions ZZ for collection and/or non-collection can include: (a) time of the day, whereas data 1000 is collected or discarded during one or more time blocks in a day; (b) day or dates, whereas data 1000 is collected or discarded on specific days (whether absolute or recurring); (c) lighting conditions 106, whereas data is collected or discarded based on the presence of lighting being present for a quality image 104 or absence of lighting, for example, for night time inspection; (d) image orientation 106, whereas, for example, if the device 101 is installed upside down or at a wrong orientation, and the images 104 are flipped or rotated, such data can be discarded (or in some embodiments corrected by the software); (e) related asset 12 matching, whereas data 1000 is collected or discarded only if a related asset 12 is also matched; (f) object position 106 matches certain criteria, whereas data 1000 is collected/processed or discarded only if the object data 106 is present or not present in a specific region in an image 104 and/or contained or not contained in another object 106; (g) object metadata 106, whereas data is collected or discarded based object metadata 106 such as class 106, confidence 106, object condition 106, object issues 106, and/or other object criteria 106; (h) heat, temperature, CPU usage, GPU usage, data, memory or other computing restrictions which require the optimization algorithms ZZ to change the processing rate and/or distribute the data 108, 108' to other device(s) 101, server(s) 111 or a combination thereof; (i) inspection criteria, for example, whereas some inspections include images 104 and some inspections only include metadata 106 thereof; (j) volume (for example, of images 104, data points 108, bandwidth, data size), whereas the device 101 is optimized to not exceed a certain volume for a specific image or a set of images, either per instance or on a time window or time period basis; and/or (k) other programmable criteria as noted in the description.

It is recognized that the pruning logic Z can take place directly in the device's 101 software 105, on the server 111 software 500 or a combination thereof. It is also recognized that the optimization pruning logic Z (whether collection or discarding) can be in different embodiments in one or more software 105, 500 components. For example, the Data optimization pruning logic Z can be in one or more of the following software processes/components (if existing and applicable): device 101 data capture, device 101 data processing, device 101 data storage, device 101 data transmission, device 101 data deletion, server 111 data receipt, server 111 data processing, server 111 data storage, whereas each one of the software processes can have one or more instances of each software process is operating in series or in parallel with other software processes. It is also recognized that one or more software processes can be embedded/grouped/function of another software process. It is recognized that one or more instances of each optimization method z1, z2, z3, z4, z5, z6, z7, z8, zz can work in conjunction with any one or more instances of other optimization method z1, z2, z3, z4, z5, z6, z7, z8, zz resulting in further optimization. This can be hard coded, configurable, and/or adjustable. Pruning Logic Z can vary based on use case(s), asset type(s) parameter(s), condition(s), setting(s), configuration(s), preference(s), organization(s), end-user(s), algorithm(s), available data, connectivity, bandwidth, storage, capacity, device(s), server(s), profile(s), vehicle type(s), system hardware, system software, and other applicable criteria noted in the description.

Pruning logic Z can include one or more of the following function(s) and/or concept(s): discarding (for example, not saving or processing data), grouping (for example, grouping several data point(s) based on a common criteria), matching (for example, matching data point(s) to a specific asset), exclusion (for example, not collecting data based on set criteria), inclusion (for example, collecting data based on set criteria), extraction (for example, using only some of the collected and/or derived data), throttling (for example, limiting the amount of data that is captured and/or processed), compression (for example, reducing the size of captured data, whether with loss or lossless), retention (for example, temporary storing more data than what is required for potential processing later), deletion (for example, deleting data that is no longer required), prioritizing (for example, prioritizing some data over other data), assembling (for example, collecting multiple points of data which are assembled to a whole), verification (for example, confirming whether data is required), requesting (for example, specifically asking for a data record), selection (for example, selecting specific data based on criteria for further processing.

FIG. 6 depicts a sample system embodiment 25 whereby a device 101 data, such as image data 104, sensor data 107, GIS data 135, and other data 170 (for example, configuration data, derived data, portions of result data 108, and other data described throughout this invention), is being processed by the device's 101 software 105, said software 105 includes general software 105.0 (for example, operating system software) and asset processing software 105.1-105.X. The result of the device 101's processing 105.1-105.X are generated as data to be sent 108 to server 111. Similarly, the server 111 is equipped with software 180, which includes general software 500.0, such as operating system software 500.0, database(s) 500.0, and general applications (web services, frameworks, etc) 500.0, along with software 500.1-500.X, geospatial data 535 and other data 570, to process the device's 111 data 108 and generate server data 108'. The generated server 111 data 108' can then be accessible to users through a user interface 113 or integrated to third party systems 112.

Referring to FIG. 6, FIG. 1 and FIG. 2, we will explain a sample workflow, demonstrating the results of various edge software 105 operations 105.1-105.X that can be viewed in real time, near-real time or recorded for later viewing and/or analysis on device 101 software 180. The results of the processed information 108 can be presented on the device's 101 display 204. The user, through a user interface 204 can interact with the results of the processing on the device software 105. They could be presented as overlays or labels presenting some or all of the information generated by the image processing operations as indicated in this description (boxes, keypoints, masks, and other result data). For example, bounding boxes (or other subsequent data derived from image processing), labels, or overlays which can be generated in real time and/or near real time to show where asset(s) 12 are located within images 104. The combination of geospatial analysis together with image processing can also show the asset 12 on a map. The interface 204 can also show other information in relation to the asset 12 as may be available in the database 135, 535. The user can be alerted to new assets 12 and can be prompted to add the detected asset to an asset 12 inventory. The device's 101 software 105 can include necessary functions for directly for identifying assets 12, inspecting assets 12, matching assets 12, and/or otherwise communicating information in relation to the device 101 and its functions. Examples of such software functions 105 can include sensor data acquisition (including location data from the sensor), integration to external components, user interface input and output (for example, contact/audio/visual), interacting with databases, files, artificial intelligence inference, computer vision operations, predictive operations, statistical operations, function fitting operations, heuristic operations, metaheuristic operations, logging and diagnostics, execution of software libraries, reading and writing from and to files, querying databases, inserting data to databases, updating databases, removing databases, geospatial operations, deleting unnecessary files, data and entries, garbage collection, communications to server for data upload/download, software for updating device's software, and other software operations. For greater clarity, throughout this description plural and singular could be interchangeable in some cases, though it is not always mentioned specifically.

While some software can be more general 105.0 and applied more broadly, some operations 105.1-105.X can be more specifically attributed to the process of generating asset data 108. For example, the data contained within the bounding boxes of assets 12 in images 104 can be derived 106 from image processing modules and used in subsequent software operations, for example, to assess the condition of the asset 12 after its detection. Depending on the workflow and inspection use case, it may or may not necessary to use some, all, or only the portions of the image 104 data that are most relevant. Some additional benefits of only processing portions of the images 104 can be lower processing requirements, lower data transmission sizes, faster reading/writing to disk, and lower storage costs. The process/benefits can also be carried downstream to the server 111. This process can be executed with device software 105 or server software 500. The server 111 software 500 can similarly have software for general purposes 500.0 as well as more specific software 500.1-500.x for processing incoming data 108 and to generate subsequent asset data 108'. Asset data 108, 108' can include images, image crops, object instances, bounding boxes, polygons, polylines, keypoints, image processing operations metadata, asset information data, location information, other sensor information, and other metadata, fields or properties. Processing of data can use one or more processors (whether CPU, GPU, both or other distribution of processors), on one or mode device(s) 101, one or more server(s) 111, or one or more device(s) 101 and server(s) 111.

Referring to FIG. 2, the device software 105 is a collection of procedures and software 105.0, 105.1-105.X. The device 101 requires software 105 to manage its internal components such as cameras 201.1, 201.2, memory 203.1, processors units 203.2, graphic processor units 203.7, location sensor 203.3, sensors 203.4, 203.5, 203.8, display 204, buttons 205, speakers 206, microphone 209, power components 207.1, 207.2, 207.3, microphone 209, SIM 210, and other components, whether residing inside the enclosure 211 or outside of it. The device 101 internal operating software 105.0 creates an environment that supports accessing the device's 101 sensors and running applications 105.1-105.X. The device 101 can be either in its original state, modified through settings/configurations, or rooted (modified with custom files that override the device's 101 original files). The device 101 can also be operated in special modes, for example, with elevated permissions granted by device's 101 operating system provider or third party provider.

Image data 104 can be obtained from the camera sensor 201.1, 201.2. The image data 104 can be initially in its raw form in an initial formatting, resolution, and color scheme. The image data 104 can be pre-processed prior to the data being used by the AI operations 105.1-105.X, 501.1-501.X to ensure that it meets the input specifications of the AI models. Some examples of potential modifications are changes in resolution, cropping, field of view modifications or color space conversion. The processing of image data can take place on the device 101 using its one or more processors, such as single or multiple core CPU 203.2 and/or GPU 203.7 respectively. Similar processing functions can be executed on the server 111 using server hardware 111 and server software 500, for example, on video or image files 104, 108' collected by the device 101. Asset Management requires the determination of where all assets are and the condition of the assets. This means that the results of the image data 104 processing is combined with sensor data 107, including at least geo-location but also potentially other sensors such accelerometer, gyroscope, rotational vector and other sensor data to help identify and estimate the position of the asset 12. In general, as shown in example S1, image data 104 can be processed by an image processing operation 105.1-105.X which can include a neural network NN to generate information 106 about the image 104. The information can then be acted on.

The processors (e.g. 203.2, 203.7) can be used to implement the stored processing functions, such as but not limited to: the pruning function Z, the image processing function(s) and/or GIS functions described herein for generating new data from the digital images, the image processing function(s) operating on the one or more data collection devices 101 and/or the one or more servers 111,112. The data pruning function Z facilitates optimizing an amount of at least one of the image data, the sensor data and the derived data; the data pruning function Z operating on the one or more data collection devices 101 and/or the one or more servers 111,112.

Referring to FIG. 6, FIG. 4, and FIG. 4B, the user, can also interact with the results of the processing on the server 111 using a client software 113. The user can interact with the collected data 108, 108', together with asset information available on the server 111, and any asset properties 701, asset overlays and images 702, and location information 703, 704 which are available. The user can interact with any asset data 108, 108' which is available, and can become available in the system 25, by some or all of the following: (a) the device software 105; (b) the server software 500; (c) integration with databases or third party systems 112; (d) the user manual operations through an interface 113; (e) and/or other sources of data.

In addition to the examples described in FIGS. 4A and 4B, some examples of user interaction can include instances when assets are miscategorized (for example, being labelled by the software as class "a" where in actuality, the asset is class "b") or unidentified (for example, being present in the picture 104, but not detected by the software 105, 500), Additionally, the user can approve, reject, substitute or modify the generated data 108, 108', whether on the device 105 through a local interface 204, or the server 500 using a other user interfaces 113. Based on the software 105, 500 processing results, for example, confidence score or other derived parameter of interest in relation to an object identity, category, condition, location, and/or other result field, the information can be programmed to be automatically flagged for further review by a person or a subsequent AI inspection algorithm. Some sample conditions that can be programmed to cause flagging of image data 104 such as improper asset installation, obscured asset, unmatched asset, missing asset, or asset for which the processing results do not meet certain thresholds set by the system's 25 programming. The rejected data can be further reviewed by the software 105, 500 and/or user 204, 113. Furthermore, the information can be used to mark the object as not an asset to be recorded in the GIS database 111*a* and asset information database 111*a*.

Referring to FIG. 6, the system 25 uses multiple methods to accomplish asset 12 surveying, asset 12 condition assessment and accurate determination of the position of an asset 12. These can be distinct capabilities and can require different software operations, algorithms, and software functions. The methods can take place on the device, the server, or both. It can also be verified/processed by a person through a user interface 113.

Example AI and neural network NN configurations

The analysis of images could be done with operations such as image processing, artificial intelligence processing, neural networks NN, or a combination thereof. It can include one or more software operations 105.1-105.*x* such as: (a) object detection, wherein one or more objects of one or more possible types is detected in an image, typically marked through some image coordinates (typically a bounding box, but can be other), along with a description (label, text or class) and a score (such as confidence or probability); (b) image classification, wherein an image is described with one or more label(s), text(s), or class(es), typically with a score (such as confidence in prediction); (c) Image segmentation, wherein the image is broken down to regions, and each region is assigned a potential class/label/text and a score (for example, confidence or probability); (d) instance segmentation, wherein the image is broken down to regions, and each region is assigned a potential class, and wherein regions form instance(s) of an object, with a label/class and confidence score. Said objects can be described by a mask (a pixel overlay or a polygon encompassing the object), and/or image coordinates, such as a bounding box; (e) one or more of the following, landmark identification, keypoint detection, and/or pose estimation, whereas an image is analyzed and activations are made for certain points representing areas of interest which can be expected for a certain object, said points or landmarks and their pattern can help to identify status, pose or object type or class, along with a score (typically confidence); (f) edge detection, wherein image processing operations help to create an outline of an object which can be used to classify it; (g) thresholding, wherein certain color ranges are filtered, helping to differentiate portions of an image which are of a certain contrast or variance from other portions of an image; (h) blob detection, wherein image processing operations segment an image to sections which can then be classified or further processed. It is recognized that these are just a few examples, and with customizable operations, steps, models, sequencing, algorithms and software, other AI and/or image processing operations that can be used to identify an asset 12 in an image 104, analyze it, and extract information 106 and/or metadata 106. It is recognized that the above are just examples and other model types with different inputs and outputs could be used within the system.

The software operations can be executed by using computer vision operations, image processing operations, and/or the use of neural networks NN. Common terminology can also include machine learning, artificial intelligence, deep learning and neural network (NN) variations—Artificial Neural Network (ANN), Deep Neural Network (DNN), Convolutional Neural Network (CNN), Recurrent Neural Network (RNN), and other neural networks NN. When neural networks NN are involved, the base models are trained on annotated data, which can include images, sensor information, or a combination thereof together with annotations. The training of a neural network requires, for example, that many thousands of images are provided as a ground truth for the AI model to be trained on. These images can be annotated by human annotators provide a source of ground level truth. Typically, larger datasets and quality annotations increase the accuracy of the AI operations. The results of the analysis operations 105.1-105.*x*,501.1-501.*x* can then be further processed together with sensor information (for example, direction, longitude, latitude, speed, etc) using geospatial queries, geospatial databases, computer vision algorithms, AI and other specialized algorithms to process the sensor data, geolocation data and/or image data for creating, editing, updating, matching, deleting, linking, and/or flagging assets.

Flagging or alerting, can include, for example GIS data that has been previously recorded (for example, a sign used to be there) and no asset has been detected by the AI, this anomaly is dealt with by alerting the user (based on a set criteria) for further investigation and review. This can be in real time through device 101. It can also be through a user interface 113 accessible from the server 111.

The image processing/artificial intelligence/machine learning aspect of the invention can use neural network(s) NN. Neural Network NN is a structured algorithm that can rely on machine learning to essentially recognize relationships and patterns in data. Typically, neural networks NN have nodes (also sometimes known as neurons, perceptron, or other computational unit name), and those nodes are typically organized onto layers. The nodes typically receive inputs, apply a function (including weights) to produce an output, and pass it on to the next layer of nodes. The weights assigned to the inputs determine the importance of each input for the computation. The networks typically have input layers, one or more hidden layers, and output layers. The input layer intakes the data, whereas the output layer produces a prediction and/or classification. The layers, including hidden layers, can vary in their number (more layers can be also referred to as a deeper network) and their size (the number of nodes per layer). The nodes are interconnected and the connections (which can be weighted) between nodes allow information to flow through the network during the computation. The functions are sometimes referred to as activation functions and allows the network to model complex datasets. This is a high level description and other variations of NN can exist.

Another element of a neural network NN is that it can be trained. The machine learning aspect of a neural network NN involves training it on a labeled dataset. The training process adjusts the weights of the connections between nodes with the goal of minimizing the difference between the networks' inference results (predictions) and the ground truth (labeled data). This can be done by backpropagation, where the network continuously updates the weights during the learning process to minimize the errors. Typically, the more data provided the better the results will be (though the improvement is not linear). The model can also have inherent limitations as to how well it can perform based on its architecture.

The neural network NN can have different architectures which take data 104,106, 107 as input, process it, and provide an output/prediction. The neural network NN architecture could have operations aimed at aggregating, simplifying, generalizing, manipulating and/or adjusting the information of another layer for the purpose of predicting, identifying, inferring, detecting, classifying, marking, labeling, and/or segmenting objects 12 in images 104 or related data 106. The Neural Networks NN functions can also include specific types of operations, such as: (a) Convolution; (b) Rectification (ReLU); (c) Fully Connected/Dense Layers; (d) Pooling Layer; (e) Bottleneck layer; (f) Loss Layer; (g) Dropout Layer; (h) Batch Normalization; (i) Recurrent; (j) LSTM; (k) Attention; (i) Skip; and (j) other operations (whether node based or layer based).

Examples of some popular architectures which could be used by the system 25 could be: (a) Convolutional Neural Networks (CNN); (b) Region-based Convolutional Neural Networks (R-CNN); (c) Fast R-CNN; (d) Faster R-CNN; (e) You Only Look Once (YOLO); (f) Single Shot MultiBox Detector (SSD); (g) Mask R-CNN; (h) U-Net; (i) DeepLab; (j) Generative Adversarial Networks (GANs) (k) region-based fully convolutional networks (R-FCN); (l) Feature Pyramid Network (FPN); (m) ResNet; (o) Pyramid Scene Parsing Network (PSPNet); (p) FCN (Fully Convolutional Network); (q) SegNet; (r) RetinaNet; (s) Region Proposal Network (RPN), (t) other variations thereof, or published or proprietary neural network NN architectures The Neural Network NN can be already pre-loaded with weights, allowing it to train faster on new data (for example, through transfer learning). The pre-trained model can already have its weights or parameters stored in a model file or a weight file. The Neural Network NN used by the system can be based on a published, well known model files. For example, the Neural Network NN can be based on Mobile-Net (such as MobileNetV1, MobileNetV3, MobileNetV3, or newer), Yolo (such as YOLOv1-8 or newer), Inception (such as InceptionV1, InceptionV2, InceptionV3, or newer), imagenet (such as ImageNetv1, ImageNetv2, or newer), EfficientNet (such as EfficientNet-B1-7, or newer), EfficientDet, CenterNet, SpaghettiNet, SqueezeNet, VGG, ResNet, or other popular pre-trained networks and variations thereof (at the different available and/or supported versions). It is recognized that different model files could be used for different tasks (for example, object detection, image classification, image segmentation, instance segmentation, keypoint detection, pose estimation, or other tasks). It is recognized that in general, Neural Networks NN could have similarity whereas a base architecture with base weights is modified whereby one or more of the last or final layers is modified to detect, classify and/or depict a set of objects 12, which can be identical, exclusive, partially inclusive, or fully inclusive of the original objects and can include new objects not present in the original neural network NN. Neural network(s) NN can also be of a proprietary custom architecture with weights or parameters which are trained/initialized with data for the first time. The Neural Networks can function as part of open frameworks/libraries such as a Tensorflow, PyTorch, or use propriety/custom frameworks.

In general, visual assessment 105.1-105.$x$, 500.1-500.$x$ is used to identify the asset 12, and analyze its condition. Referring to asset condition analysis, it is a broad term and can include different analysis for different types of assets. Furthermore, different organizations, departments, and end-users can be interested in different conditions for the same asset. The system 25 can therefore generate information 108, 108' about the condition of an asset which can vary depending on the application, for example: the system could simply provide a binary assessment of an asset 12 (for example, pass or fail); the system could provide a qualitative rating for the asset 12, for example, excellent, very good, good, fair, poor, or fail; the system could provide a numerical rating for the asset 12, for example, 0 to 100, 0 to 1, or other range; the system could identify particular issues (for example, broken, malfunctioning, worn out, obstructed, occluded or other issues); the system could provide multiple levels of granularity/categories, for example, an asset which is considered failed, broken, and cracked, whereas cracked is a child of broken, and broken is a child of failed; and/or the system could have multiple labels for different conditions simultaneously. For example, an asset can get a pass rating for one assessed condition but a failed rating for another—such as a sign whereas the sign itself is in good condition (getting a pass rating), but the pole on which it is mounted is bent (getting a fail rating). It is recognized one asset can have one or more conditions assigned to it.

Some examples of potential issues which can relate to assets 12 can be: (a) presence issues, where an asset or one or more components of the asset is expected to present but it is missing, misplaced or located elsewhere; (b) structural issues or physical damage issues, whereas the asset or one or more of its components is broken, shattered, chipped, bent, cracked, deformed, punctured, disintegrated, sheared, cut, rutted, warped, bleeding, heaved, depressed, mangled, twisted, shattered, smashed, shot or otherwise physically damaged; (c) orientation or continuity issues, whereas the asset or one or more of its components are leaning, fallen over, twisted, warped, uneven, mis-aligned, non-aligned, facing the wrong way, rotated, tilted, flipped, sunken, raised, recessed, protruding, dropped-off, or otherwise not positioned properly; (d) visibility, obstruction and/or occlusion issues, whereas the asset or one or more components of the asset are being covered, obscured, obstructed, blocked, clogged, or occluded by one or more objects. The covering/occluding/obstructing object can be, for example, another asset, the growth of a vegetation, foliage, or shrubbery, human made garbage or debris, naturally occurring debris such as branches, leafs, rocks, dirt, mud, dust, slush, snow, whether in full or in part. The issue can be due to the lack of visibility (for example, an occluded stop sign can contribute to the occurrence of a vehicle collision), or can be due to a physical obstruction (for example, a stormwater drain clogged by debris can contribute to a flooding scenario); (e) use, wear, tear and exposure issues, including issues encountered due to asset's use, or asset's exposure to the environment or weather, whereas the asset or one or more of its components can experience failures, whether mechanical, electrical, material or degradation, such as corrosion, oxidization, decomposition, rusting, erosion, tarnishing, discoloration, change of color, changes in texture, staining, chips, cracks, swelling, peeling of paint or coatings, pitting, leaking, flaking, bubbling, fading, or failures of an electrical component, whether absolute (for example, burnt lightbulb), or partial (for example, reduced luminance), failure of a mechanical component, and/or other such failures, whether absolute, or partial; (g) vandalism issues, such as graffiti, paint, stickers, drawings, dents, scratches, etchings, stencils, adhesives, splattering, breaking, smashing, or other vandalizing, defacing and/or other damaging actions; (h) day and/or night visibility issues, where an asset or one or more components of the asset are not adequately visible at day or at night, dimming, flickering, broken lighting, poor material reflectiveness, poor retro-reflectivity score, fade of material, wear and tear of material, orientation, and/or other to electrical, mechanical or material malfunction which compromise the asset's visibility at day and/or at night; (i) capacity issues, such as over-filling or under-filling issues, whereas the asset or one or more of its components, are used beyond the intended capacity or under the intended capacity, for example, a waste bin being overflowing with garbage, or a bus station overflowing with people. (j) accessibility issues, whereas the asset 12 or one or more of its components, is inaccessible due to environmental conditions (for example, excess snow, ice, water or vegetation), manmade obstructions (for example, debris, shopping carts or encampments), asset failures (for example, broken access ramp, or a combination thereof (for example, snow plowed to the side of the road forming snow wall which prevents access to sidewalk); (k) chemical, biological, environmental, toxic and/or hazardous issues in proximity or in contact with the asset or one or more of its components, examples of which can include dead animals, carcasses, excrement, urine, invasive plant species, dangerous animals, infestation, fungi, garbage piles, used needles, used contraception products, used personal hygiene products, medical waste, chemical waste, radioactive materials, food waste, spills, dumping, broken glass, exposed wires, trip edges, and other such products or use cases that can deter use or be hazardous to people, animals, plants and/or the environment; (l) cleanliness issues, in which an asset or one or more of its components are dirty due to accumulation of dust, pollution particles, salt, or other particulates which coat the asset or otherwise form film or coating, whether organic or inorganic; alternatively, cleanliness issues could be due to human factors (garbage, littering, vandalism); (m) compliance issues, where an asset or one or more components of the asset fail to comply with a standard, regulation, policy and/or best practices, for example, in relation to accessibility, safety, maintenance, and/or asset management. Some examples can include illegal parking (for example, utilization of a parking space asset 12 during no parking hours), encroachment issues (for example, a vehicle parking on a sidewalk, creating accessibility issues), encampments, excessive vegetation growth, or other compliance issues; (n) abnormal status issues, whereas an asset 12 is in an abnormal state. For example, a garbage bin access port being open, a streetlight being on (during day time), a traffic light flashing yellow, or other abnormal status issues. It is recognized that one or more issues can be present in one or more groupings. It is also recognized that in addition to the grouping provided, examples of issues could also be grouped differently. It is also recognized that assets 12 can experience multiple issues at the same time.

Such issues can range from simple cosmetic and/or appearance issues, to minor function or safety risks, to issues which can create potential non-conformance to standards and potential liability, to serious malfunction or degradation in the asset function. The identified issues can render it, for example, it sub-optimal, ineffective, inoperable, risky, inaccessible, useless, dangerous, and/or other conditions.

It is recognized that the image processing operations 105.1-105.x, 500.1-500.x, geospatial functions 105.1-105.x, 500.1-500.x, artificial intelligence operations 105.1-105.x, 500.1-500.x, data storage operations 105.1-105.x, 500.1-500.x, data transmission operations 105.1-105.x, 500.1-500.x, data fusion operations 105.1-105.x, 500.1-500.x, data pruning Z, 105.1-105.x, 500.1-500.x, framework functions 105.1-105.x, 500.1-500.x, library functions 105.1-105.x, 500.1-500.x, modules 105.1-105.x, 500.1-500.x, and other software operations 105.1-105.x, 500.1-500.x can be performed in the device 101, the server 111 or a combination thereof. The operations 105.1-105.x, 500.1-500.x can occur constantly, continuously, conditionally, in batches, and/or on a scheduled basis. The operations 105.1-105.x, 500.1-500.x can occur in real time, in near-real time, with delay and/or on a throttled basis. The operations 105.1-105.x, 500.1-500.x can take place in one or more applications, in one or more processes, in one or more sub-processes and/or in one or more threads. The system operations 105.1-105.x, 500.1-500.x can take place concurrently, in sequence, or a combination of both.

The order of operations 105.1-105.x, 500.1-500.x can be hard coded, configurable, or programmable using flexible workflows. Depending on the device's 101 programming 105 and the use cases, the order of operations 105.1-105.x, 500.1-500.x can vary to accommodate various factors, such as: (a) processing speed on device 101; (b) processing speed on server 101; (c) reducing load on the device 101; (d) reducing load on the server 101; (e) reducing data transmission from device 101 to server 111; (f) reducing data transmission from server 111 to device 101; (g) distributing the processing load across one or more devices 101; (h) prioritizing certain software operations over others; (i) distributing the load across one or more servers 111; (j) extracting and/or processing a specified amount of information (k) selecting and/or sequencing certain operations 105.1-105.x, 500.1-500.x in a certain order on the device 101, on the server 111, or a combination thereof to improve any other metrics. Examples of metrics can include accuracy, recall, precision, F1 score, mean Average Prevision (mAP), Intersection of Union (IOU), mask Intersection of Union (mIOU), mean absolute error, mean squared error, root mean squared error, r-squared, mean average error rate, latency, geolocation precision, device temperature, cpu 203.2 usage, gpu 203.7 usage, memory 203.1 usage, disk usage, bandwidth usage, storage volume, volume of data entries, volume of data discarding, volume of data selection, database entries, files or other such data science, computer science, AI or IT performance metrics. It is recognized that some or all of the metrics can be applied to the device, the server, or a combination thereof. It is recognized that the workflows can also be adjusted for different business requirements (for example, acquiring and/or processing more or less images and data for an asset/asset type).

Example System Operation Including Pruning Functionality Z

In one sample embodiment, the system 25 can include capturing data on the device 101. The device's software 105 can then use image processing 105.1-105.x, for example, object detection 105.1-105.x to identify and assess an asset 12 in the captured picture 104. In the same, or in another step 105.1-105.x, the image processing/AI 105.1-105.x can discern assets 12 that are in good condition and those that are in need of further attention using image classification 105.1-105.x. It can also discern different asset 12 types. The image 104 containing the asset 12 can be reduced through cropping of unnecessary data. The same or different image processing operations 105.1-105.x can also be used to redact personal information, such as people's faces, cars, homes, and other personal information. The same or different image processing operations 105.1-105.x can also be used to redact image background data not containing assets or outside of region of interest. Additional processing 105 can take place on the device 101 in relation to correlating derived data 106 to known asset data 135 (for example, matching data), de-duplicating data (for example, two images 104 which refer to the same asset 12), pruning/selecting data Z and logging issues identified by the AI 105.1-105.x. For greater clarity, the device's 101 software 105 can be programmed to send issues or alerts related to identified issues pertaining to an asset 12, whether or not that asset 12 is present in the database on the device 101 or the server 111. The selected images 108 of the asset 12 and sensor data 107 are uploaded to the cloud server 111 through a network 110. The server's 111 software 500 can perform similar operations 500.1-500.*x* to the device 101's software 105. The image processing 105.1-105.X, 500.1-500.*x* can take place before image 104 storage, after image 104 storage, or a combination thereof. It can take place one or more time per image 104. Each step 105.1-105.X, 500.1-500.*x* can involve one or more neural network NN which achieves one or more purposes. Each model NN can accomplish one or more functions, or a combination of multiple AI models/modules NN with specific outputs that can be used collectively, with software functions that link them together.

The server 111, typically being a more computationally powerful device 111, with access to better processors (For example, CPUs, GPUs, and other specialized processors) will typically be able to load more powerful models, modules, algorithms, and processes and therefore perform a more detailed, and/or more specialized analysis, which could be used, for example, (a) to identify other assets 12 which may have been missed in the device 101; (b) to redact personal information which was missed or not redacted in the device 101; (c) to verify the data 108 provided by the device 101, and reject, modify or approve the data 108; and/or (d) to generate new derived data 108', which can use all some, or none of the data 108 produced by the device 101.

In a sample embodiment 25, the server's 111 software 108 can use larger, more powerful operations 500.1-500.*x*, for the purpose of verifying the data 108 that is sent by the device 101. The server can also use image processing 500.1-500.*x*, for example, object detection 500.1-500.*x* to identify and assess an asset 12 in the sent picture 104, 106. In the same, or in another step 500.1-500.*x*, the image processing/AI 500.1-500.*x* can discern assets 12 that are in good condition and those that are in need of further attention using image classification 500.1-500.*x*. It can also discern different asset 12 types. The image 104 containing the asset 12 can be reduced through cropping of unnecessary data. The same or different image processing operations 500.1-500.*x*. can also be used to redact personal information, such as people's faces, cars, homes, and other personal information and/or background data. Additional processing 500 can take place on the server 101 in relation to correlating derived data 108, 108' to known 535 asset data (for example, matching data), de-duplicating Z data (for example, two images 106 which refer to the same asset 12), and logging issues identified by the AI 500.1-500.*x*.

The current geospatial positioning systems, such as GPS, GNSS and others, including internal positioning systems, external positioning systems, integrated positioning systems, and even smartphone built in systems, can have various accuracy ranges, subject to a variety of factors, such as the underlying technology, the number of visible satellites, the terrain, the sampling frequency, the antenna positioning, interference from other systems, isolating materials, and other factors. Using positioning sensor 107 data in conjunction with processed 105 image 104 data, the device 101 can establish distances relative to landmark objects 12 and updates the asset database 111*a*. By example the information can be provided as both a GPS coordinate and or relational distances from the camera 201.1 position to the identified objects 12 in the image 104. Inaccuracies in the sensor positioning information 107 and image processing algorithms 105 (including projection) can result in the wrong object 12 positioning, which can require therefore a correction by a user using a user interface 113. It is recognized that the device 101, the server 111 or both can undertake additional precision operations using location information 107 (such as GPS), GNSS information, and even data from other device 101 sensors 107 to better estimate the device's 101 position and/or orientation. It is also recognized that the the device 101, the server 111 or both can use geospatial anchors (for example road segments), image anchors (for example, presence and position of a known object in an image), or a combination thereof to better estimate the device's 101 position. It is recognized that similar operations can take place to estimate an asset's 12 position in relation to the device 101.

It is recognized that pruning logic Z can take place across one or more parts of the data collection process. For example: (a) the collected data 104, 107 can be pruned using pruning algorithms Z on the device 101 prior to image processing operations 105.1-105.X; and/or (b) the device 101 data 108 can be also pruned using pruning algorithms Z after the image processing operations 105.1-105.X and prior to storage; and/or (c) the stored data (not shown) can be also pruned Z prior to sending data package 108 to server 111; and/or (d) the server 111 input data 108 (including chosen image(s) 104, sensor data 107, and device 101 derived data 106) can be pruned Z on the server 111 when it is uploaded but before further image processing 500.1-505.X takes place; and/or (e) it can be pruned Z using data from the server 101 derived results (not shown), and/or (f) the server data can be pruned by system users before being presented to end users. It is recognized that the pruning Z can also relate to geospatial 135,535 functions (for example, selecting a limited number of appropriate images 104 to be matched to an asset 12) on the server 111, the device 101 or both. It is also recognized that the pruning process Z can also collect image 104 simply based on geospatial functions 135, 535, and only conduct image processing 105.1-105.X, 501.1-505.X operations upon a request by a user based on certain criteria (asset type, time/date, session/trip, snapshot assembled from multiple data collection efforts, collecting device, collecting vehicle, or other field or parameter which can segment the collected data 108, 108'). In different embodiments, pruning Z can take place one the device 101, the server 111, or a combination thereof.

Example S2 shows how the pruning function(s) Z (either on device 101 or on server 111) can use sensor data 107, image processing data 104, and geospatial data 535, 135 to make decisions about which data to select 108, 108', and which data to omit X, exclude X, reject X, remove X, store for later processing X, delete X, suspend X, and/or not further act on X, whether in part or in full, and whether temporarily or permanently.

The data collection results 108' can then be available to a user through an interface 113. It is recognized that the user can also modify the data collection results 108' through the interface 113.

Figure 7:
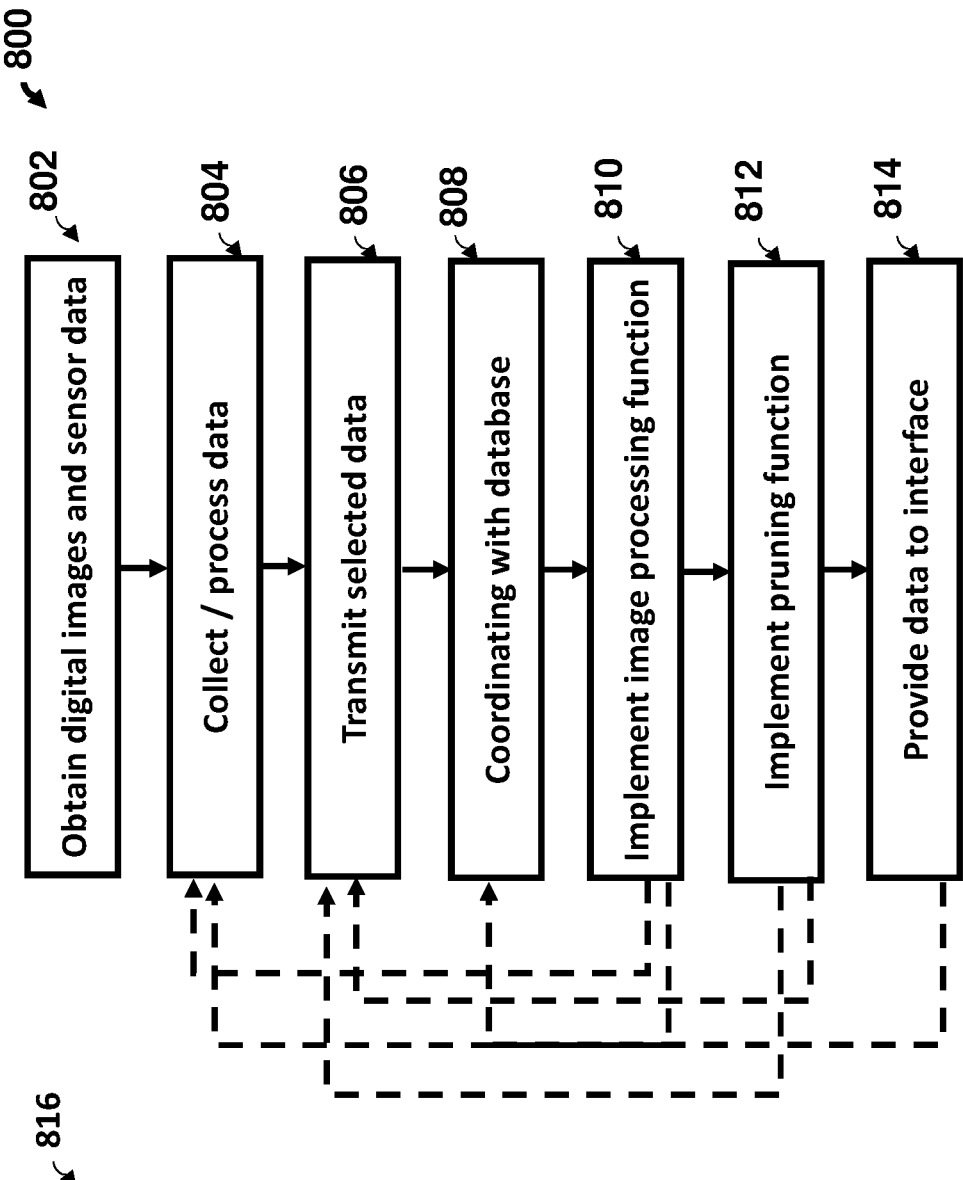
FIG. 7 is an example operation of the system of FIG. 1.

Referring to FIG. 7, shown is an example operation of the system 100 including pruning. The method 800 is provided for optimized collection and/or processing of asset data 12 to generate selected data, and for transmitting the selected data over a communications network 110 to one or more servers 111,112, such that the one or more servers 111,112 are located remotely from the one or more data collection devices 101. The method 800 is executed by one or more processor(s) (e.g. 203.2, 203.7— see FIG. 2) using stored instructions in memory. The first step is obtaining 802 digital images 104 from a camera 101*a*, the digital images 104 including image data (e.g. 105, 151 with objects 12.1,12.2, 12.3,12.4 and considered personal information 13) having at least a portion of the asset data 12; and obtaining sensor data 107, including geolocation information associated with the digital images 104. The second step is executing 804 data collection instructions, the data collection instructions defining operation of the at least one camera 101*a* and the one or more sensors 203.4, 203.5, 203.8 in order to generate collected data including the image data 104 and the sensor data 107 of the asset data 12, including temporarily storing of collected and/or processed portions of the asset data 12 prior to sending the selected data to the one or more servers 111,112 over the communications network 110. The third step is transmitting 806 the selected data to the one or more servers 111,112, and for receiving collection and/or processing instructions and updates from the one or more servers. The fourth step is working 808 in conjunction with one or more asset databases 111*a* for the collection of the asset data 12 of one or more assets and their geolocation as well as at least one image processing function (e.g. 105.1-105.*x*, 500.1-500.*x*) and at least one data pruning function Z. The fifth step is performing 810 the at least one image processing function for generating derived data 106,108 from the digital images 104. The sixth step is performing 812 the at least one data pruning function Z for optimizing an amount of at least one of the image data 104, the sensor data 107 and the derived data 106,108. The seventh step 814 is making at least some of the selected data (one or more portions of the data 106, 108) available to a user through an interface 70. It is recognized in the method 800 that the order of the steps 802,804,806,808,810,812,814 is not necessarily sequential in order, for example, the steps 810, 812 can be performed after or as part of step 804. Similarly, step 808 can be performed after step 812, or for example can be performed before and after step 812. It is recognizing the some of the steps can be repeated on both the device 101 and the server 111. This variable order in the steps is demonstrated by sample dotted lines 816 in FIG. 7, by example. The lines are for illustration and additional lines and/or steps could be used for particular embodiments.

It is recognized that in some embodiments, there can be limited data collection device, separate from the device 101 described in the invention (for example, a simple dashcam, 3rd party CCTV system, or an unknown system), for which the server system can ingest unprocessed image 104 and position sensor 107 data (for example, video clips with accompanying metadata files, georeferenced images) collected by the limited data collection device, and perform the asset collection operations 500.1-500.X only on the image data 104, sensor data 106, and related data 106 of that system. The capturing device 101 can also be completely unknown to the server 111, and the only input data 108 would be the collected footage 104 and related position data 107. It can be a function of the system to support both integrated device 101 and 3rd party data capture camera systems. The 3rd party captured data 108 could be provided to the server 111 in various methods, including by: (a) manually uploading to the server 111 using a client interface 113; (b) uploaded to the server 111 automatically by a 3rd party system using an application interface initiated by the third party system; and/or (c) uploaded to the server 111 by a 3rd party system using a 3rd party application interface initiated by the server's 111 software 500; (d) ingested from an accessible drive or cloud file repository by the server 111; and/or (e) a combination thereof.

Referring to FIGS. 6 and 4, in some embodiments, the enhanced positioning processing 105 (included in workflows 105.1-105.X) can be used to improve the location data 107, 106. In the device 101 operation, the software 105 can use the generated data 106 from the image processing operations 105.1-105.X, the sensor data 107 such as GPS/GNSS to compute new GPS/GNSS data 106 of the asset 12. For example, the image processing operations 105.1-105.X can first detect an asset 12 in an image 104, and then generate, using monocular depth perception using technologies 105.1-105.X (such as Generative Adversarial Networks (GAN), commonly used as generative AI) depth field, whereas the asset pixel value can correspond to a distance from the camera, said distance, together with device 101 heading 107 can provide an estimated location of an asset 12 in relation to the vehicle 102 equipped with the device 101, and even match it with an asset 12 in the inventory 135. Alternatively, the sensor 107 data, could be processed by optimization algorithms 105.1-105.X, which can then be used to generate a projection matrix 106 for the image 104, effectively allowing to project an object 12 from the camera's field of view 104 to a bird's eye view 703, whereas the projected point 703.1 of an object can then be matched with an asset 12 entry in the database 135. The image processing operations could also only use geospatial sensor data 107 together with bounding boxes and asset type 106 to perform matching to assets 135, for example, in the case only one matching asset 12 is present in the area.

In various embodiments, the derived information 106 created by the AI operations 105.1-105.X such as the identification of landmarks/objects and the distances from the landmarks can be computed. This is meant to help assessors in accurately identifying the asset 12 and its position 703.1, 703.2. This process creates metadata about the position of the detected asset object 12, the metadata 106 can be also sent to the server 108. The server 111 can perform similar operations 500.1-500.X to the device's 101 using its own software 180, and generate its own derived data 108', which can be matched to the servers 111 GIS data repositories 535 or external repositories 112. It is recognized that the server 111 can have access to more powerful models, operations and processing and as such, can be used to verify none, some, or all of the metadata 116 information provided by the device 101, including potential asset 12 matching.

Referring to FIGS. 4, 5 and 6, the asset's 12 geospatial position mapping and/or matching can be fully automated (for example, using software 105.1-105.*x*, 500.1-505X including optimization Z and Neural Networks NN), partially automated (for example, with recommendations by the software 105, 500 to be verified by a person using an interface 113, 114), or manual (for example as described in FIG. 4). The position 107 can be captured as the device's 101 nearest position 703.1 to an asset. It can be captured as the asset's 12 estimated distance or offset from the device's 101 nearest position 703.2. It can also be estimating the projected geospatial coordinates 703.2 of the asset 12. The analysis can be done on one image 104 at a particular time and place analyzed by the software 105, 500.

The system can also be using more sophisticated algorithms for determining the asset's 12 positioning by analyzing more than one image 1000*a-e* and more than one position 107*a-e*. For example, for determining the distance between the elements within an image 104 the AI NN, Z could use Structure from Motion SfM, Photogrammetry, GAN generated depth cloud, projections and/or other algorithms. Other methods Z, NN that can be used for measuring distances between the device's 101 position 703.1 and an asset 12 position 703.2 identified across images 1000*a-c* can also be, for example, Direct SfM, Feature Based SfM, Multiview Stereo, bundle adjustment or other published or unpublished algorithms.

For the depth cloud NN (or alternatively, point cloud), estimation of distance using AI Module NN. A camera 201.1, 201.2 can have supporting camera components such as variable or fixed aperture openings, a single lens or multiple lenses architecture to manipulate its focal length, depth of view or field of view to obtain clear images. Additionally, these components can be part of one or multiple cameras 201.1, 201.2 and the image sensor data integrated. Similar effects can be obtained with the use of software where images can be processed to improve its sharpness, contrast or scene selection such as panoramic views 104 or close up images 104. Additional sensors 107 such as time of flight sensors or other proximity sensors can be used to detect and improve the image 104 quality. The data from these sensors 104, image 104 enhancement software, and/or LIDAR data can be parameters used to train the neural network NN to predict dimensional attributes for each object 12 and/or pixel in an image, which can translate to the distance away an object 12 is from the device 101. Alternatively, the system 25 can identify landmark objects 12 (for example, using object detection or instance segmentation models NN). Examples of landmarks could be the edge of the curb, driveways, width of lanes, trees, fences, gates, pavements, road markings, signs, manhole covers, cars, tires, license plates, or other notable objects that can have standardized dimensions. Once these objects 12 are detected, additional spatial information can be derived 106 about the image 104. In some embodiments, the selected data can be used to construct a 3D depiction of a scene containing one or more assets using multiple images selected for the asset 12 scene construction. Said scene can include a point cloud and/or overlaid image pixels.

With reference to FIGS. 3 and 6, cloud server(s) 111 run server software 500. Server software 500 is used to communicate with various data repository or databases such as GIS database(s) 111*a*, asset information database(s) 111*a* and other external database(s) 111*a* that contain data in relation to asset management, financials, procurement, complaints, inspections, work management, and other. Server software 500 can provides functionality to further process data 108 transmitted by the device 101, process data stored in databases 111*a*, generate digital interfaces 130, and other necessary server 111 features including some or all of the following: secure connection, data retrieval, data updates, creating new data, removing data, file storage, generation of dashboards, alerts, and/or notifications, security controls such as access control for devices and users, permission and encryption, and/or any other typically server features and/or any combinations thereof.

The inspection process can take place in the device 101 and generate inspection data 108. In some embodiments, some or all of the inspection data 108, can be reviewed or otherwise interacted with by a user 121 using the device's 114 interface locally. Some or all of the inspection data 108 can also be stored, modified, and/or processed (at any order) based on the device's 101 programming, instructions from the server 111, information from other devices 101, or a combination thereof. Some or all of the inspection data 108 can be sent to the server 111, to other devices 101, or a combination thereof. The server 111 can process one or more inspection data 108 from one or more devices 101, and generate server processed inspection data 108'. The processed inspection data 108' on the server 111 can include new data, not originally reported by the device 101 (for example, an asset 12 which was not captured by the device 101 but was identified by the server 111 in an image 104). The processed inspection data 108' on the server 111 can have different data, whereas the server 111 processing results differ from the device's 111. It is recognized that the server 111 results 108' will typically include some of the device 101 inspection data 108, such as captured images 104 and sensor data 107. However, the inspection results 106—for example, metadata, objects, scores, calculations, and/or other derived data 106 can differ. It is therefore recognized that the server's 111 derived data (not shown) can differ. For example, an asset 12 is reported as failed by the device 101, but the server's 111 software 500 provides reports it as normal (not failed). It can be possible that the server's 111 results 108' differ from the device's 111 results 108, and therefore there can be logic to determine which results to keep and which ones to discard. The logic can include some or all of the following options: (a) priority to server 111 results; (b) priority to device 101 results; (c) merging of server 111 results 108' and device 101 results 108; (d) only use device 101 results 108, and not generate server 111 results 108'; (e) only use server 111 results 108' (and potentially discard device 101 results 108); and/or (f) variations thereof for different use cases.

The determination of which inspection data to keep and which to discard can rely on the model NN performance metrics (for example, F1, Recall, Precision) and determined collection/exclusion algorithm Z metrics (For example, mean squared error). It can be beneficial for the device 111 to maximize the coverage of the assets 12 collected based on its programming, while minimizing the collection of unnecessary, duplicate or erroneous data to reduce downstream processing, storage and transmission resources and costs. The server 111 can have more powerful computing resources than the device 101, and as such, its software 500.1-500.X could use models NN and optimization techniques Z that can provide superior results. Depending on the application, the device's 101 software 105.1-105.X can generate metadata 106 that is of sufficiently high quality, and in such instances, the server 111 may not need to re-process that portion of the inspection data 108. It is recognized that different assets, inspections, software versions, profiles, use cases, models NN, and algorithms Z can result in different distribution of which part of the device's 101 inspection data 108 and the server's 111 analysis 500.1-500.X results are available for the final inspection 108' results.

Referring to FIGS. 1, 5 and 6, The server's 111 software 500 inspection results 108' can include image 104 data for matched assets 12 and their metadata. The results can also include potential issues, and if so, it can also include position of issues, name of issues, severity of issues, and other fields/parameter of interest. Where an asset 12 is found to have issues, the system can flag the issue for a review by a person or triggering automated work processes. The software will generate a list of flagged items on completion of its assessment for further review/actions.

Examples of types of reviews can include image review, location review, and metadata review, through the device's interface 114, human machine interface 130, client interface 113, or a combination thereof. The digital review 113, 114, 130 can trigger actions such as further investigation (in person or digitally) and escalation (for example, to a managerial staff). The review process can also yield specific actions relevant to mitigating risk (i.e. safety pylons), temporary solutions (i.e. temporary sign), corrective actions (whether in part or in full) restoring the asset to its original (or functional) state or replacement actions.

In the event that information obtained from the sensors 107, images 104 or processing 105, Z, NN is incomplete or inconclusive due to technical or environmental factors by example poor weather conditions, construction, poor lighting, obstacles, loss of power, inconsistent data, edge cases, or otherwise, it can be that further investigation is required. The human machine interface 130 can create a workflow whereby an asset or group of assets are listed for further inspection/investigation.

Similarly, the system 95 can automatically initiate workflows (for further investigation or repairs depending on the asset 12, the available data 108, 108' and the system's 95 programming, for example, to review, inspect the asset 12 in person, or initiate a corrective action. The service requests/work requests can take place using the system's 95 client software 113, 3rd party asset management/work management systems 112, or even through specialized software 650 (for example, app 650 that is deployed on phones, tablets or computers) for the management of asset 12 maintenance work in the field. It is recognized that different embodiments or end users can use one ore more components 113, 112, 650 or different modules for work management.

When an asset 12 is flagged for maintenance work, work orders can be created either automatically through workflows 105.1-105.z, or by the reviewer, through a human machine interface 130 or client software 113. The information can be viewed through one or more of the interface options 130, 113 or transmitted through application programming interfaces to work management applications 112, 650. This function can be executed on the server 111 and server software 500 which supports the integration (which can include some or all of the following, connection, authentication, transmitting asset related data, receiving asset related data delivery and retrieval of information, encryption/decryption, file transfers, synchronization of data, creating, updating, closing and/or deleting service requests and/or work requests (in either system 111, 112), Application Interface (API) calls, web hooks, and other communications to external data sources 111. Additionally, field devices 101, 650, in some embodiments can help inspectors, work crews or drivers navigate to asset 12. By example when an asset 12 is flagged for replacement the system 95 or a human operator, the information can be passed to server 111 where it updates its own databases 500 and/or asset information database 111a. The information about the asset 12 to be replaced can be prioritized in many ways such as by cost, location, significance, residential and city demands, replacement time, usable life or any other criteria or combination thereof. The assets database 111a can be viewed, details modified, or information updated through third party user interfaces (not shown), or through integration through the system 95. It is recognized that the server 111 could also generate (automatically or through a client interface 113, 650) reports, lists, maps, files, dashboards, whether standard, filtered, or customized, and that this generated information could be interacted with physically (for example, through printouts or maps), and/or logically (for example, on a computer).

Referring to FIGS. 3, 4, and 6 the user roles can also be customized, whereas different components 701-7XX and/or different asset types are available based on the defined role. It is also recognized that one or more devices 101 can collect data 108 for one or more organizations for one or more user roles. It is recognized that the permissions can be on a user role, a user group, or a specific user. The asset data 108, 108' can be segregated, partially shared, or fully shared. For example, when an issue is found by the device 101 the information is passed through network 110 to the server 111, at which point it could be assigned to a user role such as a region's maintenance crew. This information can be made available by using interface 130 or sent directly to another tablet/smartphone 650 with information such as the location, repair or maintenance priority or by proximity to the issue. This could enable better monitoring of assets and faster repair times. User roles such as administrator or manager can help to provide command and control functions, that can ensure a more strategic approach to the system 25 asset maintenance and monitoring. For greater clarity, administrators (which can have another name but is intended to act as the account with the highest permission level) have access to all system features. Examples can include system settings, configuration, importing/export of assets data, importing/exporting of user data, account administration, device administration, map administration, asset administration, setting up workflows, multi-tenancy settings, security settings, data collection settings, data processing settings, customizing fields, creating views, reviewing data, assigning work (such as service requests or work orders), client device access, integrations with third party systems, SMS functions, email functions, text message functions, notifications, dashboard settings, creating/modifying views, reports, backups, billing, and administering/using any other available system function. The administrator can assign permissions to any system features, create roles and assign users to roles, or otherwise manage the level of access to the system based on its role types and customization capabilities (whether by role, feature, or a combination thereof). Administrators can also able to assign the permissions, functions and features to subordinate accounts in a manner that mimics the organizational hierarchy. This also creates a customized list of features that each user can access. The customization can apply to one or more user interface such as the device's 101 interface, system interface 113, or assisting tools 130, 650 and their interfaces, that aligns with the roles It is recognized that this invention encompasses a wide range of embodiments and variations, and that singular and plural forms can be interchangeable and inclusive in some contexts. Also, groupings of features, capabilities, processes, components, algorithms and other text ("groupings"), are used for convenience and clarity of description. It should be understood that the individual elements included in the groupings can also be used independently or in different combinations, as per the requirements of a particular use case or embodiment. Where examples are provided, either specifically or implicitly, it should be understood that that the examples provided are not exhaustive, and are meant to illustrate the breadth and versatility of the invention, while recognizing that other variations and embodiments are possible within the invention's scope.

The invention claimed is:

1. A system for optimized collection and/or processing of asset data to generate selected data, and for transmitting the selected data over a communications network to one or more servers, the one or more servers located remotely from one or more data collection devices, the system comprising:

the one or more collection devices mounted in one or more vehicles and having:

at least one camera for obtaining digital images including image data having at least a portion of the asset data;

one or more sensors for collecting sensor data, including at least one sensor for acquiring geolocation information associated with the digital images;

at least one working memory and at least one processor for executing data collection and/or processing instructions, the data collection instructions defining operation of the at least one camera and the one or more sensors in order to generate collected data including the image data and the sensor data for the asset data;

storage media for storage of the asset data including temporary storage of collected and/or processed portions of the asset data prior to sending the selected data to the one or more servers over the communications network; and a network communications interface for sending the selected data to the one or more servers over the communications network, and for receiving collection and/or processing instructions and updates from the one or more servers over the communications network; and at least one asset database representing the asset data of one or more assets and their geolocation, the database working in conjunction with at least one image processing function and at least one data pruning function; and at least one image processing function for generating derived data from the digital images, the at least one image processing function operating on the one or more data collection devices and/or the one or more servers; and at least one data pruning function for optimizing an amount of at least one of the image data, the sensor data and the derived data; the least one data pruning function operating on the one or more data collection devices and/or the one or more servers.

2. The system of claim 1 wherein the communications network includes the internet.

3. The system of claim 1 wherein the system collects the image data for the one or more assets from one or more perspectives.

4. The system of claim 1 wherein the system can be operated autonomously, semi-autonomously and/or manually.

5. The system of claim 1 wherein the database is synchronized with one or more 3 rd party asset databases.

6. The system of claim 1 wherein at least some of the collected data is matched to a particular asset in the database using one or more matching algorithms.

7. The system of claim 1 wherein the system supports collection of the asset data for one or more of the following asset types selected from a group; the group including at least one of the following asset types: (a) pavement markers, vertical markers, longitudinal markers, horizontal markers, transversal markers, lane markers, vertical lines, horizontal lines, zig zagged lines, crossed lines, solid lines, patterned lines, dashed lines, double lines, multiple lines, lines of different thickness, lines of different colors, bars, crosswalks, arrows (left, right, forward, backwards, multi-arrow), numbers, letters, line drawings (handicap, family, expectant mother), and any other pavement marking of any shape, pattern, color or combination, whether regulatory, warning, informative or decorative; (b) fire hydrants, manholes, grates, basins, pipe access points, access ports, drains, or any other surface based points that provide ingress, egress, and/or access for water, equipment or people to an underground water system, whether for multi-purpose, combined purpose or specific purpose; (c) Trees, gardens, planters, shrubbery, greenery, flowers beds, and otherwise planned, planted vegetation considered an asset under the responsibility of an entity, whether planted in ground or in planters; (d) highways, roads, rails, guardrails, hand rails, tramlines, lanes, trails, bicycle lanes, parking lanes, parking spots, lots, intersections, sidewalks, pads, walkways, trails, easements, right-of-way, and/or other paths (including concrete, asphalt, gravel, aggregate, composite, dirt, or other material and/or a combination thereof) meant to provide a surface for movement of vehicles (of one or more types), equipment, and/or people; (e) curbs, bridges, bridge decks, bridge joists, columns, retaining walls, spalls, tracks, bars, bolts, nuts, panels, cables, wires, anchors, frames, joints, or other road, bridge and/or rail infrastructure, and/or related items thereof; (f) traffic control devices, such as signs (such as regulatory, warning, construction, temporary, informational, or other signs), traffic lights, signaling lights, pedestrian warning systems, and/or other traffic control devices; (g) barriers, barricades, gates, guiderails, fences, bollards, cones, pylons, rocks, and/or other assets meant to restrict or redirect traffic of vehicles (of one or more types) and/or people; (h) various types of poles, such as sign poles, lighting poles, electrical poles, phone poles, telecommunication poles, utility poles, multi-purpose poles, load bearing poles, and/or other poles as well as transformers, boxes, wires, and/or accessories related thereof; (i) cabinets of one or more types, such as cabinets for power distribution, electrical distribution, utility, telecomm equipment, computing equipment, network equipment, communications equipment, control equipment, phone systems, signaling equipment, multi-purpose cabinets, and/or cabinets for other purposes; (j) transit related asset, such as a transit stop, transit station, transit pole, transit stop sign, bench, bollard, ashtray, clock, digital displays, advertising display, information post, stands, ticketing systems, lighting, glass panels, maps, news stands, payphones, advertising surface, bike rack, shelter, solar power source, washroom, garbage bin, and/or other transit assets and/or components thereof; (k) asset fixtures, such as brackets, anchors, clamps, mounting plates, fasteners, hooks, adhesives, hangers, clips, straps, pins, braces, standoffs, angles, bolts, nuts and/or other fixtures and/or components thereof; and/or (l) other assets, such as mailboxes, donation bins, public waste bins, playgrounds, ramps, water fountains, statues, decorations, structures, electronic devices, charging stations, parking meters, parking spots (whether dedicated or time limited), meters, pipes, lawns, parks, shuttles, other vehicles, and/or components thereof.

8. The system of claim 1 wherein the at least one image processing function generates the derived data for the image data of the digital images.

9. The system of claim 8 wherein the at least one image processing function is performed on the data collection device and at least some of the derived data is sent to the one or more servers as the selected data, the selected data excluding the image data used to generate the derived data.

10. The system of claim 8 wherein the at least one image processing function includes at least one neural network.

11. The system of claim 8 wherein the derived data confirms the presence of one or more assets of the asset data in one or more images of the image data.

12. The system of claim 8 wherein the derived data includes visual assessment results of a condition of one or more assets of the asset data in one or more images of the image data.

13. The system of claim 8 wherein the derived data includes identification of one or more issues in the one or more images of the image data.

14. The system of claim 13 wherein the system initiates one or more actions selected from a group when an issue is identified; the group includes at least one of the following actions: (a) generate notification; (b) send SMS message; (c) initiate alert; (d) send email; (f) create service request; (g) create work order; (h) generate report; (i) initiate integration task; (j) assign to user; (k) display image; (l) display text; (m) play sound; (n) offer recommendation; (o) populate interface component; (p) generate file; (q) update database tables; (r) update views; (s) update corresponding record; and/or (t) related actions thereof.

15. The system of claim 8 wherein the at least one image processing function redacts personal information determined in the image data.

16. The system of claim 8 wherein the asset inspection issues include issues selected from a group; the group includes at least one of the following issues: (a) presence issues, missing assets, misplaced assets, and/or assets located elsewhere; (b) structural issues or physical damage issues, whereas the asset or one or more of its components is broken, shattered, chipped, bent, cracked, deformed, punctured, disintegrated, sheared, cut, rutted, warped, bleeding, heaved, depressed, mangled, twisted, shattered, smashed, shot or otherwise physically damaged; (c) orientation or continuity issues, whereas the asset or one or more of its components are leaning, fallen over, twisted, warped, uneven, mis-aligned, non-aligned, facing the wrong way, rotated, tilted, flipped, sunken, raised, recessed, protruding, dropped-off, or otherwise not positioned properly; (d) visibility, obstruction and/or occlusion issues, whether in full or in part, whereas the asset or one or more components of the asset are being covered, obscured, obstructed, blocked, clogged, and/or occluded, including by one or more objects, resulting in lack of visibility, and/or physical obstruction; (e) use, wear, tear and exposure issues, including issues encountered due to asset's use, or asset's exposure to the environment or weather, whereas the asset or one or more of its components can experience failures, whether mechanical, electrical, material, degradation, corrosion, oxidization, decomposition, rusting, erosion, tarnishing, discoloration, change of color, changes in texture, staining, chips, cracks, swelling, peeling of paint or coatings, pitting, leaking, flaking, bubbling, fading, failure of a mechanical component, and/or other such failures, whether absolute, or partial; (g) vandalism issues, graffiti, paint, stickers, drawings, dents, scratches, etchings, stencils, adhesives, splattering, breaking, smashing, or other vandalizing, defacing and/or other damaging actions; (h) day and/or night visibility issues, where an asset or one or more components of the asset are not adequately visible at day or at night, dimming, flickering, broken lighting, poor material reflectiveness, poor retro-reflectivity score, fade of material, wear and tear of material, orientation, and/or other to electrical, mechanical or material malfunction which compromise the asset's visibility at day and/or at night; (i) capacity issues, overfilling, under-filling issues, whereas the asset or one or more of its components, are used beyond the intended capacity or under the intended capacity, (j) accessibility issues, whereas the asset or one or more of its components, is inaccessible due to environmental conditions, manmade obstructions, asset failures and/or a combination thereof; (k) chemical, biological, environmental, toxic and/or hazardous issues in proximity or in contact with the asset or one or more of its components, dead animals, carcasses, excrement, urine, invasive plant species, dangerous animals, infestation, fungi, blight, garbage piles, used needles, used contraception products, used personal hygiene products, medical waste, chemical waste, radioactive materials, food waste, spills, dumping, broken glass, exposed wires, trip edges, and/or other such products or use cases that can deter use or be hazardous to people, animals, plants and/or the environment; (l) cleanliness issues, in which an asset or one or more of its components are dirty due to accumulation of dust, pollution particles, salt, or other particulates which coat the asset or otherwise form film or coating, whether organic or inorganic, whether human originated or otherwise; (m) compliance issues, where an asset or one or more components of the asset fail to comply with a standard, regulation, policy and/or best practices, accessibility issue, safety issue, maintenance issue, and/or asset management issue, illegal parking, encroachment issues, excessive vegetation growth, encampments, and/or other compliance issues; and/or (n) abnormal status issues, whereas an asset is in an abnormal state.

17. The system of claim 1 wherein the least one data pruning function includes a pruning operation selected from a group of operations; the group of operations includes at least one of the following operations: discarding of data, grouping of data, matching of data to asset, exclusion of data, inclusion of data, extraction of data, throttling of data, compression of data, retention of data, deletion of data, prioritizing of data, assembling of data, verification of data, requesting of data, selection of data, and/or user review of data.

18. The system of claim 1 wherein at least some of the selected data is available to a user through a client interface.

19. The system of claim 1 wherein the vehicle is a public transit vehicle, and assets of the asset data are transit stops; the transit stops including one or more asset types.

20. The system of claim 19 wherein the system visually inspects the transit stops assets for issues.

21. A method for optimized collection and processing of asset data to generate selected data, and for transmitting the selected data over a communications network to one or more servers, the one or more servers located remotely from one or more data collection devices, the method executed by one or more processor(s) using stored instructions in memory for:

obtaining digital images from a camera, the digital images including image data having at least a portion of the asset data; and obtaining sensor data, including geolocation information associated with the digital images;

executing data collection instructions, the data collection instructions defining operation of the at least one camera and the one or more sensors in order to generate collected data including the image data and the sensor data of the asset data, including temporarily storing of collected and/or processed portions of the asset data prior to sending the selected data to the one or more servers over the communications network;

transmitting the selected data to the one or more servers, and for receiving collection and/or processing instructions and updates from the one or more servers;

working in conjunction with one or more asset databases for the collection of the asset data of one or more assets and their geolocation as well as at least one image processing function and at least one data pruning function;

performing the at least one image processing function for generating derived data from the digital images;

performing the at least one data pruning function for optimizing an amount of at least one of the image data, the sensor data and the derived data; and making at least some of the selected data available to a user through an interface.

* * * * *